US009039929B2

(12) United States Patent
Kaneoya et al.

(10) Patent No.: US 9,039,929 B2
(45) Date of Patent: *May 26, 2015

(54) NEMATIC LIQUID CRYSTAL COMPOSITION

(75) Inventors: Masakazu Kaneoya, Kita-adachi-gun (JP); Kiyofumi Takeuchi, Kita-adachi-gun (JP); Masashi Osawa, Kita-adachi-gun (JP); Kenta Tojo, Kita-adachi-gun (JP); Tetsuo Kusumoto, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,547

(22) PCT Filed: Jul. 31, 2012

(86) PCT No.: PCT/JP2012/069461
§ 371 (c)(1),
(2), (4) Date: Apr. 28, 2014

(87) PCT Pub. No.: WO2013/018796
PCT Pub. Date: Feb. 7, 2013

(65) Prior Publication Data
US 2014/0225036 A1    Aug. 14, 2014

(30) Foreign Application Priority Data

Aug. 2, 2011 (JP) ................. 2011-169219

(51) Int. Cl.
*C09K 19/20* (2006.01)
*C09K 19/12* (2006.01)
*C09K 19/30* (2006.01)
*C09K 19/32* (2006.01)
*C09K 19/34* (2006.01)
*C09K 19/54* (2006.01)
*C09K 19/42* (2006.01)
*C09K 19/16* (2006.01)
*C09K 19/18* (2006.01)
*C09K 19/04* (2006.01)

(52) U.S. Cl.
CPC ........ *C09K 19/3402* (2013.01); *C09K 2019/122* (2013.01); *C09K 2019/123* (2013.01); *C09K 2019/161* (2013.01); *C09K 2019/166* (2013.01); *C09K 2019/181* (2013.01); *C09K 2019/183* (2013.01); *C09K 19/2007* (2013.01); *C09K 2019/3004* (2013.01); *C09K 2019/3009* (2013.01); *C09K 2019/3015* (2013.01); *C09K 2019/305* (2013.01); *C09K 2019/3051* (2013.01); *C09K 2019/3037* (2013.01); *C09K 19/20* (2013.01); *C09K 19/3066* (2013.01); *C09K 19/322* (2013.01); *C09K 19/42* (2013.01); *C09K 2019/0448* (2013.01); *C09K 2019/0466* (2013.01); *C09K 2019/124* (2013.01); *C09K 2019/301* (2013.01); *C09K 2019/3012* (2013.01); *C09K 2019/3016* (2013.01); *C09K 2019/3019* (2013.01); *C09K 2019/3025* (2013.01); *C09K 2019/3036* (2013.01); *C09K 2019/304* (2013.01); *C09K 2019/3063* (2013.01); *C09K 2019/3077* (2013.01); *C09K 2019/3422* (2013.01)

(58) Field of Classification Search
CPC .. C09K 19/20; C09K 19/3066; C09K 19/322; C09K 19/3402; C09K 19/42; C09K 19/54; C09K 2019/0448; C09K 2019/0466; C09K 2019/122; C09K 2019/123; C09K 2019/124; C09K 2019/161; C09K 2019/166; C09K 2019/181; C09K 2019/183; C09K 2019/2007; C09K 2019/3004; C09K 2019/3009; C09K 2019/301; C09K 2019/3012; C09K 2019/3015; C09K 2019/3016; C09K 2019/3019; C09K 2019/3025; C09K 2019/304; C09K 2019/3036; C09K 2019/3037; C09K 2019/305; C09K 2019/3051; C09K 2019/3063; C09K 2019/3077; C09K 2019/3422; G02F 1/1333
USPC ............ 428/1.1; 252/299.61, 299.62, 299.63, 252/299.66, 299.67, 299.5
See application file for complete search history.

(56) References Cited

U.S. PATENT DOCUMENTS

| 8,916,718 | B2 * | 12/2014 | Tojo et al. ...................... 549/370 |
| 2009/0302273 | A1 * | 12/2009 | Tanaka ...................... 252/299.61 |
| 2013/0300996 | A1 * | 11/2013 | Takeuchi et al. .............. 349/182 |

FOREIGN PATENT DOCUMENTS

| JP | 8-283183 A | 10/1996 |
| JP | 09-157202 A | 6/1997 |

(Continued)

OTHER PUBLICATIONS

International Search Report of PCT/JP2012/069461, dated Sep. 18, 2012.

*Primary Examiner* — Shean C Wu
(74) *Attorney, Agent, or Firm* — Westerman, Hattori, Daniels & Adrian, LLP

(57) ABSTRACT

A nematic liquid crystal composition of the present invention is used in liquid crystal display devices of the TN mode, OCB mode, ECB mode, IPS mode, or VA-IPS mode. The liquid crystal composition has positive dielectric anisotropy. Since the refractive index anisotropy and the nematic phase-isotropic liquid phase transition temperature are decreased and the increase in the lower limit temperature of the nematic phase is suppressed, the viscosity of the liquid crystal composition is sufficiently low without degrading the nematic phase temperature range. The liquid crystal composition also offers excellent features such as high-speed response, good display quality, and less display failures and is thus suitable as a practical liquid crystal composition.

22 Claims, No Drawings

(56) References Cited

FOREIGN PATENT DOCUMENTS

| JP | 2003-183656 A | 7/2003 |
|---|---|---|
| JP | 2007-277127 A | 10/2007 |
| WO | 96/32365 A1 | 10/1996 |
| WO | 98/23564 A1 | 6/1998 |
| WO | 2009/150963 A1 | 12/2009 |
| WO | 2012/043387 A1 | 4/2012 |

* cited by examiner

NEMATIC LIQUID CRYSTAL COMPOSITION

TECHNICAL FIELD

The present invention relates to a nematic liquid crystal composition that is useful as an electro-optic liquid crystal display material and exhibits a positive dielectric anisotropy ($\Delta\in$).

BACKGROUND ART

Liquid crystal display devices have come to be used in watches, calculators, various measuring instruments, automobile panels, word processors, electronic organizers, printers, computers, televisions, clocks, advertising display boards, etc. Representative examples of liquid crystal display modes include TN (twisted nematic) mode, STN (super twisted nematic) mode, VA (vertical alignment) mode in which vertical alignment is realized through use of TFTs (thin film transistors), and IPS (in-plane switching)/FFS mode in which horizontal alignment is featured. Liquid crystal compositions used in these liquid crystal display devices are required to be stable against external factors such as moisture, air, heat, and light, exhibit a liquid crystal phase in a temperature range as wide as possible around room temperature, have a low viscosity, and be driven at low voltage. A liquid crystal composition is composed of several to several tens of compounds in order to optimize the dielectric anisotropy ($\Delta\in$) or refractive-index anisotropy ($\Delta n$) for individual display devices.

A liquid crystal composition with negative $\Delta\in$ is used in a vertical alignment display and a liquid crystal composition with positive $\Delta\in$ is used in a horizontal alignment display such as TN, STN, or IPS type. In recent years, there has been reports of a driving mode by which a liquid crystal composition with positive $\Delta\in$ is vertically aligned in the absence of applied voltage and display is performed by applying an IPS/FFS-type electric field. There is an increasing need for a liquid crystal composition with positive $\Delta\in$. Meanwhile, low-voltage driving, high-speed response, and wide operation temperature range are pursued in all driving modes. In other words, positive $\Delta\in$ with a large absolute value, a low viscosity ($\eta$), and a high nematic phase-isotropic liquid phase transition temperature ($T_{ni}$) are required. Moreover, based on the setting of $\Delta n \times d$, which is a product of $\Delta n$ and a cell gap (d), the $\Delta n$ of the liquid crystal composition needs to be adjusted within an appropriate range suitable for the cell gap. In addition, when the liquid crystal display device is to be used in a television or the like, high-speed responsiveness is important and thus a liquid crystal composition with a small $\gamma_1$ is required.

There have been disclosed liquid crystal compositions that use a compound represented by formula (A-1) or (A-2) with positive $\Delta\in$ as a constitutional component of the liquid crystal compositions (PTL 1 to 4); however, these liquid crystal compositions do not have sufficiently low viscosity.

[Chem. 1]

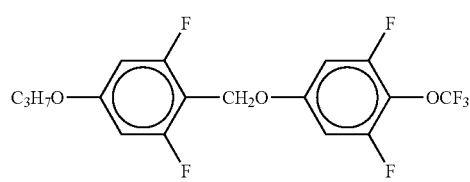

(A-1)

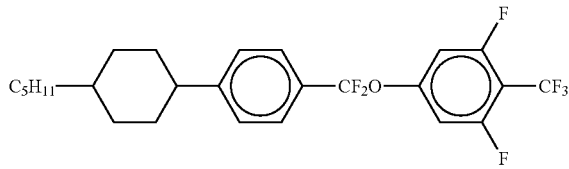

(A-2)

CITATION LIST

Patent Literature

PTL 1: WO96/032365
PTL 2: Japanese Unexamined Patent Application Publication No. 09-157202
PTL 3: WO98/023564
PTL 4: Japanese Unexamined Patent Application Publication No. 2003-183656

SUMMARY OF INVENTION

Technical Problem

An object of the present invention is to provide a liquid crystal composition having sufficiently low viscosity ($\eta$) and positive dielectric anisotropy ($\Delta\in$), in which the refractive-index anisotropy ($\Delta n$) is adjusted to a desired level, the nematic phase-isotropic liquid phase transition temperature ($T_{ni}$) is decreased, the increase in lower limit temperature for the nematic phase is suppressed, and thus the temperature range of the nematic phase is not degraded.

Solution to Problem

The inventors have studied various fluorobenzene derivatives and found that the above-mentioned object can be attained by combining specific compounds, thereby making the invention.

The present invention provides a liquid composition having positive dielectric anisotropy, characterized in that the liquid crystal composition contains one or more compounds selected from compounds represented by general formula (LC0) and one or more compounds selected from a group of compounds represented by general formula (LC1) to general formula (LC5), and also a liquid crystal display device that uses the liquid crystal composition:

[Chem. 2]

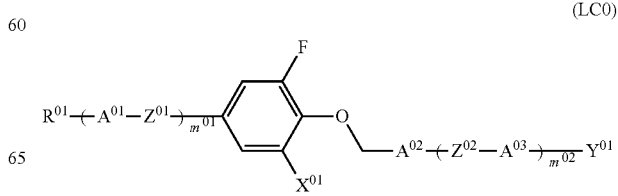

(LC0)

-continued

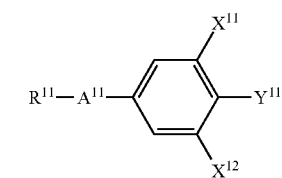 (LC1)

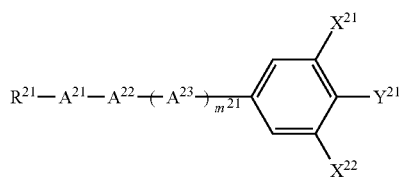 (LC2)

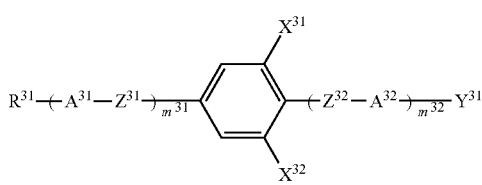 (LC3)

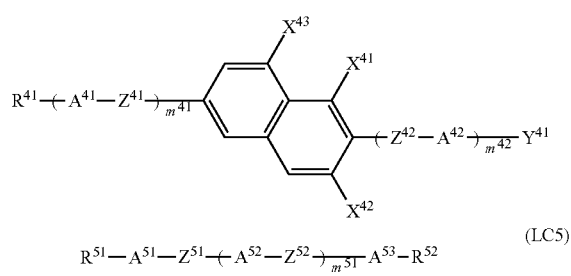 (LC4)

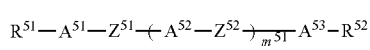 (LC5)

(In the formulae, $R^{01}$ to $R^{41}$ each independently represent an alkyl group having 1 to 15 carbon atoms, one or more —$CH_2$— in the alkyl group may be substituted with —O—, —CH=CH—, —CO—, —OCO—, —COO—, —C≡C—, —$CF_2$O—, or —O$CF_2$— so that oxygen atoms are not directly adjacent to each other, and one or more hydrogen atoms in the alkyl group may be substituted with a halogen; $R^{51}$ and $R^{52}$ each independently represent an alkyl group having 1 to 15 carbon atoms where one or more —$CH_2$— in the alkyl group may be substituted with —O—, —CH=CH—, —CO—, —OCO—, —COO—, or —C≡C— so that oxygen atoms are not directly adjacent to each other, or $R^{51}$ and $R^{52}$ may each be —$OCF_3$ or —$CF_3$— if $A^{51}$ or $A^{53}$ described below represents a cyclohexane ring; $A^{01}$ to $A^{42}$ each independently represent any one of the structures below:

[Chem. 3]

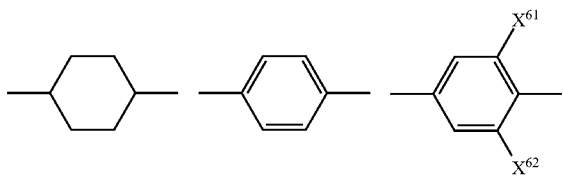

(One or more —$CH_2$— in the cyclohexane ring in the structure may be substituted with —O— so that oxygen atoms are not directly adjacent to each other, one or more —CH= in the benzene ring in the structure may be substituted with —N= so that nitrogen atoms are not directly adjacent to each other, and $X^{61}$ and $X^{62}$ each independently represent —H, —Cl, —F, —$CF_3$, or —$OCF_3$); $A^{51}$ to $A^{53}$ each independently represent any one of the structures below:

[Chem. 4]

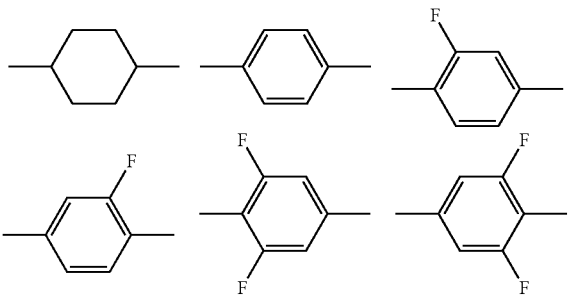

(In the formulae, one or more —$CH_2CH_2$— in the cyclohexane ring may be substituted with —CH=CH—, —$CF_2$O—, or —O$CF_2$— and one or more —CH= in the benzene ring may be substituted with —N= so that nitrogen atoms are not directly adjacent to each other); $X^{01}$ represents a hydrogen atom or a fluorine atom; $X^{11}$ to $X^{43}$ each independently represent —H, —Cl, —F, —$CF_3$, or —$OCF_3$; $Y^{01}$ to $Y^{41}$ each represent —Cl, —F, —$OCHF_2$, —$CF_3$, or —$OCF_3$; $Z^{01}$ and $Z^{02}$ each independently represent a single bond, —CH=CH—, —C≡C—, —$CH_2CH_2$—, —$(CH_2)_4$—, —$OCF_2$—, or —$CF_2O$—; $Z^{31}$ to $Z^{42}$ each independently represent a single bond, —CH=CH—, —C≡C—, —$CH_2CH_2$—, —$(CH_2)_4$—, —$OCF_2$—, or —$CF_2O$— and at least one selected from $Z^{31}$ and $Z^{32}$ that are present is not a single bond; $Z^{51}$ and $Z^{52}$ each independently represent a single bond, —CH=CH—, —C≡C—, —$CH_2CH_2$—, —$(CH_2)_4$—, —$OCH_2$—, —$CH_2O$—, —$OCF_2$—, or —$CF_2O$—; $m^{01}$ to $m^{51}$ each independently represent an integer in the range of 0 to 3; $m^{01}+m^{02}$, $m^{31}+m^{32}$, and $m^{41}+m^{42}$ each independently represent 1, 2, 3, or 4; and when two or more $A^{01}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$, and/or $Z^{52}$ are present, they may be the same or different from each other.)

Advantageous Effects of Invention

A liquid crystal composition according to the present invention is characterized in that Δ∈ is positive and has a large absolute value. Moreover, η is low, rotational viscosity ($γ_1$) is low, liquid crystal properties are excellent, and a stable liquid crystal phase is exhibited over a wide temperature range. Furthermore, the liquid crystal composition is suitable for practical application and has high reliability because it is chemically stable against heat, light, water, etc., and enables low-voltage driving.

DESCRIPTION OF EMBODIMENTS

A liquid crystal composition according to the invention of the present application contains one or more compounds selected from compounds represented by general formula (LC0) and one or more compounds selected from a compound group consisting of compounds represented by general formulae (LC1) to (LC5). Because a liquid crystal composition that contains a compound represented by any of general formula (LC0) and a compound represented by general formulae (LC1) to (LC5) exhibits a stable liquid crystal phase at low temperature, the liquid crystal composition can be regarded as a practical liquid crystal composition.

In general formulae (LC0) to (LC5), $R^{01}$ to $R^{52}$ preferably each independently represent an alkyl group having 1 to 8 carbon atoms, an alkenyl group having 2 to 8 carbon atoms, or an alkoxy group having 1 to 8 carbon atoms and are each preferably linear. In the case where $R^{01}$ to $R^{52}$ are each an alkenyl group, the alkenyl group is preferably selected from the groups represented by formulae (R1) to (R5) below:

[Chem. 5]

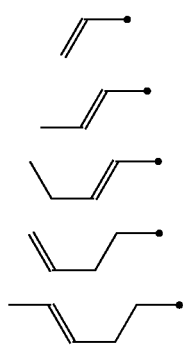

(R1)
(R2)
(R3)
(R4)
(R5)

(In each formula, the black dot indicates the linking point to a ring.)

In the case where $A^{01}, A^{11}, A^{21}, A^{31}, A^{41}, A^{51}$, and $A^{53}$ are each a trans-1,4-cyclohexylene group, these groups are preferable and those represented by formula (R1), formula (R2), and formula (R4) are more preferable. Yet more preferably, one or more compounds represented by general formula (LC5) with at least one of $R^{51}$ and $R^{53}$ representing an alkenyl groups selected from those represented by formulae (R1) to (R5) are contained.

$A^{01}$ to $A^{42}$ each preferably independently represent a trans-1,4-cyclohexylene group, a 1,4-phenylene group, a 3-fluoro-1,4-phenylene group, or a 3,5-difluoro-1,4-phenylene group, and a tetrahydropyran group. When tetrahydropyran groups are included in $A^{01}$ to $A^{42}$, $A^{01}, A^{11}, A^{21}$, and $A^{31}$ are preferably tetrahydropyran groups. Specific examples of preferred compounds having tetrahydropyran groups include those represented by general formulae (LC0-7) to (LC0-9), general formula (LC0-23), general formula (LC0-24), general formula (LC0-26), general formula (LC0-27), general formula (LC0-20), general formula (LC0-40), general formula (LC0-51) to general formula (LC0-53), general formula (LC0-110), general formula (LC0-111), general formulae (LC2-9) to (LC2-14), general formulae (LC3-23) to (LC3-32), formulae (LC4-12) to (LC4-14), general formula (LC4-16), general formula (LC4-19), and general formula (LC4-22). In such a case, one or more compounds selected from the compound groups described above are preferably contained to achieve the object of the present invention.

$A^{51}$ to $A^{53}$ preferably each independently represent a trans-1,4-cyclohexylene group, a 1,4-phenylene group, a 3-fluoro-1,4-phenylene group, or a 2-fluoro-1,4-phenylene group.

$Z^{01}$ and $Z^{02}$ preferably each independently represent a single bond, —CH=CH—, —C≡C—, —CH$_2$CH$_2$—, —OCF$_2$—, or —CF$_2$O—. In the case where one of $Z^{01}$ and $Z^{02}$ that are present represents —CH=CH—, —C≡C—, —CH$_2$CH$_2$—, —(CH$_2$)$_4$—, —OCF$_2$—, or —CF$_2$O—, the other preferably represents a single bond. More preferably, both represent a single bond.

$Z^{31}$ to $Z^{42}$ preferably each independently represent a single bond, —CH=CH—, —C≡C—, —CH$_2$CH$_2$—, —OCH$_2$—, —CH$_2$O—, —OCF$_2$—, or —CF$_2$O—. In the case where one of $Z^{31}$ to $Z^{42}$ that are present represents —CH=CH—, —C≡C—, —CH$_2$CH$_2$—, —(CH$_2$)4-, —OCF$_2$—, or —CF$_2$O—, the rest preferably represent a single bond.

$Z^{51}$ and $Z^{52}$ preferably each independently represent a single bond, —CH=CH—, —C≡C—, —CH$_2$CH$_2$—, —OCF$_2$—, or —CF$_2$O—. In the case where one of $Z^{51}$ and $Z^{52}$ that are present represents —CH=CH—, —C≡C—, —CH$_2$CH$_2$—, —(CH$_2$)$_4$—, —OCH$_2$—, —CH$_2$O—, —OCF$_2$—, or —CF$_2$O—, the other preferably represents a single bond. More preferably, both represent a single bond.

$X^{01}$ preferably represents F since the dielectric anisotropy (Δ∈) is increased and a notably low viscosity (η) is exhibited for the same dielectric anisotropy (Δ∈).

$X^{11}$ to $X^{43}$ preferably each independently represent H or F and $X^{11}, X^{21}, X^{31}$, and $X^{41}$ each preferably represent F.

$Y^{01}$ to $Y^{41}$ preferably each independently represent F, CF$_3$, or OCF$_3$.

While $m^{01}$ to $m^{51}$ may each independently represent an integer in the range of 0 to 3, $m^{01}+m^{02}$ is more preferably 1 or 2, $m^{21}$ is more preferably 0, $m^{31}+m^{32}$ is more preferably 1, 2, or 3, and $m^{41}+m^{42}$ is more preferably 1 or 2.

The liquid crystal compound represented by general formula (LC0) is more preferably a compound represented by any of general formulae (LC0-a) to (LC0-h) below (in the formulae, $R^{01}, A^{01}, A^{02}, A^{03}, Z^{01}, Z^{02}, X^{01}$, and $Y^{01}$ are the same as those in general formula (LC0) and when two or more $A^{01}$ and $A^{03}$ and/or $Z^{01}$ and $Z^{02}$ are present, they may be the same or different from each other).

A liquid crystal composition of the present invention preferably contains, as the compound represented by general formula (LC0), one or more compounds selected from the compounds represented by (LC0-a) to (LC0-h).

[Chem. 6]

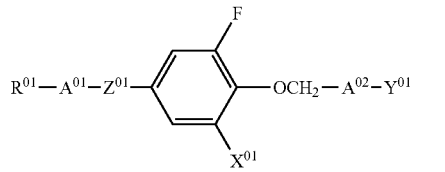

(LC0-a)

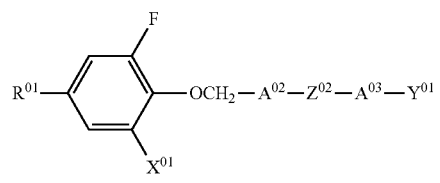

(LC0-b)

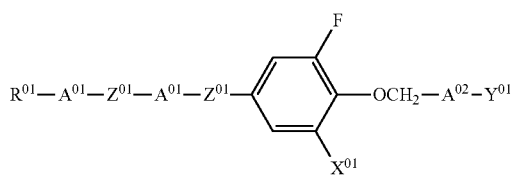

(LC0-c)

(LC0-d)
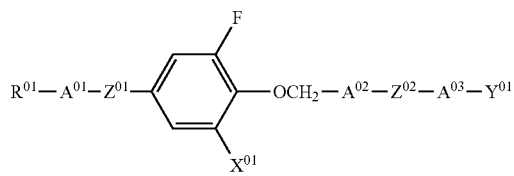
(LC0-e)
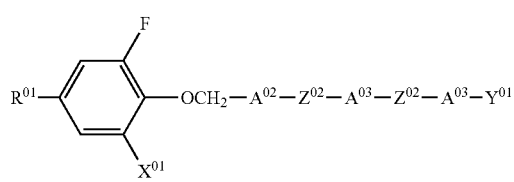
(LC0-f)
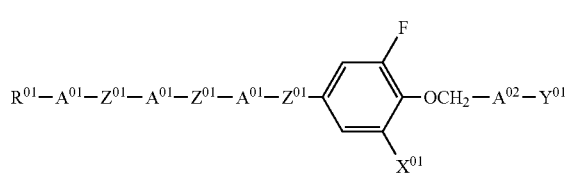
(LC0-g)
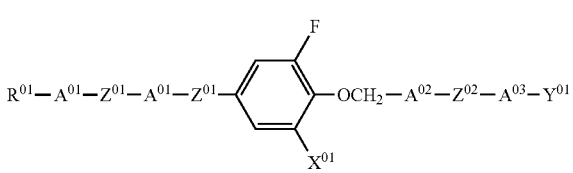
(LC0-h)
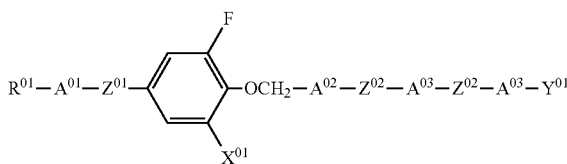
More preferable are compounds represented by general formulae (LC0-1) to (LC0-111) below:
[Chem. 7]
(LC0-1)
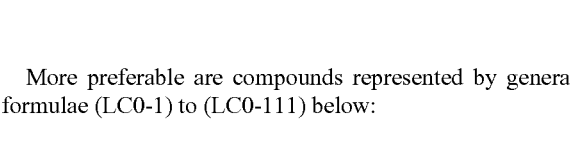
(LC0-2)
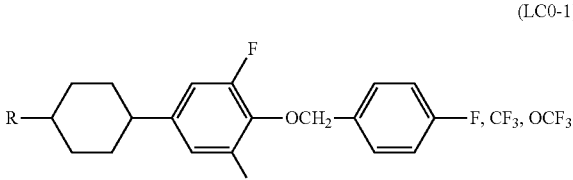
(LC0-3)
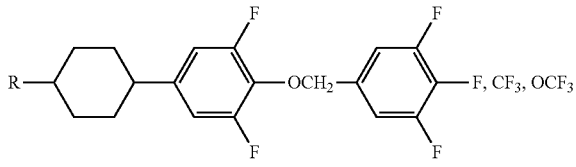
(LC0-4)
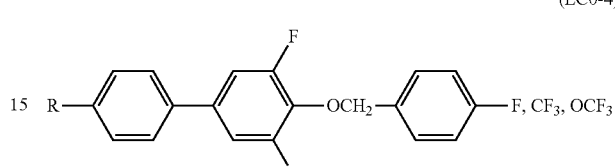
(LC0-5)
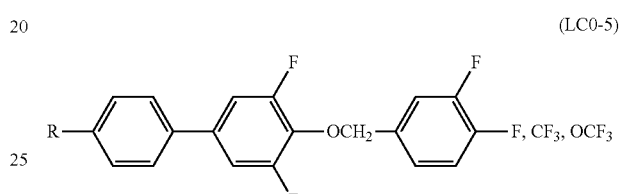
(LC0-6)
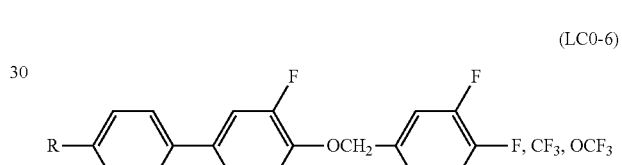
(LC0-7)
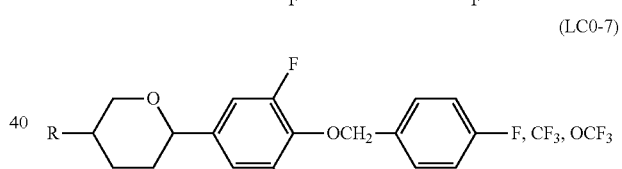
(LC0-8)
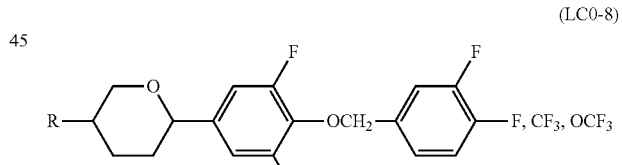
(LC0-9)
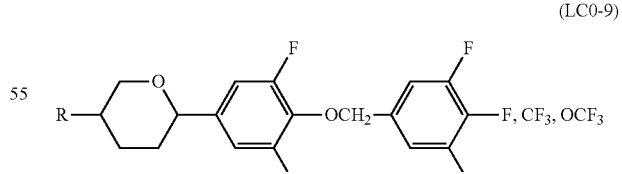
(LC0-10)
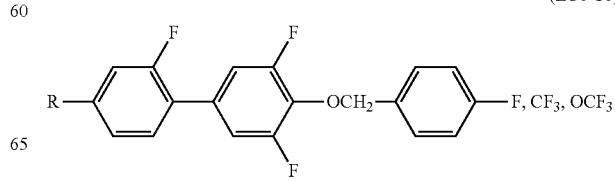

(LC0-11) 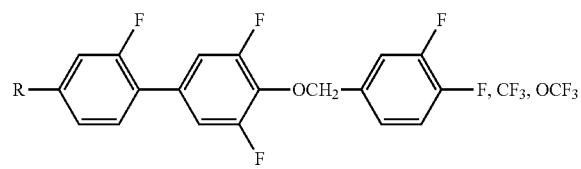
(LC0-12) 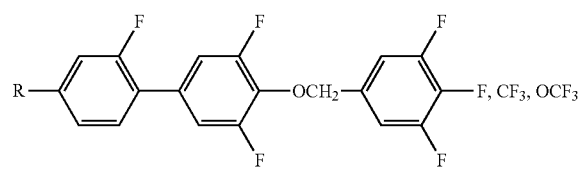
(LC0-13) 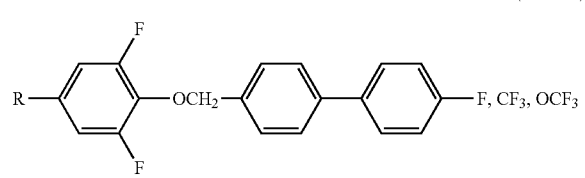
(LC0-14) 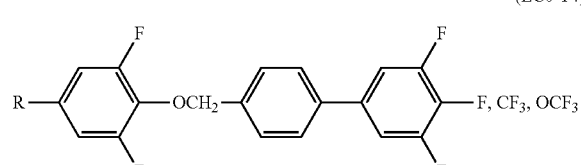
(LC0-15) 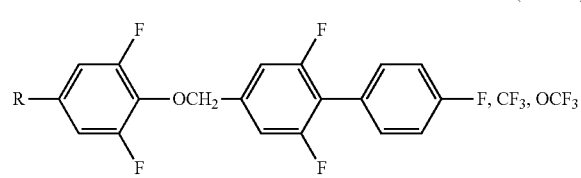
(LC0-16) 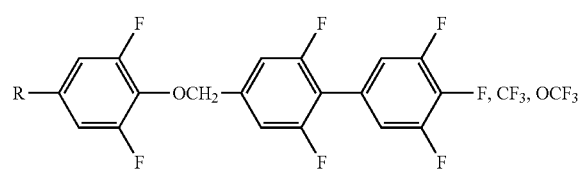
(LC0-17) 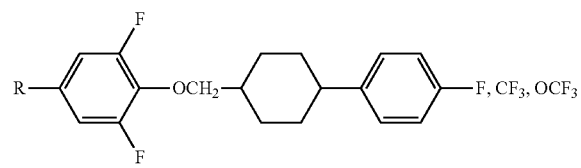
(LC0-18) 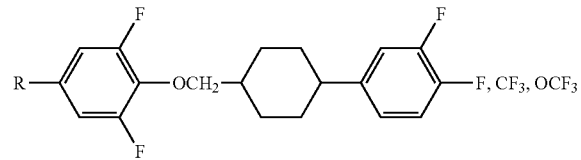
(LC0-19) 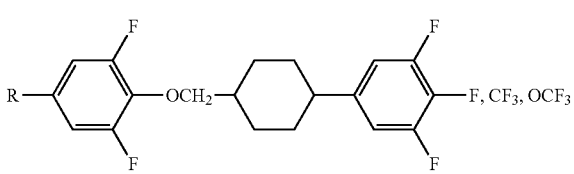
[Chem. 8]
(LC0-20) 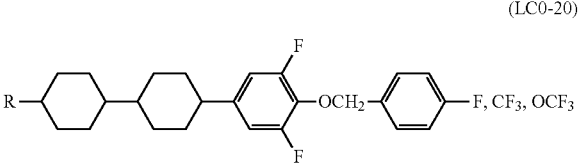
(LC0-21) 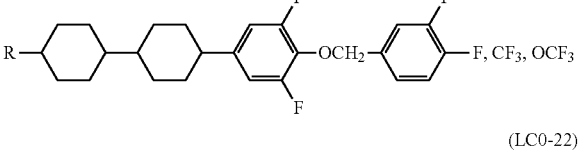
(LC0-22) 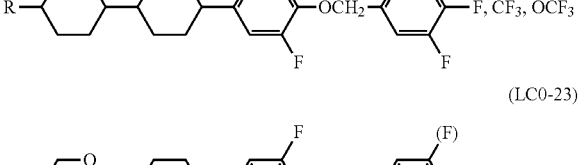
(LC0-23) 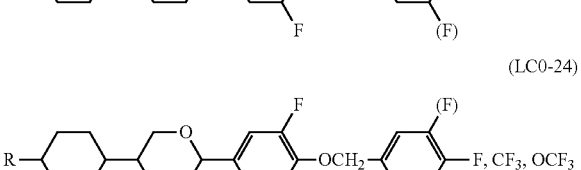
(LC0-24) 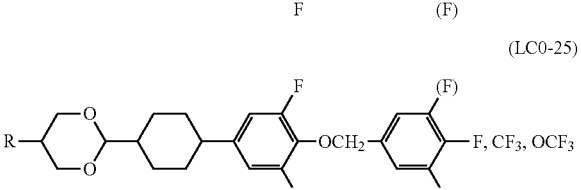
(LC0-25) 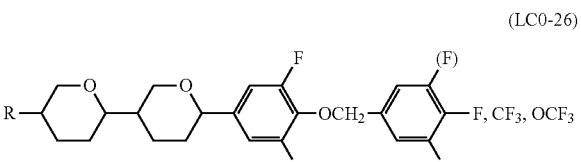
(LC0-26) 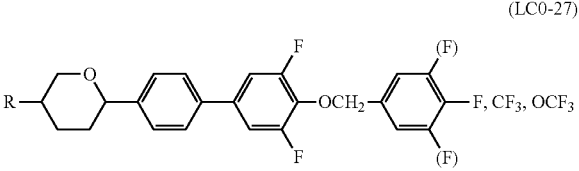
(LC0-27) 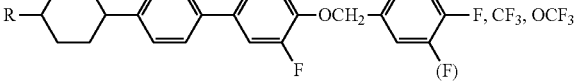

(LC0-28)
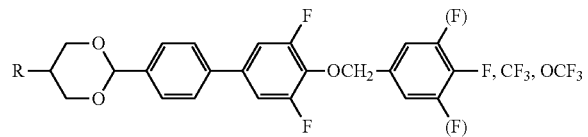
(LC0-29)
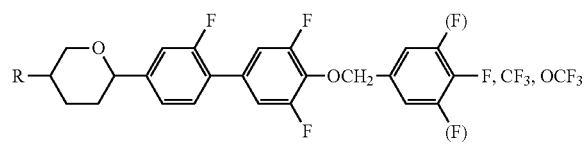
(LC0-30)
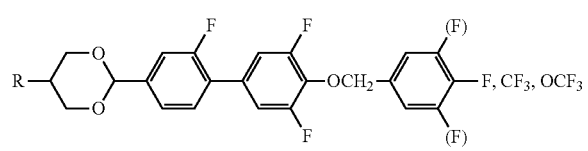
(LC0-31)
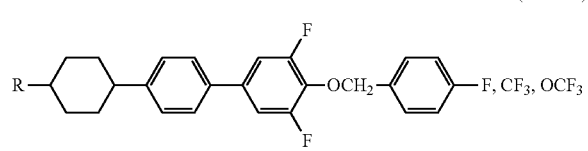
(LC0-32)
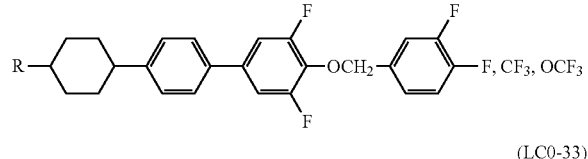
(LC0-33)
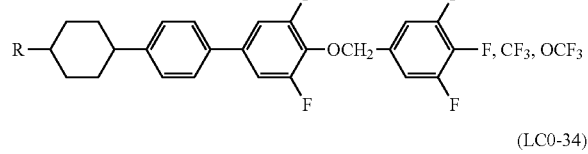
(LC0-34)
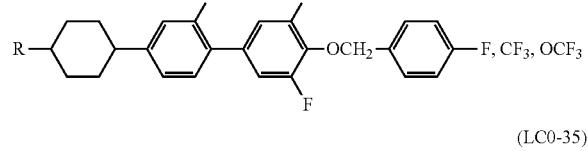
(LC0-35)
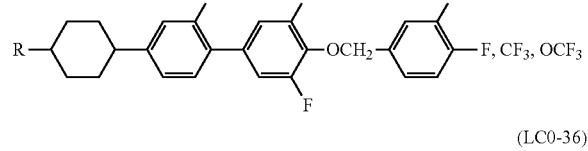
(LC0-36)
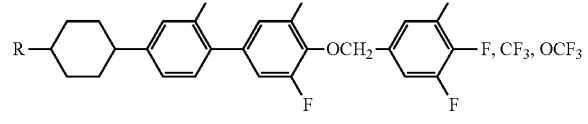
(LC0-37)
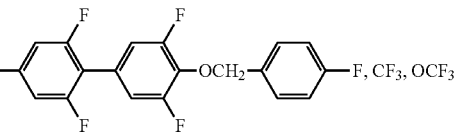
(LC0-38)
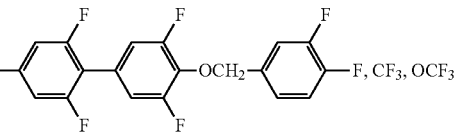
(LC0-39)
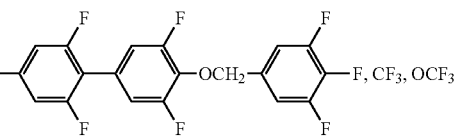
(LC0-40)
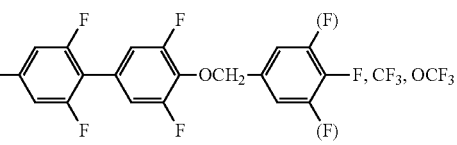
(LC0-41)
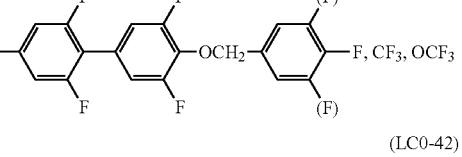
(LC0-42)
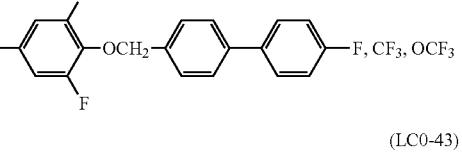
(LC0-43)
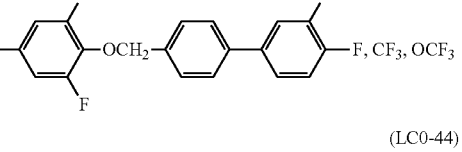
(LC0-44)
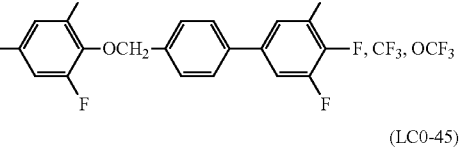
(LC0-45)
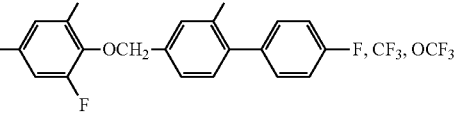

(LC0-46) 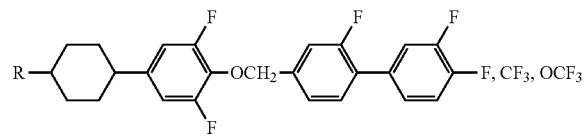
(LC0-47) 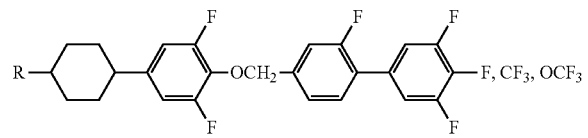
(LC0-48) 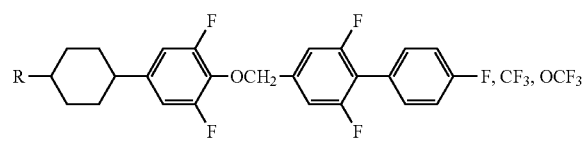
(LC0-49) 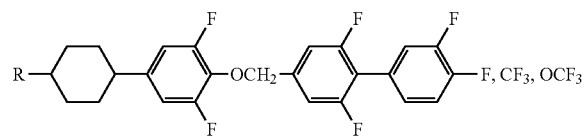
(LC0-50) 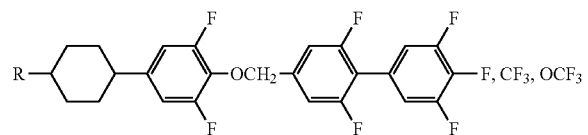
(LC0-51) 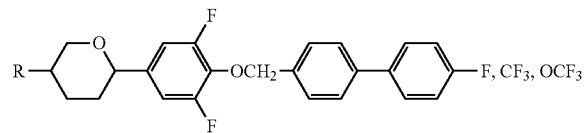
(LC0-52) 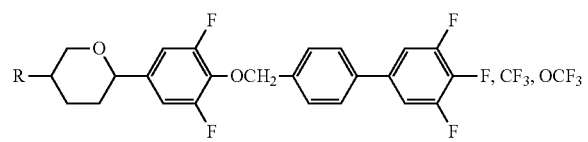
(LC0-53) 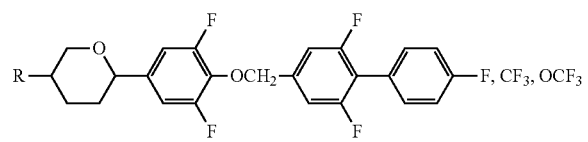
[Chem. 9]
(LC0-54) 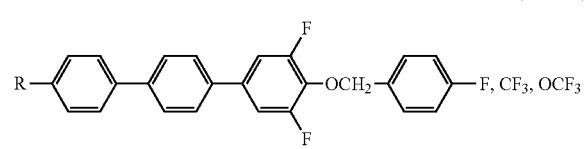
(LC0-55) 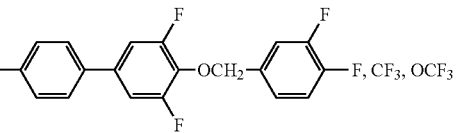
(LC0-56) 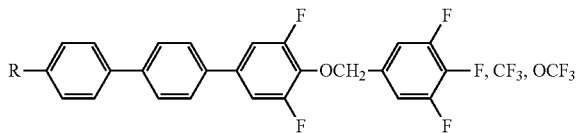
(LC0-57) 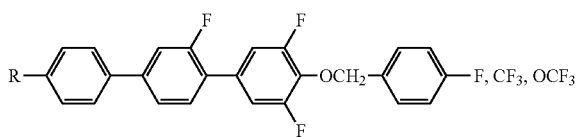
(LC0-58) 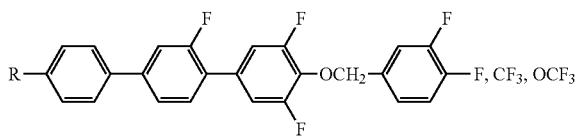
(LC0-59) 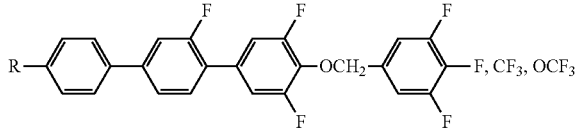
(LC0-60) 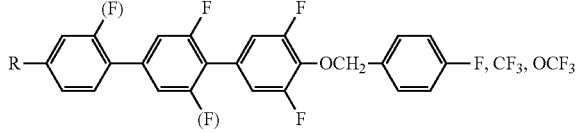
(LC0-61) 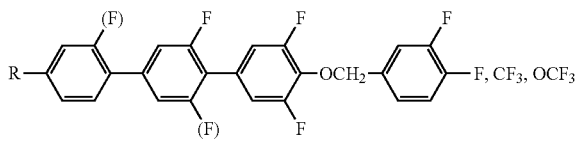
(LC0-62) 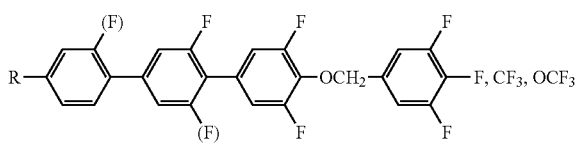
(LC0-63) 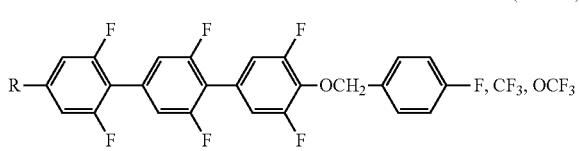

(LC0-64)
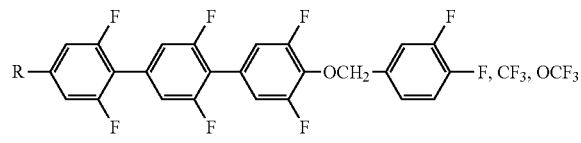
(LC0-65)
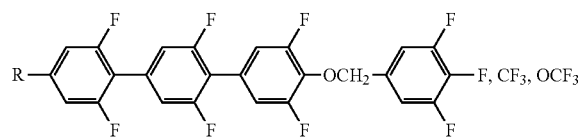
(LC0-66)
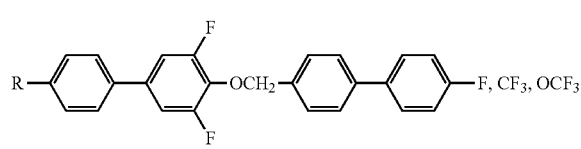
(LC0-67)
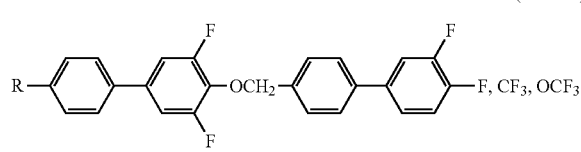
(LC0-68)
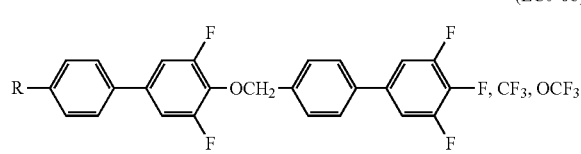
(LC0-69)
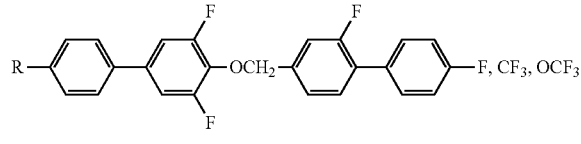
(LC0-70)
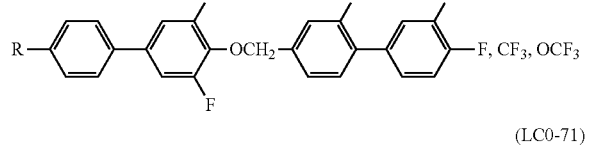
(LC0-71)
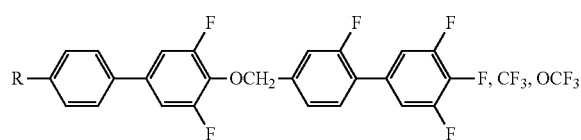
(LC0-72)
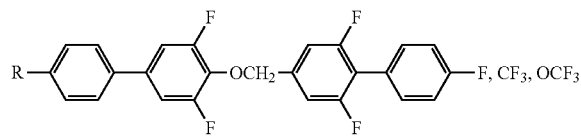
(LC0-73)
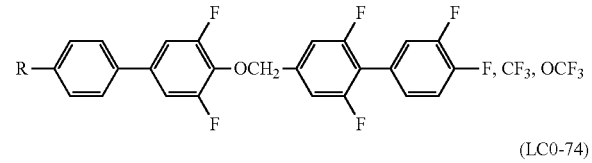
(LC0-74)
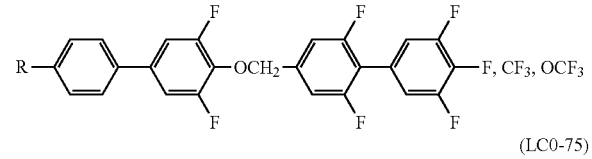
(LC0-75)
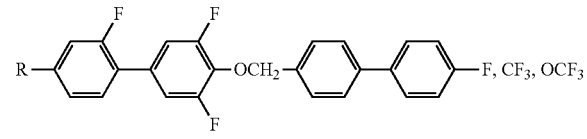
(LC0-76)
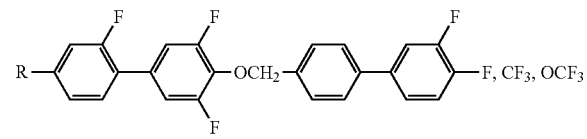
(LC0-77)
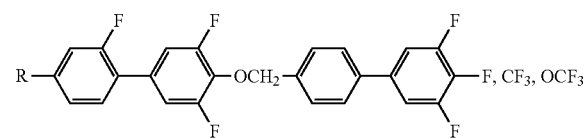
(LC0-78)
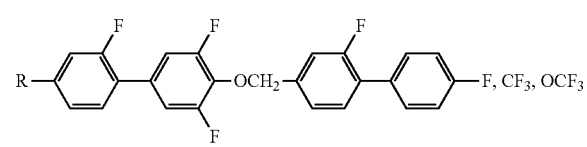
(LC0-79)
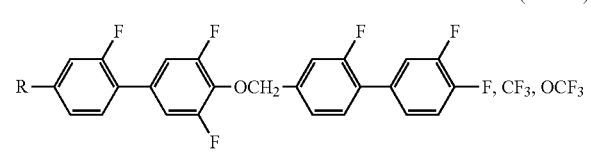
(LC0-80)
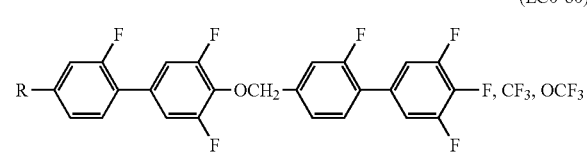
(LC0-81)
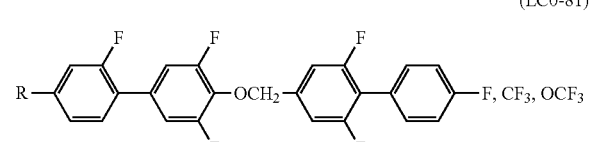
(LC0-82)
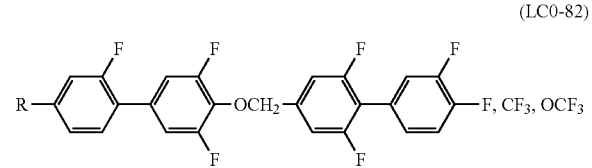

(LC0-83) 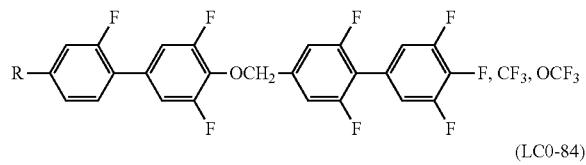
(LC0-84) 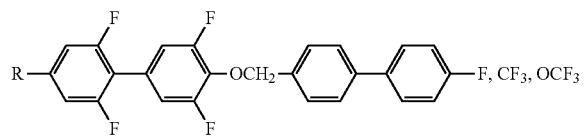
(LC0-85) 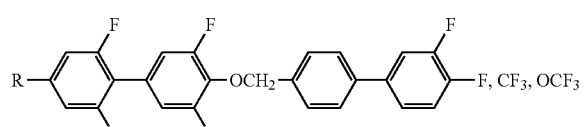
(LC0-86) 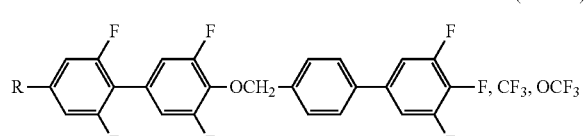
(LC0-87) 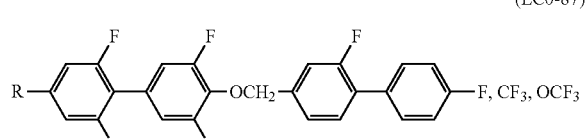
(LC0-88) 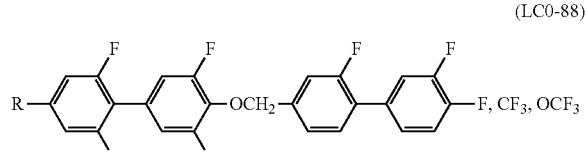
(LC0-89) 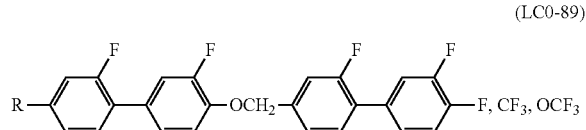
(LC0-90) 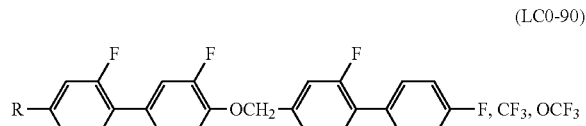
(LC0-91) 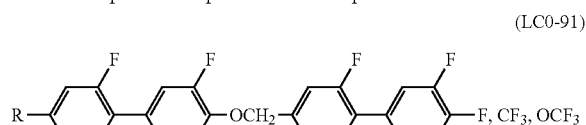
(LC0-92) 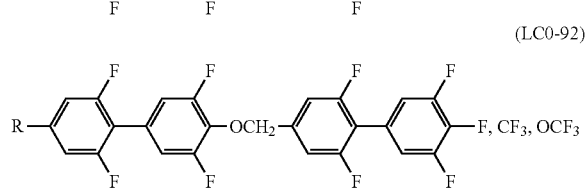
[Chem. 10]
(LC0-93) 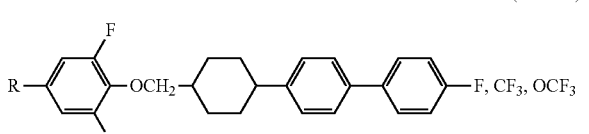
(LC0-94) 
(LC0-95) 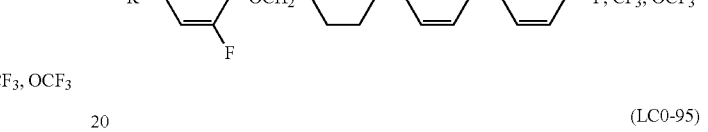
(LC0-96) 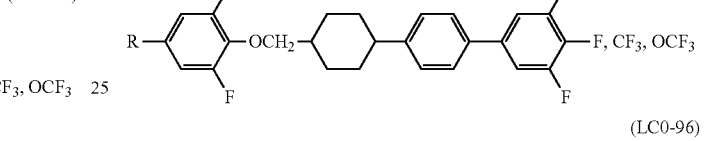
(LC0-97) 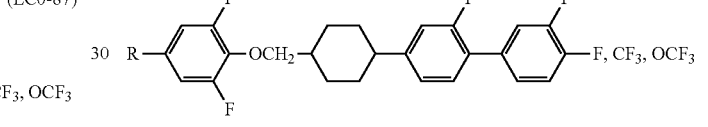
(LC0-98) 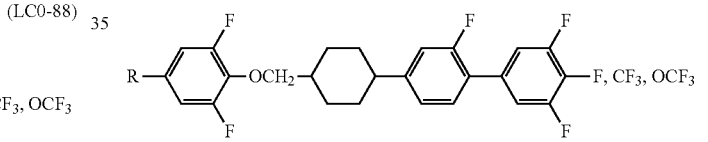
(LC0-99) 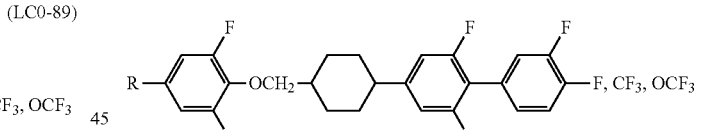
(LC0-100) 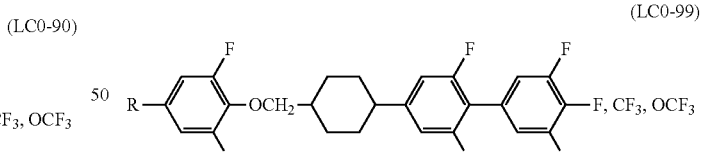
(LC0-101) 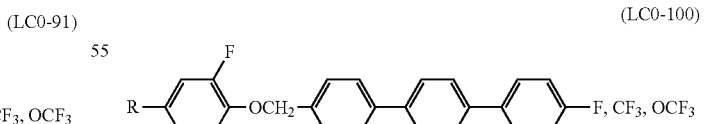

-continued (LC0-102) 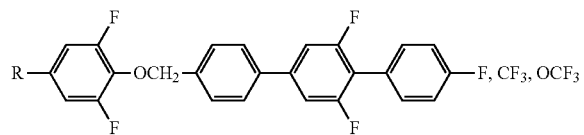

(LC0-103) 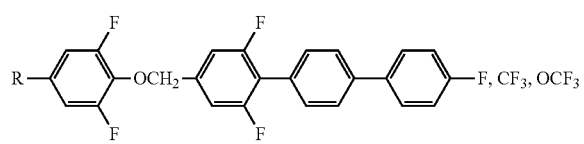

(LC0-104) 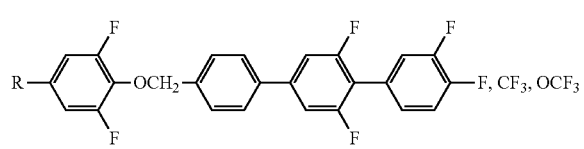

(LC0-105) 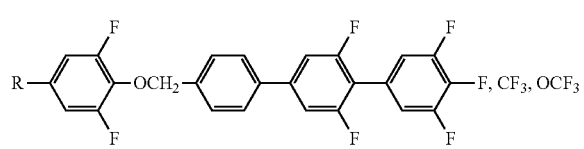

(LC0-106) 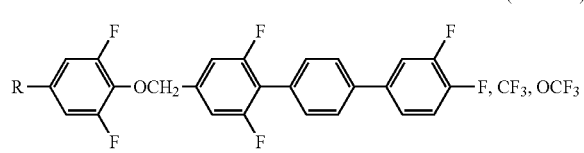

(LC0-107) 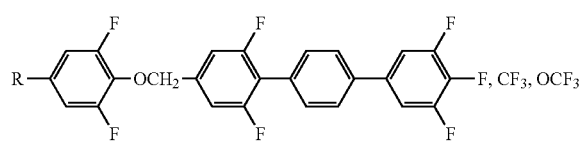

(LC0-108) 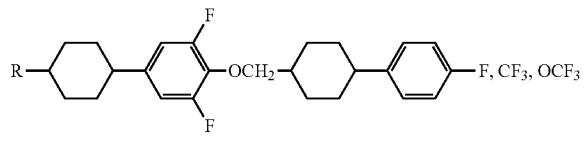

(LC0-109) 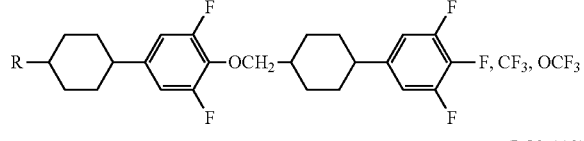

(LC0-110) 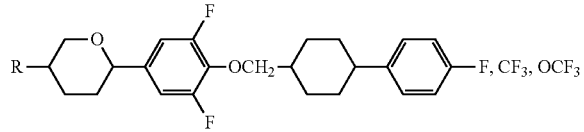

-continued (LC0-111) 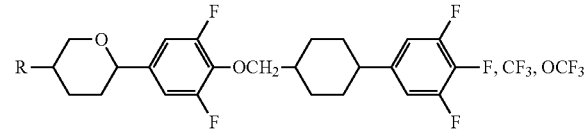

(In the formulae, R is the same as $R^{01}$ in general formula (LC0), "—F,CF$_3$,OCF$_3$" represents —F, CF$_3$, or OCF$_3$, and (—F) represents H or F as a substituent.) The compounds represented by general formula (LC0-1) to general formula (LC0-19) are particularly preferable since they have a high dielectric anisotropy ($\Delta\in$), a notably low viscosity ($\eta$), and good compatibility. The compounds represented by general formula (LC0-20) to general formula (LC0-111) are particularly preferable since they have a large dielectric anisotropy ($\Delta\in$), a relatively low viscosity ($\eta$), and a high nematic phase-isotropic liquid phase transition temperature ($T_{ni}$).

The compound represented by general formula (LC2) is preferably selected from compounds represented by general formula (LC2-1) to general formula (LC2-14).

[Chem. 11]

(LC2-1) 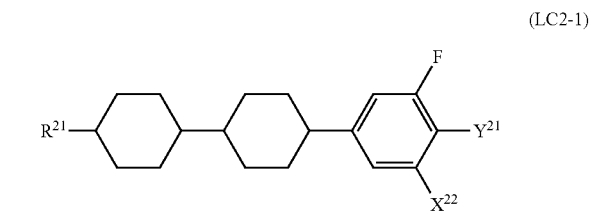

(LC2-2) 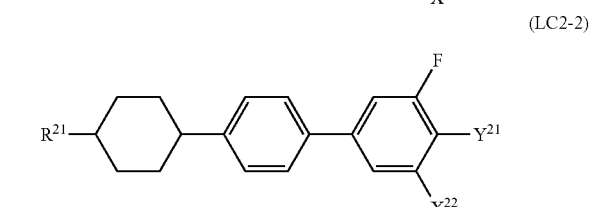

(LC2-3) 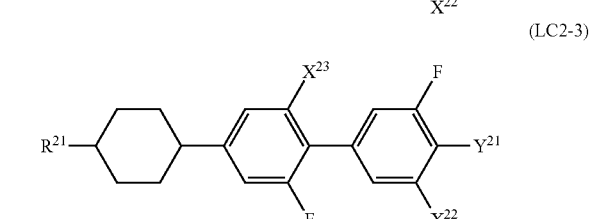

(LC2-4) 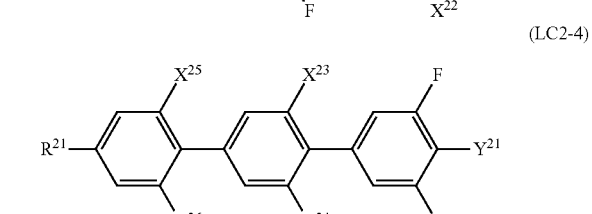

(LC2-5) 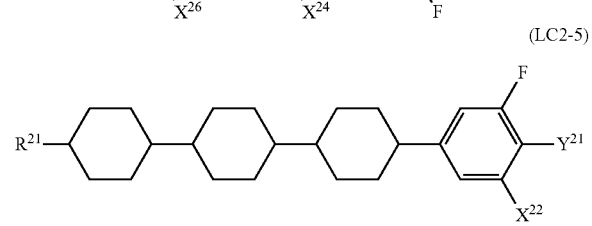

-continued (LC2-6)
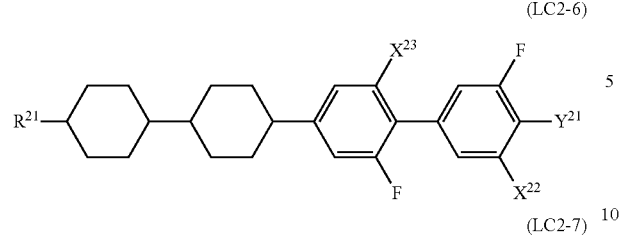

(LC2-7)
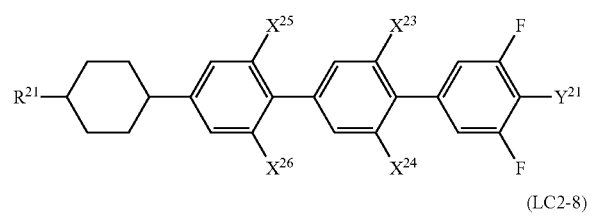

(LC2-8)
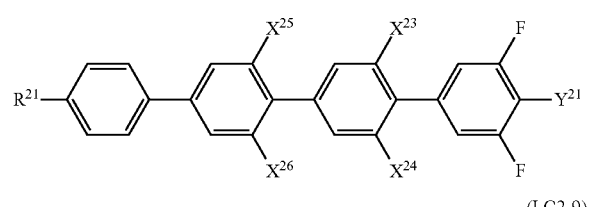

(LC2-9)
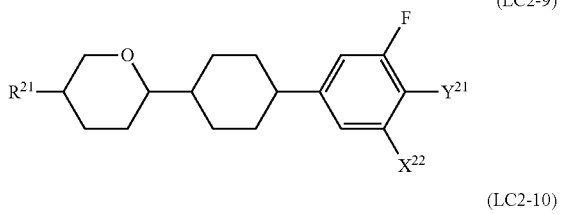

(LC2-10)
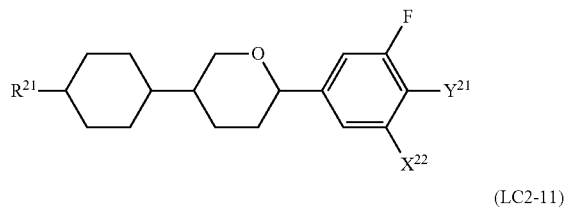

(LC2-11)
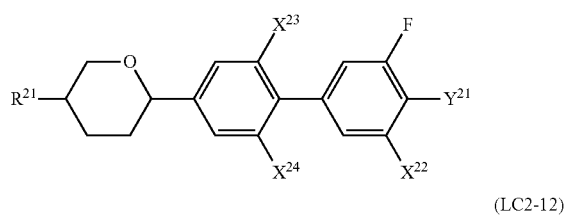

(LC2-12)
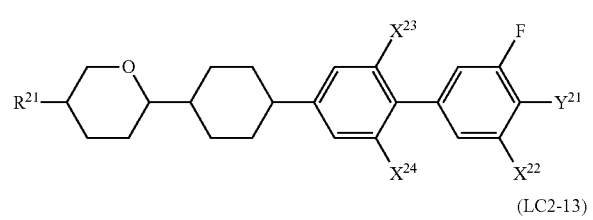

(LC2-13)
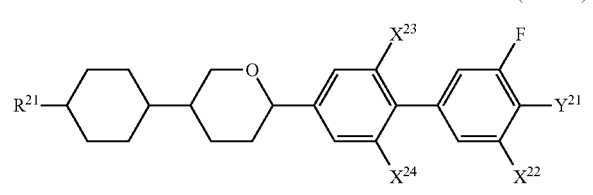

-continued (LC2-14)
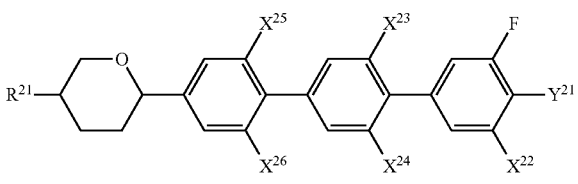

(In the formulae, $X^{23}$, $X^{24}$, $X^{25}$, and $X^{26}$ each independently represent a hydrogen atom, Cl, F, $CF_3$, or $OCF_3$, and $X^{22}$, $R^{21}$, and $Y^{21}$ are the same as those in general formula (LC2).) A compound group represented by general formula (LC2-1) to general formula (LC2-4) and general formula (LC2-9) to general formula (LC2-11) is more preferable.

The compound represented by general formula (LC3) is preferably selected from the compounds represented by general formula (LC3-1) to general formula (LC3-32) below.

[Chem. 12]

(LC3-1)
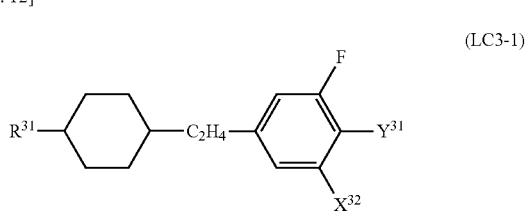

(LC3-2)
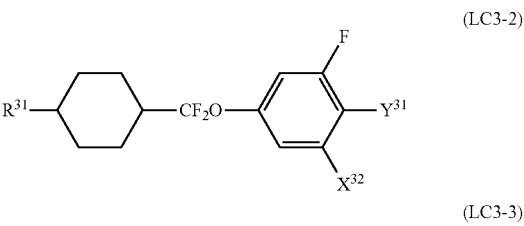

(LC3-3)
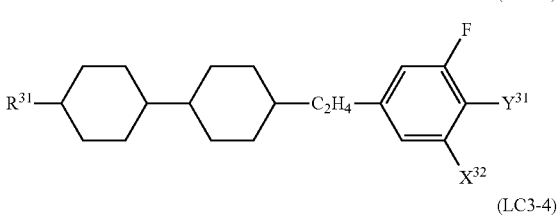

(LC3-4)
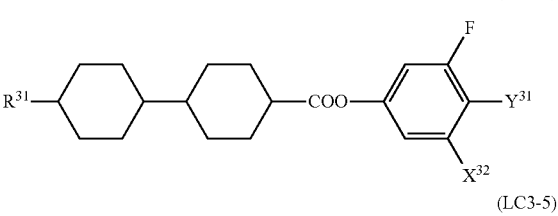

(LC3-5)
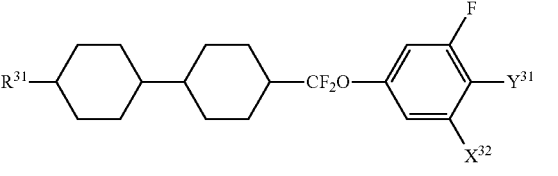

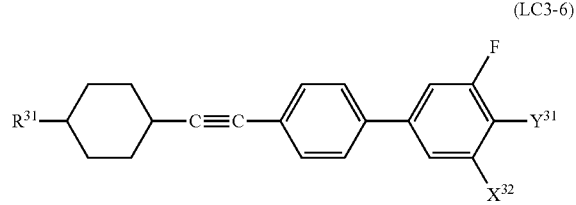
(LC3-6)
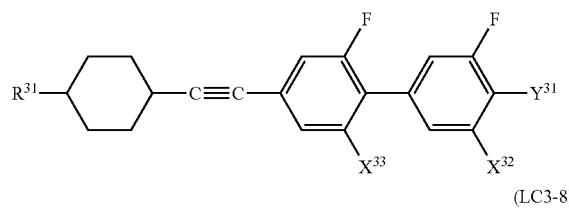
(LC3-7)
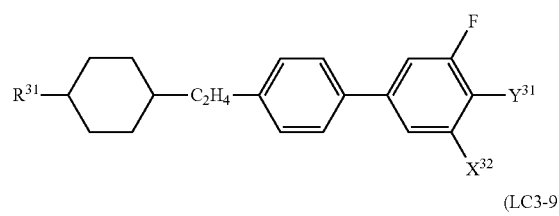
(LC3-8)
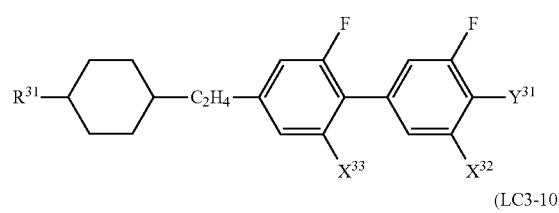
(LC3-9)
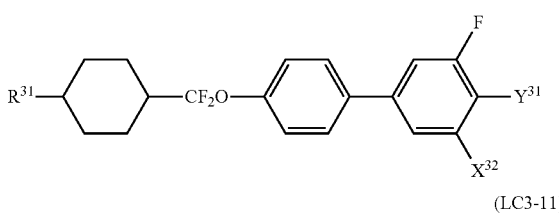
(LC3-10)
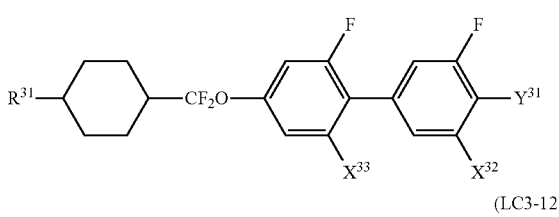
(LC3-11)
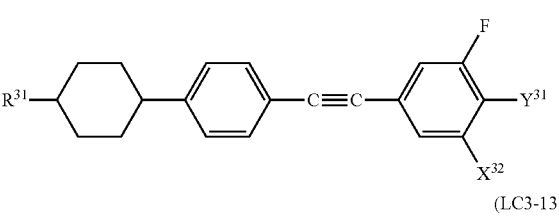
(LC3-12)
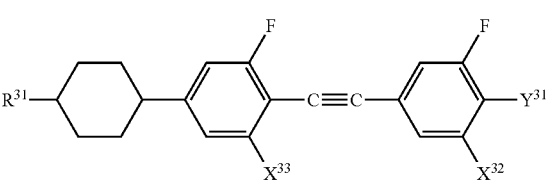
(LC3-13)
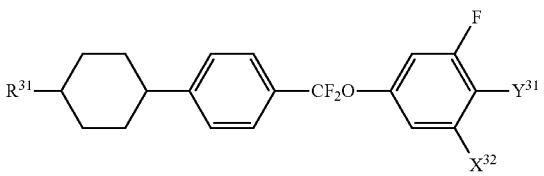
(LC3-14)
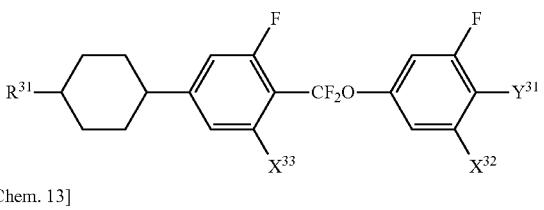
(LC3-15)
[Chem. 13]
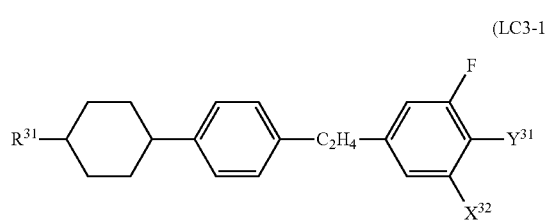
(LC3-16)
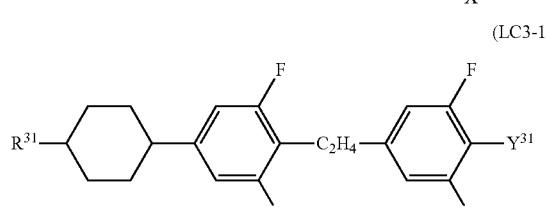
(LC3-17)
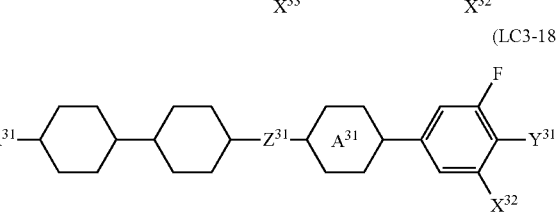
(LC3-18)
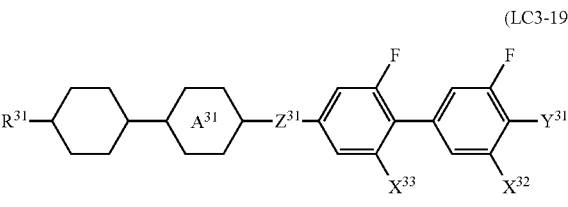
(LC3-19)
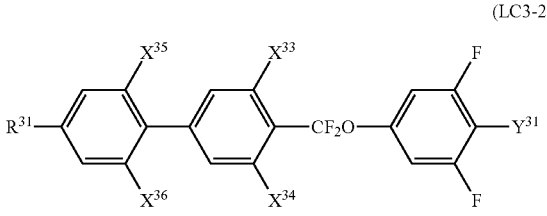
(LC3-20)
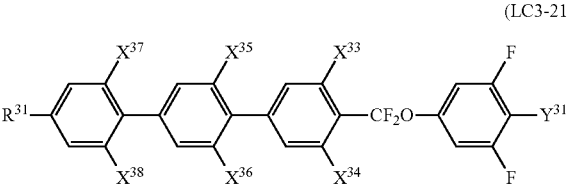
(LC3-21)

(LC3-22)
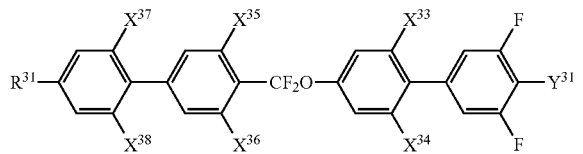

(LC3-23)
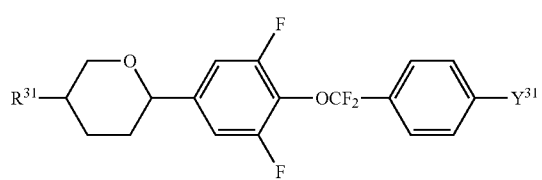

(LC3-24)
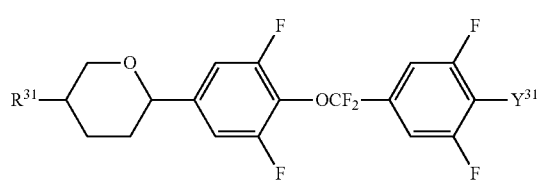

(LC3-25)
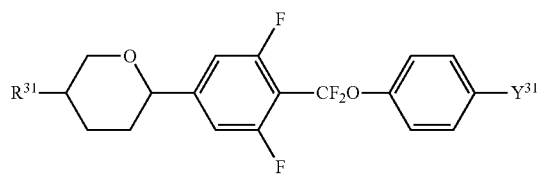

(LC3-26)
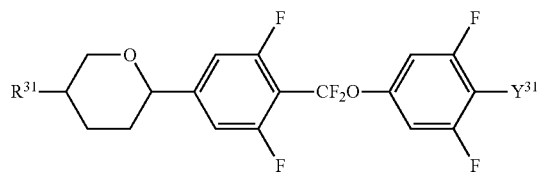

(LC3-27)
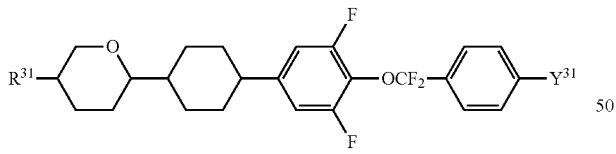

(LC3-28)
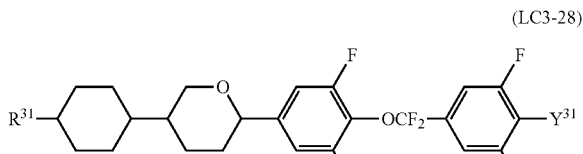

(LC3-29)
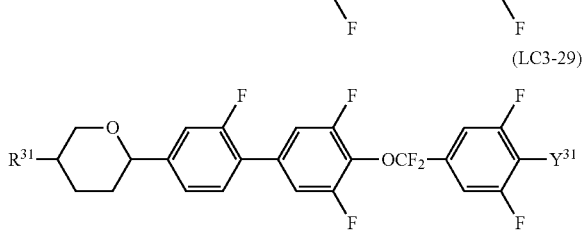

(LC3-30)
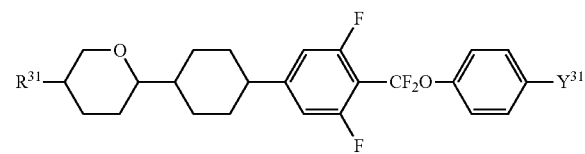

(LC3-31)
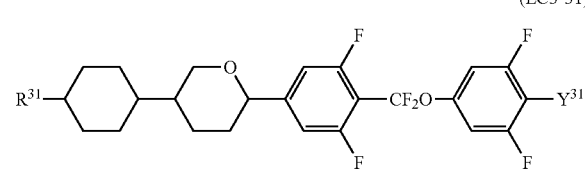

(LC3-32)
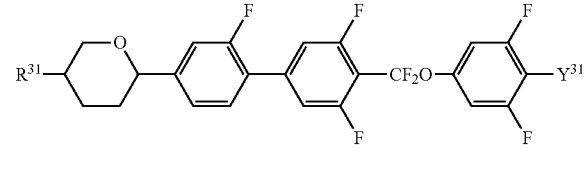

(In the formulae, $X^{33}$, $X^{34}$, $X^{35}$, $X^{36}$, $X^{37}$, and $X^{38}$ each independently represent H, Cl, F, $CF_3$, or $OCF_3$, and $X^{32}$, $R^{31}$, $A^{31}$, $Y^{31}$, and $Z^{31}$ are the same as those in general formula (LC3).) Of these, a compound group represented by general formula (LC3-5), general formula (LC3-15), and general formulae (LC3-20) to (LC3-32) is more preferably used in combination with the essential component of the invention represented by general formula (LC0). More preferably, a compound selected from a compound group represented by general formula (LC3-20) and general formula (LC3-21) with $X^{33}$ and $X^{34}$ representing F and/or a compound group represented by general formula (LC3-25), general formula (LC3-26), and general formulae (LC3-30) to (LC3-32) is more preferably used in combination with the essential component of the invention represented by general formula (LC0).

The compound represented by general formula (LC4) is preferably selected from the compounds represented by general formula (LC4-1) to general formula (LC4-23) below:

[Chem. 14]

(LC4-1)
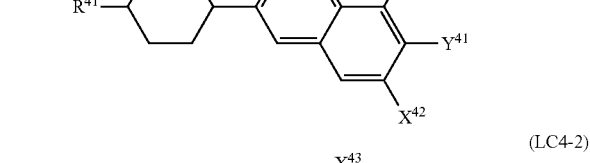

(LC4-2)
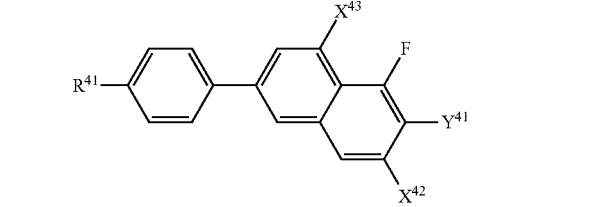

(LC4-3) 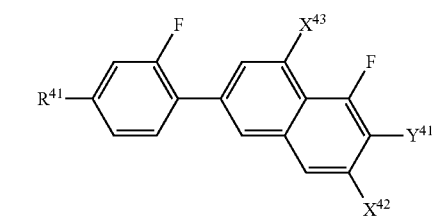
(LC4-4) 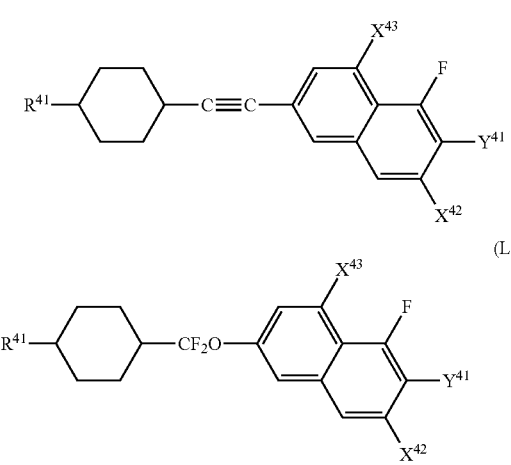
(LC4-5)
(LC4-6)
(LC4-7) 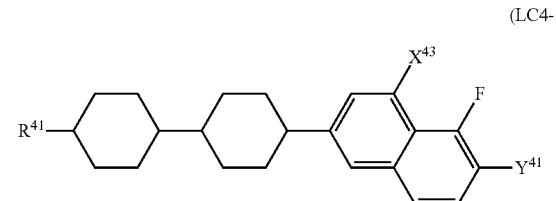
(LC4-8) 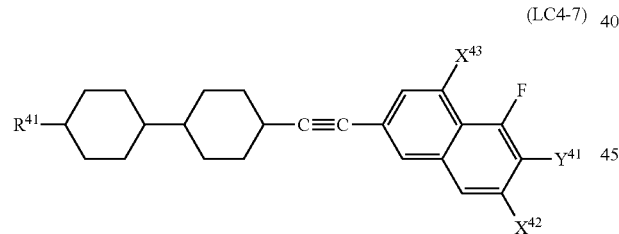
(LC4-9) 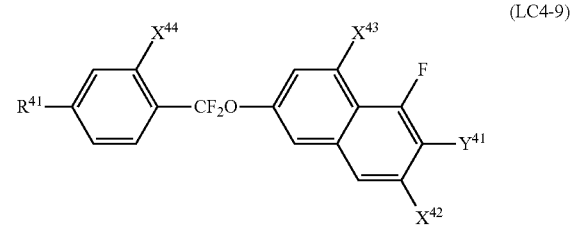
(LC4-10) 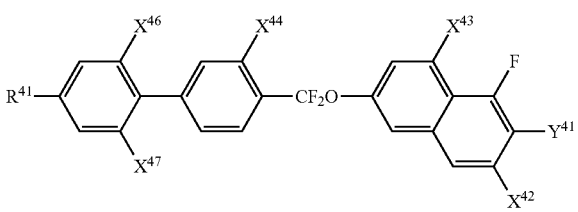
(LC4-11) 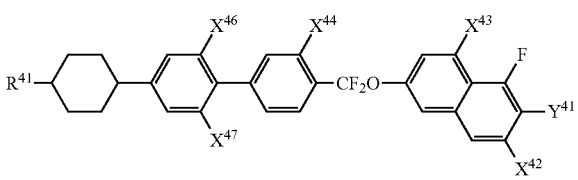
[Chem. 15]
(LC4-12) 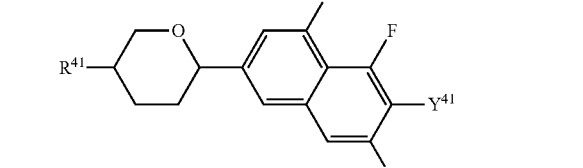
(LC4-13) 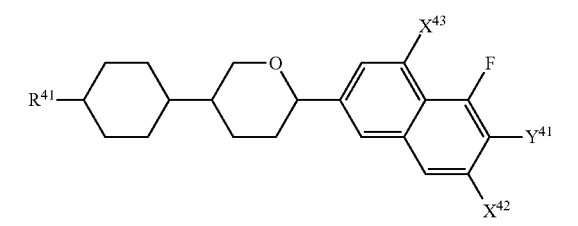
(LC4-14) 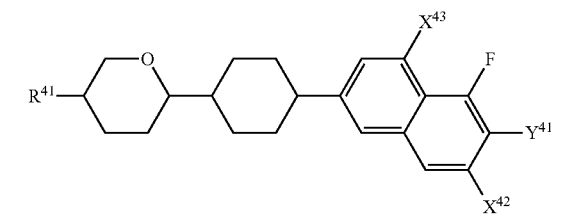
(LC4-15) 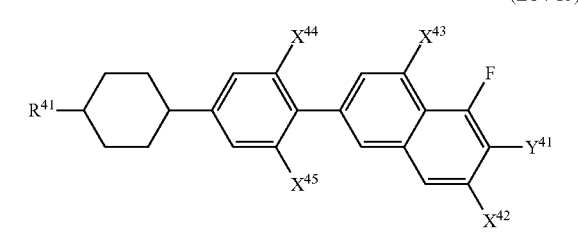

-continued (LC4-16)
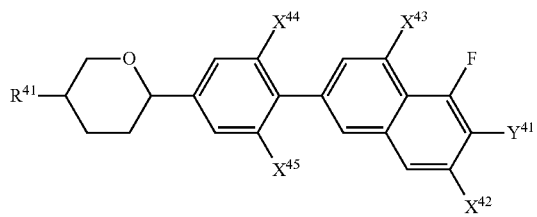

(LC4-17)
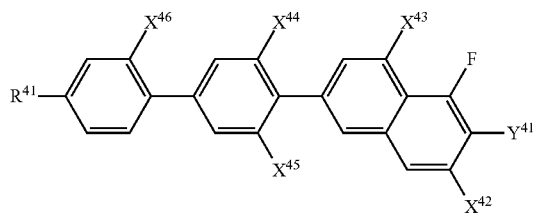

(LC4-18)
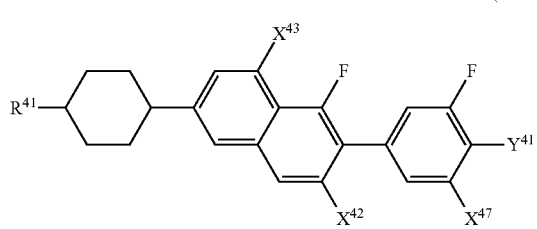

(LC4-19)
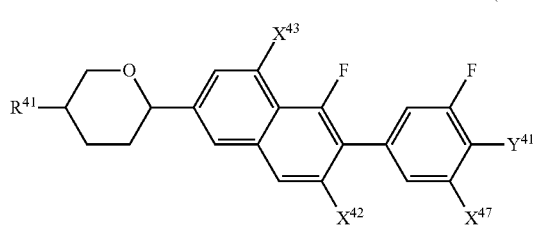

(LC4-20)
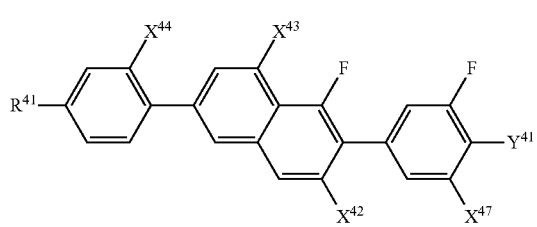

(LC4-21)
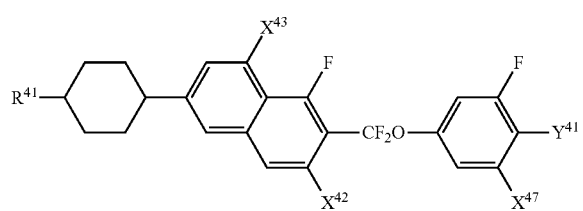

-continued (LC4-22)
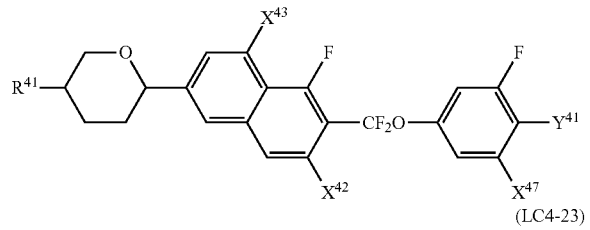

(LC4-23)
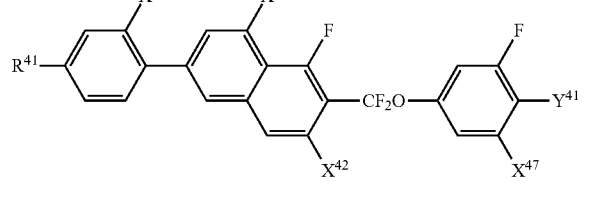

(In the formulae, $X^{44}$, $X^{45}$, $X^{46}$, and $X^{47}$ each independently represent H, Cl, F, $CF_3$, or $OCF_3$, and $X^{42}$, $X^{43}$, $R^{41}$, and $Y^{41}$ are the same as those in general formula (LC4).)

Among these, a compound group represented by general formula (LC4-1) to general formula (LC4-3), general formula (LC4-6), general formula (LC4-9), general formula (LC4-10), and general formula (LC4-12) to general formula (LC4-17) is preferably used in combination with the essential component of the present invention represented by general formula (LC0). More preferably, a compound selected from a compound group represented by general formula (LC4-9) to general formula (LC4-11) and general formula (LC4-15) to general formula (LC4-17) with $X^{44}$ and/or $X^{45}$ representing F is used in combination with the essential component of the invention represented by general formula (LC0).

The compound represented by general formula (LC5) is preferably selected from compounds represented by general formula (LC5-1) to general formula (LC5-26) below:

[Chem. 16]

(LC5-1)
$R^{51}$—⬡—⬡—$R^{52}$ (LC5-2)
$R^{51}$—⬡—◯—$R^{52}$ (LC5-3)
$R^{51}$—◯—◯—$R^{52}$ (LC5-4)
$R^{51}$—⬡—⬡—◯—$R^{52}$ (LC5-5)
$R^{51}$—⬡—◯—◯—$R^{52}$ (LC5-6)
$R^{51}$—◯—◯—◯—$R^{52}$ (LC5-7)
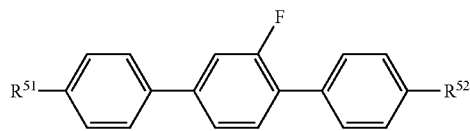
(LC5-8)
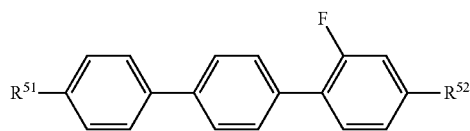
(LC5-9)
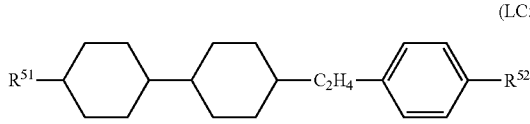
(LC5-10)
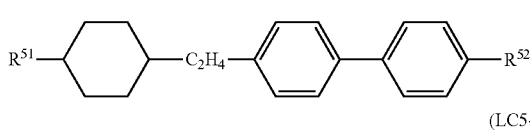
(LC5-11)
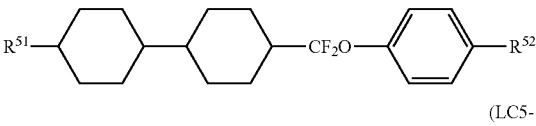
(LC5-12)
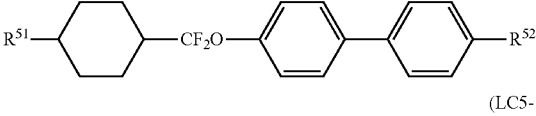
(LC5-13)
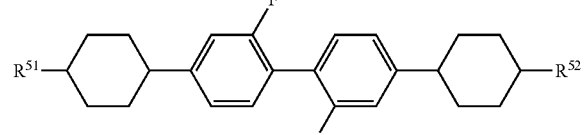
(LC5-14)
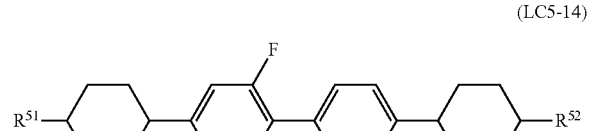
(LC5-15)
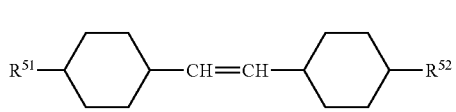
(LC5-16)
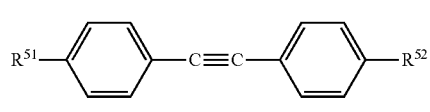
(LC5-17)
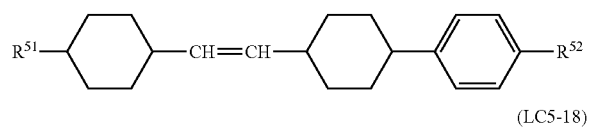
(LC5-18)
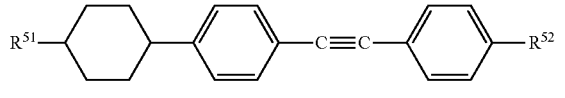
(LC5-19)
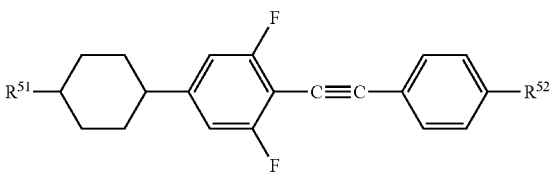
(LC5-20)
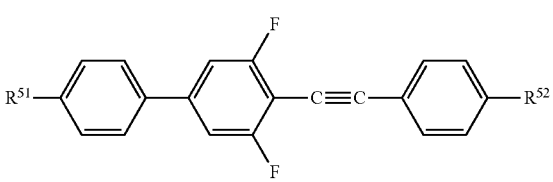
(LC5-21)
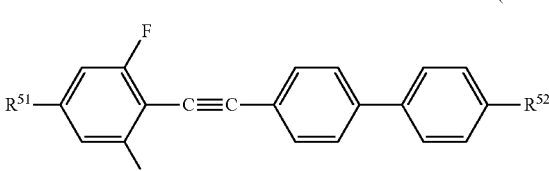
(LC5-22)
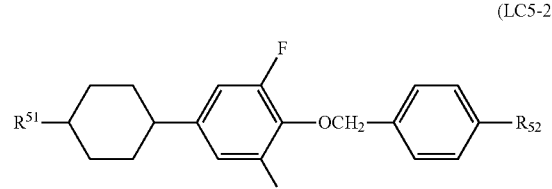
(LC5-23)
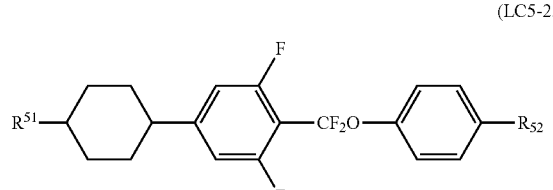
(LC5-24)
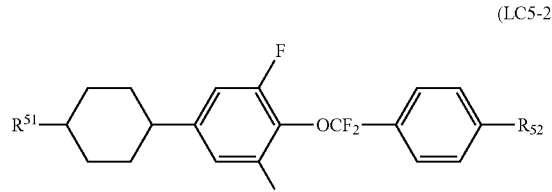
(LC5-25)
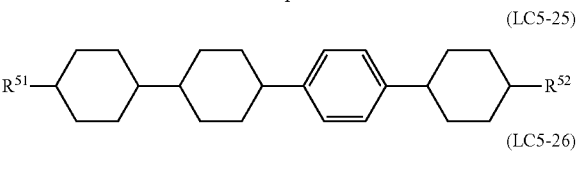
(LC5-26)
(In formulae, $R^{51}$ and $R^{52}$ are the same as those in general formula (LC5).) Of these, a compound group represented by general formula (LC5-1) to general formula (LC5-8), general formula (LC5-14), general formula (LC5-16), and general formula (LC5-18) to general formula (LC5-26) is preferably used in combination with the essential component of the invention represented by general formula (LC0). A compound group in which at least one of $R^{51}$ and $R^{52}$ in general formula (LC5-1) and general formula (LC5-4) represents an alkenyl group is preferable and particularly preferably, the alkyl group is one of those represented by formulae (R1) to (R5) below:

[Chem. 17]

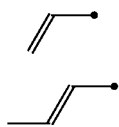

(R1)

(R2)

[Chem. 18]

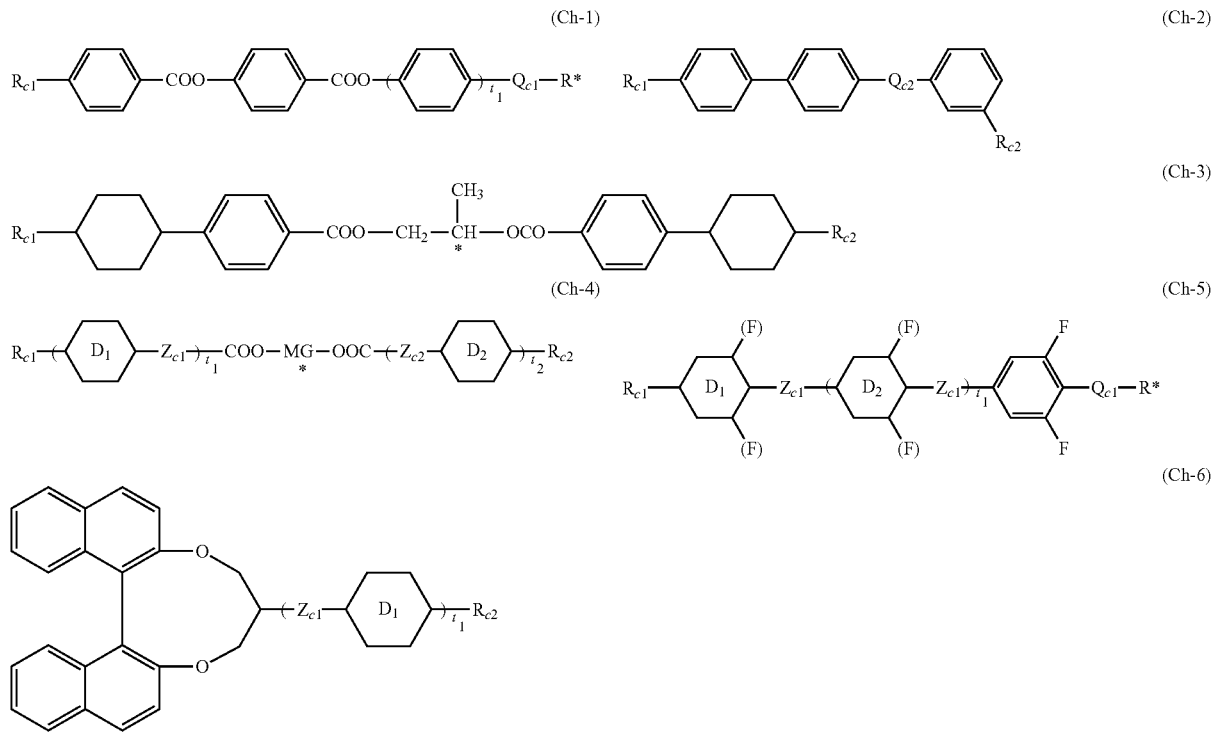

-continued

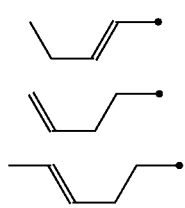

(R3)

(R4)

(R5)

One or more compounds represented by general formula (LC5) are preferably contained. The content is preferably 20% to 70% by mass and more preferably 30% to 70% by mass.

The liquid crystal composition of the invention preferably has a viscosity η of 20 mPa·s or less at 20° C.

The liquid crystal composition of the present invention may contain one or more optically active compounds. Any optically active compounds capable of having liquid crystal molecules twisted and oriented can be used. Usually, since twisting changes with temperature, two or more optically active compounds can be used to achieve the desired temperature dependency. In order not to adversely affect the temperature range of the nematic liquid crystal phase, viscosity, and the like, optically active compounds that have strong twisting effects are preferably selected and used. Examples of such optically active compounds include liquid crystals such as cholesteric nonanate and compounds represented by general formula (Ch-1) to general formula (Ch-6) below:

(In the formulae, $R_{c1}$, $R_{c2}$, and R* each independently represent an alkyl group having 1 to 15 carbon atoms, one or more —$CH_2$— in the alkyl group may be substituted with —O—, —CH=CH—, —CO—, —OCO—, —COO—, —C≡C—, —$CF_2$O—, or —O$CF_2$— so that oxygen atoms are not directly adjacent to each other, and one or more hydrogen atoms in the alkyl group may be substituted with a halogen; R* contains at least one optically active branched chain group or a halogen substituent; $Z_{c1}$ and $Z_{c2}$ each independently represent a singe bond, —CH=CH—, —C≡C—, —$CH_2CH_2$—, —$(CH_2)_4$—, —COO—, —OCO—, —O$CH_2$—, —$CH_2$O—, —O$CF_2$—, or —$CF_2$O—; $D_1$ and $D_2$ each represent a cyclohexane ring or a benzene ring; one or more —$CH_2$— in the cyclohexane ring may be substituted with —O— so that oxygen atoms are not directly adjacent to each other and one or more —$CH_2CH_2$— in the cyclohexane ring may be substituted with —CH=CH—, —$CF_2$O—, or —OCF$_2$—; one or more —CH= in the benzene ring may be substituted with —N= so that nitrogen atoms are not directly adjacent to each other and one or more hydrogen atoms in the benzene ring may be substituted with F, Cl, or CH$_3$; t$_1$ and t$_2$ represents 0, 1, 2, or 3; and MG*, Q$_{c1}$, and Q$_{c2}$ each represent a structure below:

[Chem. 19]

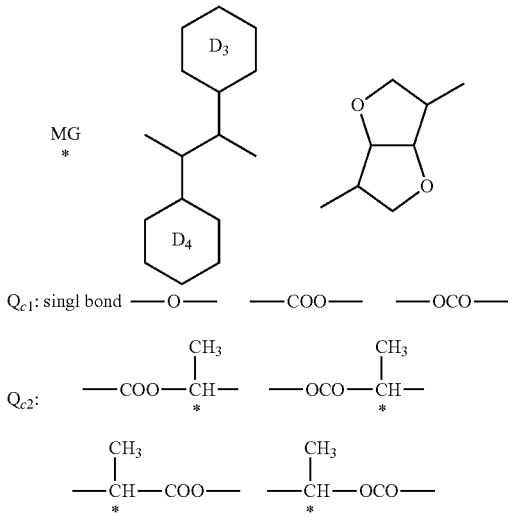

(In the formulae, D$_3$ and D$_4$ each represent a cyclohexane ring or a benzene ring, one or more —CH$_2$— in the cyclohexane ring may be substituted with —O— so that oxygen atoms are not directly adjacent to each other, one or more —CH$_2$CH$_2$— in the cyclohexane ring may be substituted with —CH=CH—, —CF$_2$O—, or —OCF$_2$—, one or more —CH= in the benzene ring may be substituted with —N= so that nitrogen atoms are not directly adjacent to each other, and one or more hydrogen atoms in the benzene ring may be substituted with F, Cl, or CH$_3$.)

The liquid crystal composition of the invention may contain one or more polymerizable compounds. Each polymerizable compound is preferably a disk-shaped liquid crystal compound having a structure in which the scaffold at the center of a molecule is a benzene derivative, triphenylene derivative, a truxene derivative, a phthalocyanine derivative, or a cyclohexane derivative and linear alkyl groups, linear alkoxy groups, or substituted benzoyloxy groups are substituted in side chains of the scaffold in a radial manner.

In particular, the polymerizable compound is preferably a polymerizable compound represented by general formula (PC):

[Chem. 20]

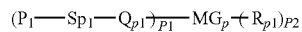
(PC)

(In the formula, P$_1$ represents a polymerizable functional group, Sp$_1$ represents a spacer group having 0 to 20 carbon atoms, Q$_{p1}$ represents a single bond, —O—, —NH—, —NH-COO—, —OCONH—, —CH=CH—, —CO—, —COO—, —OCO—, —OCOO—, —OOCO—, —CH=CH—, —CH=CH—COO—, —OCO—CH=CH—, or —C≡C—, p$_1$ and p$_2$ each independently represent 1, 2, or 3, MG$_p$ represents a mesogen group or a mesogenic supporting group, and R$_{p1}$ represents a halogen atom, a cyano group, or an alkyl group having 1 to 25 carbon atoms where one or more CH$_2$ groups in the alkyl group may be substituted with —O—, —S—, —NH—, —N(CH$_3$)—, —CO—, —COO—, —OCO—, —OCOO—, —SCO—, —COS—, or —C≡C— so that oxygen atoms are not directly adjacent to each other, or R$_{p1}$ may be P$_2$-Sp$_2$-Q$_{p2}$- where P$_2$, Sp$_2$, and Q$_{p2}$ are independently respectively the same as P$_1$, Sp$_1$, and Q$_{p1}$.)

More preferably, MG$_p$ in the polymerizable compound general formula (PC) is represented by the following structure:

[Chem. 21]

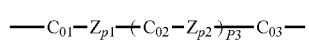

(In the formulae, C$_{01}$ to C$_{03}$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, or a fluorene 2,7-diyl group; the 1,4-phenylene group, the 1,2,3,4-tetrtahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanethrene 2,7-diyl group, and the fluorene 2,7-diyl group may each have, as a substituent or substituents, at least one F, Cl, CF$_3$, OCF$_3$, cyano group, alkyl group having 1 to 8 carbon atoms, alkoxy group, alkanoyl group, alkanoyloxy group, alkenyl group having 2 to 8 carbon atoms, alkenyloxy group, alkenoyl group, or alkenoyloxy group; Z$_{p1}$ and Z$_{p2}$ each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, or a single bond; and p$_3$ represents 0, 1, or 2.)

When Sp$_1$ and Sp$_2$ are each independently an alkylene group, this alkylene group may be substituted with at least one halogen atom or CN and one or more CH$_2$ groups contained in this group may be substituted with —O—, —S—, —NH—, —N(CH$_3$)—, —CO—, —COO—, —OCO—, —OCOO—, —SCO—, —COS—, or —C≡C— so that oxygen atoms are not directly adjacent to each other. P$_1$ and P$_2$ preferably each independently represent one of the following general formulae:

[Chem. 22]

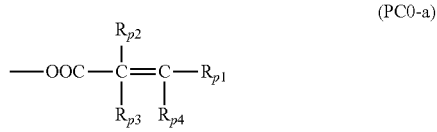
(PC0-a)

-continued (PC0-b)
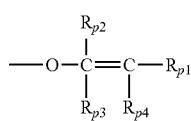

(PC0-c)
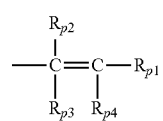

(PC0-d)
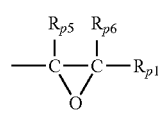

(In the formulae, $R_{p2}$ to $R_{p6}$ each independently represent a hydrogen atom, a halogen atom, or an alkyl group having 1 to 5 carbon atoms.)

More specifically, the polymerizable compound represented by general formula (PC) is preferably polymerizable compounds represented by general formula (PC0-1) to general formula (PC0-6):

[Chem. 23]

$$(P_1-Sp_1-Q_{p1})_{\overline{p_1}}MG_p-(Q_{p2}-Sp_2-P_2)_{p_4} \quad (PC0\text{-}1)$$

$$(P_1-Q_{p1})_{\overline{p_1}}MG_p-(Q_{p2}-P_2)_{p_4} \quad (PC0\text{-}2)$$

$$P_1-Sp_1-Q_{p1}-MG_p-Q_{p2}-Sp_2-P_2 \quad (PC0\text{-}3)$$

$$P_1-Q_{p1}-MG_p-Q_{p2}-P_2 \quad (PC0\text{-}4)$$

$$P_1-Sp_1-Q_{p1}-MG_p-R_{p1} \quad (PC0\text{-}5)$$

$$P_1-Q_{p1}-MG_p-R_{p1} \quad (PC0\text{-}6)$$

(In the formulae, $p_4$ each independently represents 1, 2, or 3.)

More specifically, polymerizable compounds represented by general formula (PC1-1) to general formula (PC1-9) are preferable:

[Chem. 24]

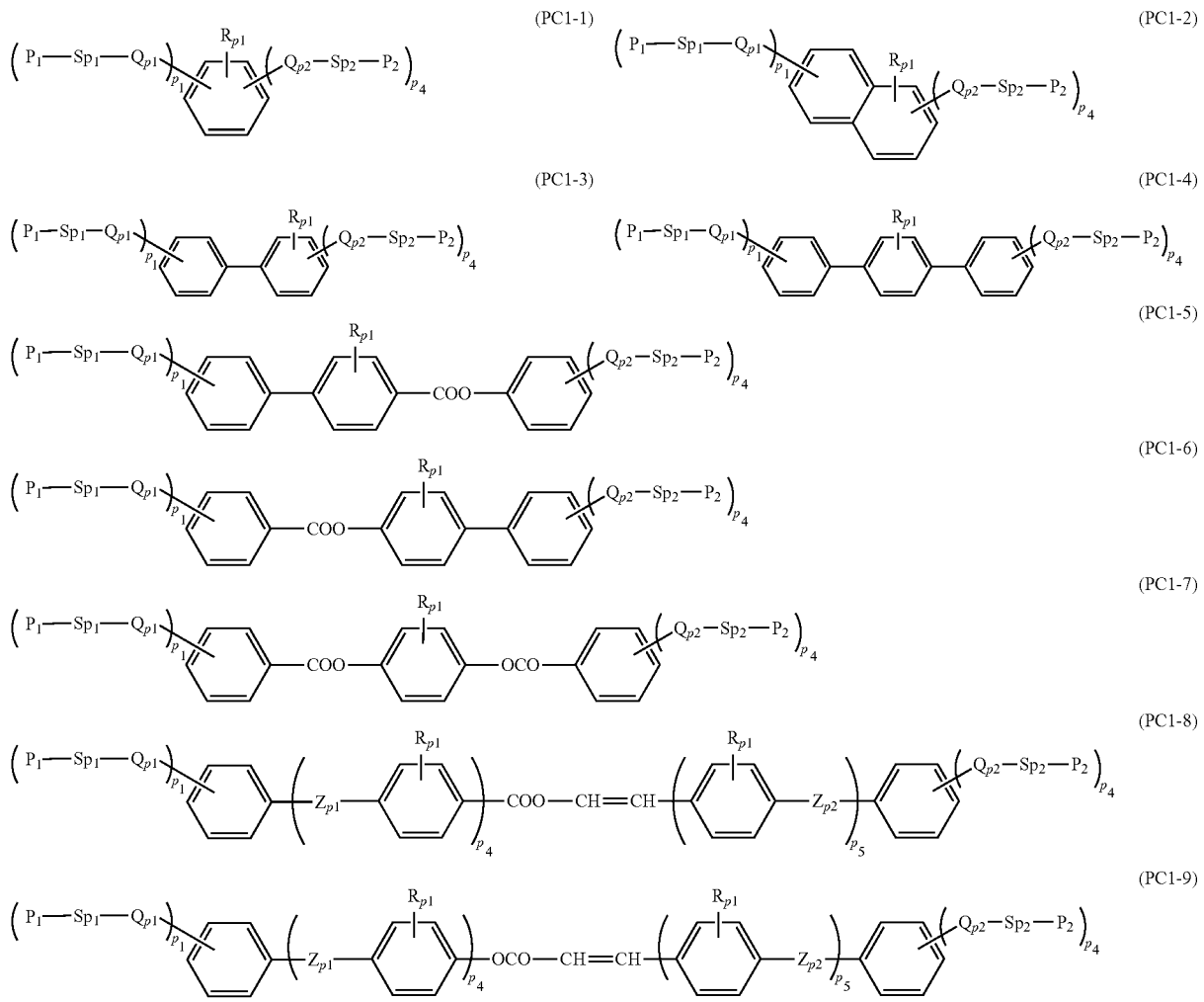

(In the formulae, $p_5$ represents 0, 1, 2, 3, or 4.) In these compounds, $Sp_1$, $Sp_2$, $Q_{p1}$, and $Q_{p2}$ are each preferably a single bond; $P_1$ and $P_2$ preferably each represent a structure represented by formula (PC0-a) and more preferably are an acryloyloxy group and a methacryloyloxy group; $p_1+p_4$ is preferably equal to 2, 3, or 4; and $R_{pt}$ is preferably H, F, $CF_3$, $OCF_3$, $CH_3$, or $OCH_3$. Compounds represented by general formula (PC1-2), general formula (PC1-3), general formula (PC1-4), and general formula (PC1-8) are further preferable.

A disk-shaped liquid crystal compound represented by general formula (PC) with $MG_p$ being represented by general formula (PC1)-9 is also preferable:

[Chem. 25]

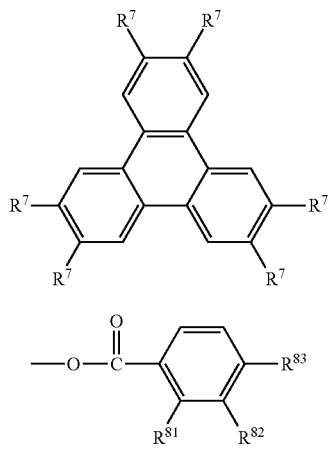

(In the formula, $R_7$ each independently represent $P_1$-$Sp_1$-$Q_{p1}$ or a substituent represented by general formula (PC1-e); $R_{81}$ and $R_{82}$ each independently represent a hydrogen atom, a halogen atom, or a methyl group; $R_{83}$ represents an alkoxy group having 1 to 20 carbon atoms; and at least one hydrogen atom in the alkoxy group is substituted with a substituent represented by general formulae (PC0-a) to (PC0-d) above.)

The amount of the polymerizable compound used is preferably 0.05% to 2.0% by mass.

The liquid crystal composition containing the polymerizable compound of the present invention is used to form a liquid crystal display device by polymerizing the polymerizable compound. Here, the amount of the unpolymerized components is required to be at a certain level or lower and thus a polymerizable compound having a biphenyl group and/or a terphenyl group is preferably contained in the substructure in general formula (LC0). In particular, compounds represented by general formula (LC0-4) to general formula (LC0-6), general formula (LC0-10) to general formula (LC0-16), and general formula (LC0-27) to general formula (LC0-107) are preferable. One or more compounds may be selected from these compounds and used in an amount of 0.1% to 40% by mass. It is preferable to use them in combination with the group of polymerizable compounds represented by general formula (PC1-1) to general formula (PC1-3), general formula (PC1-8), or general formula (PC1-9).

The liquid crystal composition may further contain one or more antioxidants and one or more UV absorbers. The antioxidant may be selected from those represented by general formula (E-1) and/or general formula (E-2) below.

[Chem. 26]

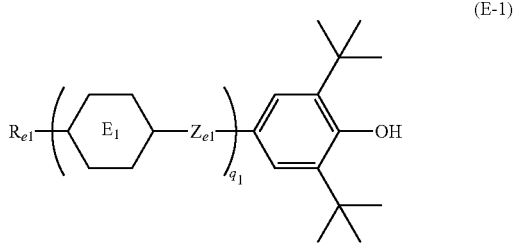

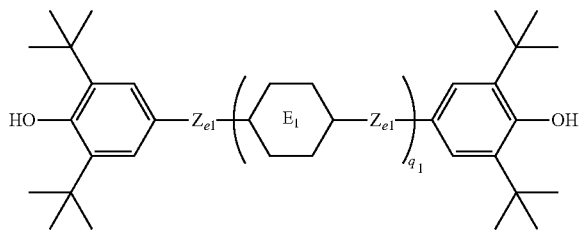

(In the formulae, $R_{e1}$ represents an alkyl group having 1 to 15 carbon atoms, one or more —$CH_2$— in the alkyl group may be substituted with —O—, —CH=CH—, —CO—, —OCO—, —COO—, —C≡C—, —$CF_2$O—, or —$OCF_2$— so that oxygen atoms are not directly adjacent to each other, and one or more hydrogen atoms in the alkyl group may be substituted with a halogen; $Z_{e1}$ and $Z_{e2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; and $E_1$ represents a cyclohexane ring or a benzene ring, one or more —$CH_2$— in the cyclohexane ring may be substituted with —O— so that oxygen atoms are not directly adjacent to each other, one or more —$CH_2CH_2$— in the cyclohexane ring may be substituted with —CH=CH—, —$CF_2O$—, or —$OCF_2$—, one or more —CH= in the benzene ring may be substituted with —N= so that nitrogen atoms are not directly adjacent to each other, one or more hydrogen atoms in the benzene ring may be substituted with F, Cl, or $CH_3$, and $q_1$ represents 0, 1, 2, or 3.)

The liquid crystal composition of the present invention can be used in a liquid crystal display device, in particular, an active matrix drive liquid crystal display device of a TN mode, OCB mode, ECB mode, IPS (including FFS electrodes) mode, or a VA-IPS mode (including FFS electrodes). Here, a VA-IPS mode refers to a method of driving liquid crystal molecules by using pixel electrodes and a common electrode disposed on the same substrate surface, by which a liquid crystal material having a positive dielectric anisotropy (Δ∈>0) is aligned vertically with respect to the substrate surface in the absence of applied voltage. Since the liquid crystal molecules align in the direction of a curved electric field generated by the pixel electrodes and the common electrode, pixels can be easily divided and multi-domains can be easily formed, resulting in good responsiveness. According to non-patent literature, Proc. 13th IDW, 97 (1997), Proc. 13th IDW, 175 (1997), SID Sym. Digest, 319 (1998), SID Sym. Digest, 838 (1998), SID Sym. Digest, 1085 (1998), SID Sym. Digest, 334 (2000), and Eurodisplay Proc., 142 (2009), various other naming such as EOC and VA-IPS are being used. However, for the purposes of the present invention, this mode is referred to as "VA-IPS" hereinafter.

In general, the threshold voltage (Vc) of the Freedericksz transition in the TN and ECB modes is expressed by formula (I):

[Math. 1]

$$Vc = \frac{\pi d_{cell}}{d_{cell} + <r1>} \sqrt{\frac{K11}{\Delta\varepsilon}} \quad (I)$$

In the STN mode, it is expressed by formula (II):

[Math. 2]

$$Vc = \frac{\pi d_{gap}}{d_{cell} + <r2>} \sqrt{\frac{K22}{\Delta\varepsilon}} \quad (II)$$

In the VA mode, it is expressed by formula (III).

[Math. 3]

$$Vc = \frac{\pi d_{cell}}{d_{cell} - <r3>} \sqrt{\frac{K33}{|\Delta\varepsilon|}} \quad (III)$$

(In the formulae, Vc represents Freedericksz transition (V), Π represents the circular constant, $d_{cell}$ represents the distance (μm) between a first substrate and a second substrate, $d_{gap}$ represents a distance (μm) between pixel electrodes and a common electrode, $d_{ITO}$ represents the width (μm) of the pixel electrodes and/or common electrode, <r1>, <r2>, and <r3> represent an extrapolation length (μm), K11 represents a splay elastic constant (N), K22 represents a twist elastic constant (N), K33 represents a bend elastic constant (N), and ΔЄ represents anisotropy of dielectric constant.)

In the VA-IPS mode, the inventors have found that formula (IV) is applicable.

[Math. 4]

$$Vc \propto \frac{d_{gap} - <r>}{d_{ITO} + <r>} \frac{\pi d_{cell}}{d_{cell} - <r3>} \sqrt{\frac{K33}{|\Delta\varepsilon|}} \quad (IV)$$

(In formula, Vc represents Freedericksz transition (V), Π represents the circular constant, $d_{cell}$ represents the distance (μm) between a first substrate and a second substrate, $d_{gap}$ represents a distance (μm) between pixel electrodes and a common electrode, $d_{ITO}$ represents the width (μm) of the pixel electrodes and/or common electrode, <r>, <r'>, and <r3> represent an extrapolation length (μm), K33 represents a bend elastic constant (N), and ΔЄ represents anisotropy of dielectric constant.) Formula (IV) shows that the driving voltage can be lowered by minimizing $d_{gap}$ and maximizing $d_{ITO}$ in the cell structure and that the driving voltage can also be lowered by selecting a liquid crystal composition that has a large absolute value of ΔЄ and small K33.

The liquid crystal composition of the present invention can be adjusted to have preferable ΔЄ, K11, and K33.

The product (Δn·d) of the refractive index anisotropy (Δn) of the liquid crystal composition and the distance (d) between the first substrate and the second substrate in the display device is strongly related to the viewing angle characteristics and response speed. The distance (d) is becoming as small as 3 to 4 μm. The product (Δn·d) is preferably 0.31 to 0.33 for the TN mode, the ECB mode, and the IPS mode. In the VA-IPS mode, the product is preferably 0.20 to 0.59 and more preferably 0.30 to 0.40 for vertical orientation with respect to the two substrates. As such, the optimum value of product (Δn·d) differs depending on the mode of the display device. Accordingly, liquid crystal compositions having a variety of different ranges of refractive index anisotropy (Δn), such as those with Δn in the range of 0.070 to 0.110, those with Δn in the range of 0.100 to 0.140, and those with Δn in the range of 0.130 to 0.180 are in demand. In order to yield a relatively low or small refractive index anisotropy (Δn) from the liquid crystal composition of the present invention, 0.1 to 80% by mass of at least one selected from the group consisting of compounds represented by general formula (LC0-1) to general formula (LC0-3), general formula (LC0-7) to general formula (LC0-9), and general formula (LC0-20) to general formula (LC0-30) is preferably contained. In order to yield a relatively high or large refractive index anisotropy (Δn) 0.1 to 60% by mass of at least one selected from the group consisting of compounds represented by general formula (LC0-4) to general formula (LC0-6), general formula (LC0-10) to general formula (LC0-16), and general formula (LC0-27) to general formula (LC0-107) is preferably contained.

In the TN mode and ECB mode where the liquid crystal alignment needs to be substantially horizontal to the substrate surface in the absence of applied voltage, the tilt angle is preferably 0.5 to 7°. In the VA-IP mode where the liquid crystal alignment needs to be substantially vertical to the substrate surface in the absence of applied voltage, the tilt angle is preferably 85 to 90°. In order to have the liquid crystal composition align in the manner, an alignment film composed of polyimide (PI), polyamide, chalcone, cinnamate, cinnamoyl, or the like may be provided. The alignment film is preferably prepared by an optical alignment technique. The liquid crystal composition of the present invention that contains a compound represented by general formula (LC0) with $X^{01}$ representing F easily aligns align along the easy axis of the alignment film and the tilt angle can be easily adjusted to a desired angle.

The liquid crystal composition of the present invention that contains a compound represented by general formula (PC) as a polymerizable compound can be used to form polymer stabilization liquid crystal display devices of the TN mode, OCB node, ECB mode, IPS mode, or VA-IPS mode by polymerizing the polymerizable compound in the liquid crystal composition in the presence or absence of applied voltage.

EXAMPLES

The present invention will now be described in detail by using examples which do not limit the scope of the present invention. In the compositions of Examples and Comparative Examples below, "%" means "% by mass".

The physical properties of the liquid crystal composition are indicated as follows:

$T_{N-I}$: nematic phase-isotropic liquid phase transition temperature (° C.)

T-n: nematic phase lower limit temperature (° C.)

Є⊥: dielectric constant in a direction perpendicular to a molecular long axis direction at 25° C.

ΔЄ: dielectric anisotropy at 25° C.

no: refractive index relative to ordinary ray at 25° C.

Δn: refractive index anisotropy at 25° C.

Vth: voltage (V) which is applied to a cell having a thickness of 6 μm and at which the change in transmittance is 10% under application of a square wave having a frequency of 1 KHz at 25° C.

$\eta_{20}$: bulk viscosity (mPa·s) at 20° C.

$\gamma_1$: rotational viscosity (mPa·s)

The following abbreviations are used to describe compounds.

TABLE 1

| Terminal n (number) | $C_nH_{2n+1}-$ |
|---|---|
| -2- | $-CH_2CH_2-$ |
| -1O— | $-CH_2O-$ |
| —O1- | $-OCH_2-$ |
| —V— | $-CO-$ |
| —VO— | $-COO-$ |
| —CFFO— | $-CF_2O-$ |
| —F | —F |
| —Cl | —Cl |
| —CN | —C≡N |
| —OCFFF | $-OCF_3$ |
| —CFFF | 0 |
| —OCFF | $-OCHF_2$ |
| —On | $-OC_nH_{2n+1}$ |
| -T- | —C≡C— |
| ndm- | $C_nH_{2n+1}-HC=CH-(CH_2)_{m-1}-$ |
| -ndm | $-(CH_2)_{n-1}-HC=CH-C_mH_{2m+1}$ |
| ndmO- | $C_nH_{2n+1}-HC=CH-(CH_2)_{m-1}-O-$ |
| -Ondm | $-O-(CH_2)_{n-1}-HC=CH-C_mH_{2m+1}$ |

[Chem. 27]

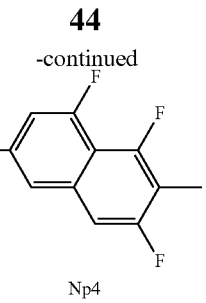

Cy, Ph, Ph1, Ph3, Ma, Pr, Oc, Np, Np1, Np3, Np4

Example 1

A liquid crystal composition prepared and the physical property values thereof are as follows.

TABLE 2

| 0d1-Cy-Cy-3 | 42.0% |
|---|---|
| 1d1-Cy-Cy-3 | 7.5% |
| 3-Ph-Ph3-O1-Ph3-F | 9.5% |
| 0d1-Cy-Cy-Ph-1 | 10.0% |
| 0d1-Cy-Ph-Ph-2 | 21.0% |
| 3-Cy-Ph-Ph3-O1-Ph3-F | 5.0% |
| 4-Cy-Ph-Ph3-O1-Ph3-F | 5.0% |
| Tni | 81.4 |
| T-n | G-43 |
| Vth | 2.59 |
| $\gamma_1$ | 36 |
| $\epsilon\perp$ | 2.77 |
| $\Delta\epsilon$ | 2.80 |
| no | 1.491 |
| $\Delta n$ | 0.117 |
| $\eta 20$ | 9.5 |

Example 2

A liquid crystal composition prepared and the physical property values thereof are as follows.

TABLE 3

| 0d1-Cy-Cy-3 | 30.0% |
|---|---|
| 3-Ph-Ph3-O1-Ph3-F | 17.0% |
| 4-Ph-Ph3-O1-Ph3-F | 10.0% |
| 0d3-Cy-Cy-Ph-1 | 14.0% |
| 3-Cy-Ph-Ph3-O1-Ph3-F | 8.0% |
| 4-Cy-Ph-Ph3-O1-Ph3-F | 10.0% |
| 3-Cy-Cy-Ph-Ph1-F | 6.0% |
| 5-Cy-Cy-Ph-Ph1-F | 5.0% |
| Tni | 88.6 |
| T-n | G-35 |
| Vth | 1.69 |
| $\gamma_1$ | 70 |
| $\epsilon\perp$ | 3.92 |
| $\Delta\epsilon$ | 9.32 |
| no | 1.491 |
| $\Delta n$ | 0.103 |
| $\eta 20$ | 13.2 |

Example 3

A liquid crystal composition prepared and the physical property values thereof are as follows.

TABLE 4

| 0d1-Cy-Cy-3 | 29.0% |
|---|---|
| 3-Ph-Ph3-O1-Ph3-F | 22.0% |

TABLE 4-continued

| | |
|---|---|
| 4-Ph-Ph3-O1-Ph3-F | 8.0% |
| 0d3-Cy-Cy-Ph-1 | 16.0% |
| 3-Cy-Ph-Ph3-O1-Ph3-F | 13.0% |
| 5-Cy-Ph-Ph3-O1-Ph3-F | 8.0% |
| 3-Cy-Cy-Ph-Ph1-F | 4.0% |
| Tni | 76.8 |
| T-n | G-39 |
| Vth | 1.48 |
| $\gamma_1$ | 60 |
| $\epsilon\perp$ | 4.19 |
| $\Delta\epsilon$ | 10.05 |
| no | 1.490 |
| $\Delta n$ | 0.115 |
| $\eta 20$ | 13.7 |

Comparative Example 1

A liquid crystal composition prepared and the physical property values thereof are as follows.

TABLE 5

| | |
|---|---|
| 0d1-Cy-Cy-3 | 29.0% |
| 3-Ph-Ph3-CFFO-Ph3-F | 22.0% |
| 4-Ph-Ph3-CFFO-Ph3-F | 8.0% |
| 0d3-Cy-Cy-Ph-1 | 16.0% |
| 3-Cy-Ph-Ph3-CFFO-Ph3-F | 13.0% |
| 5-Cy-Ph-Ph3-CFFO-Ph3-F | 8.0% |
| 3-Cy-Cy-Ph-Ph1-F | 4.0% |
| Tni | 72.24 |
| T-n | G-32 |
| Vth | 1.36 |
| $\gamma_1$ | 92 |
| $\epsilon\perp$ | 4.22 |
| $\Delta\epsilon$ | 13.05 |
| no | 1.493 |
| $\Delta n$ | 0.134 |
| $\eta 20$ | 18.1 |

This liquid crystal composition is a liquid crystal composition obtained by replacing the compounds represented by general formula (LC0) used in Example 3 with compounds having —$CF_2O$— as the linking groups. The results show that in Example 3, the viscosity is notably low, $\gamma_1$ is small, $T_{ni}$ is high, and the combination of the present invention is significantly advantageous.

Comparative Example 2

A liquid crystal composition prepared and the physical property values thereof are as follows.

TABLE 6

| | |
|---|---|
| 0d1-Cy-Cy-3 | 29.0% |
| 3-Ph-Ph3-1O-Ph3-F | 22.0% |
| 4-Ph-Ph3-1O-Ph3-F | 8.0% |
| 0d3-Cy-Cy-Ph-1 | 16.0% |
| 3-Cy-Ph-Ph3-1O-Ph3-F | 13.0% |
| 5-Cy-Ph-Ph3-1O-Ph3-F | 8.0% |
| 3-Cy-Cy-Ph-Ph1-F | 4.0% |
| Tni | 47.5 |
| T-n | S-21 |
| Vth | 1.32 |
| $\gamma_1$ | 114 |
| $\epsilon\perp$ | 4.21 |
| $\Delta\epsilon$ | 11.00 |
| no | 1.491 |
| $\Delta n$ | 0.109 |
| $\eta 20$ | 37.3 |

This liquid crystal composition is a liquid crystal composition obtained by replacing the compounds represented by general formula (LC0) used in Example 3 with compounds having —$CH_2O$— as the linking groups. The results show that in Example 3, the viscosity is notably low, $\gamma_1$ is small, $T_{ni}$ is high, and the combination of the present invention is significantly advantageous.

Comparative Example 3

A liquid crystal composition prepared and the physical property values thereof are as follows.

TABLE 7

| | |
|---|---|
| 0d1-Cy-Cy-3 | 36.0% |
| 1d1-Cy-Cy-3 | 12.0% |
| 3-Ph-Ph3-CFFO-Ph3-F | 13.5% |
| 3-Cy-Cy-CFFO-Ph3-F | 13.0% |
| 0d3-Cy-Cy-Ph-1 | 7.5% |
| 3-Cy-Cy-Ph-Ph3-F | 1.0% |
| 3-Ph-Ph1-Ph3-CFFO-Ph3-F | 1.5% |
| 4-Ph-Ph1-Ph3-CFFO-Ph3-F | 8.5% |
| 5-Ph-Ph1-Ph3-CFFO-Ph3-F | 7.0% |
| Tni | 75.5° C. |
| T-n | S-28 |
| Vth | 1.38 |
| $\gamma_1$ | 75 |
| $\epsilon\perp$ | 3.22 |
| $\Delta\epsilon$ | 9.81 |
| no | 1.490 |
| $\Delta n$ | 0.115 |
| $\eta 20$ | 14.2 |

This liquid crystal composition is a liquid crystal composition not containing a compound represented by general formula (LC0) of this application. The results show that in Example 3, the viscosity is notably low, $\gamma_1$ is small, and the combination of the present invention is significantly advantageous.

Example 4

A liquid crystal composition prepared and the physical property values thereof are as follows.

TABLE 8

| | |
|---|---|
| 0d1-Cy-Cy-3 | 42.0% |
| 3-Ph-Ph3-O1-Ph3-F | 12.0% |
| 0d1-Cy-Cy-Ph-1 | 12.0% |
| 0d1-Cy-Ph-Ph-2 | 16.0% |
| 3-Cy-Ph-Ph3-O1-Ph3-F | 10.0% |
| 5-Cy-Ph-Ph3-O1-Ph3-F | 8.0% |
| Tni | 82.0 |
| T-n | G-36 |
| Vth | 2.09 |
| $\gamma_1$ | 43 |
| $\epsilon\perp$ | 3.10 |
| $\Delta\epsilon$ | 4.45 |
| no | 1.491 |
| $\Delta n$ | 0.108 |
| $\eta 20$ | 10.1 |

Comparative Example 4

A liquid crystal composition prepared and the physical property values thereof are as follows.

TABLE 9

| | |
|---|---|
| 0d1-Cy-Cy-3 | 41.5% |
| 1d1-Cy-Cy-3 | 7.5% |
| 3-Ph-Ph3-CFFO-Ph3-F | 9.5% |

TABLE 9-continued

| | |
|---|---|
| 0d1-Cy-Cy-Ph-1 | 10.5% |
| 3-Ph-Ph1-Ph-2 | 10.5% |
| 5-Ph-Ph1-Ph-2 | 10.5% |
| 3-Cy-Cy-Ph-5 | 0.5% |
| 3-Cy-Cy-Ph-Ph3-F | 5.5% |
| 4-Ph-Ph1-Ph3-CFFO-Ph3-F | 4.0% |
| Tni | 80.4° C. |
| T-n | S-32 |
| Vth | 2.42 |
| $\gamma_1$ | 50 |
| $\epsilon\perp$ | 2.81 |
| $\Delta\epsilon$ | 4.03 |
| no | 1.488 |
| $\Delta n$ | 0.108 |
| $\eta 20$ | 11.1 |

This liquid crystal composition is a liquid crystal composition not containing a compound represented by general formula (LC0) of this application. The results show that in Example 4, the viscosity is notably low, $\gamma_1$ is small, and the combination of the present invention is significantly advantageous.

Example 5

A liquid crystal composition prepared and the physical property values thereof are as follows.

TABLE 10

| | |
|---|---|
| 0d1-Cy-Cy-3 | 42.0% |
| 3-Cy-Ph3-O1-Ph3-F | 16.0% |
| 0d1-Cy-Cy-Ph-1 | 3.0% |
| 0d3-Cy-Cy-Ph-1 | 7.0% |
| 3-Cy-Cy-Ph-1 | 7.0% |
| 3-Cy-Cy-Ph3-O1-Ph3-F | 9.0% |
| 5-Cy-Cy-Ph3-O1-Ph3-F | 8.0% |
| 3-Cy-Cy-Ph-Ph1-F | 5.0% |
| 5-Cy-Cy-Ph-Ph1-F | 3.0% |
| Tni | 91.8 |
| T-n | G-41 |
| Vth | 1.96 |
| $\gamma_1$ | 50 |
| $\epsilon\perp$ | 3.25 |
| $\Delta\epsilon$ | 4.55 |
| no | 1.480 |
| $\Delta n$ | 0.084 |
| $\eta 20$ | 10.8 |

Example 6

A liquid crystal composition prepared and the physical property values thereof are as follows.

TABLE 11

| | |
|---|---|
| 0d1-Cy-Cy-3 | 25.0% |
| 3-Cy-Ph3-O1-Ph3-F | 19.0% |
| 4-Cy-Ph3-O1-Ph3-F | 14.0% |
| 3-Cy-Cy-Ph3-O1-Ph3-F | 15.0% |
| 4-Cy-Cy-Ph3-O1-Ph3-F | 8.0% |
| 5-Cy-Cy-Ph3-O1-Ph3-F | 13.0% |
| 3-Cy-Cy-Ph-Ph1-F | 6.0% |
| Tni | 77.7 |
| T-n | G-33 |
| Vth | 1.17 |
| $\gamma_1$ | 71 |
| $\epsilon\perp$ | 4.93 |
| $\Delta\epsilon$ | 10.78 |
| no | 1.477 |
| $\Delta n$ | 0.089 |
| $\eta 20$ | 12.9 |

Example 7

A liquid crystal composition prepared and the physical property values thereof are as follows.

TABLE 12

| | |
|---|---|
| 0d1-Cy-Cy-3 | 40.0% |
| 1d1-Cy-Cy-3 | 15.0% |
| 3-Cy-Ph3-O1-Ph3-F | 13.0% |
| 0d1-Cy-Cy-Ph-1 | 6.0% |
| 0d3-Cy-Cy-Ph-1 | 12.0% |
| 3-Cy-Cy-Ph3-O1-Ph3-F | 6.0% |
| 5-Cy-Cy-Ph3-O1-Ph3-F | 4.0% |
| 3-Cy-Cy-Ph-Ph1-F | 4.0% |
| Tni | 81.1 |
| T-n | G-42 |
| Vth | 2.37 |
| $\gamma_1$ | 45 |
| $\epsilon\perp$ | 2.85 |
| $\Delta\epsilon$ | 4.02 |
| no | 1.479 |
| $\Delta n$ | 0.077 |
| $\eta 20$ | 8.3 |

The results show that because this liquid crystal composition contains compounds represented by general formula (LC0), general formula (LC2), and general formula (LC5) of the present invention, a low viscosity and a small $\eta_1$ are achieved even in a low $\Delta n$ system and that the combination of the present invention is significantly advantageous.

Example 8

A liquid crystal composition prepared and the physical property values thereof are as follows.

TABLE 13

| | |
|---|---|
| 0d1-Cy-Cy-3 | 27.0% |
| 3-Cy-Ph3-O1-Ph3-F | 20.0% |
| 4-Cy-Ph3-O1-Ph3-F | 10.0% |
| 0d3-Cy-Cy-Ph-1 | 8.0% |
| 3-Cy-Cy-Ph3-O1-Ph3-F | 15.0% |
| 4-Cy-Cy-Ph3-O1-Ph3-F | 10.0% |
| 5-Cy-Cy-Ph3-O1-Ph3-F | 10.0% |
| Tni | 76.2 |
| T-n | G-31 |
| Vth | 1.24 |
| $\gamma_1$ | 66 |
| $\epsilon\perp$ | 4.63 |
| $\Delta\epsilon$ | 9.94 |
| no | 1.477 |
| $\Delta n$ | 0.086 |
| $\eta 20$ | 11.3 |

The results show that because this liquid crystal composition contains compounds represented by general formula (LC0) of the present invention, a low $\Delta n$, a low viscosity, and a small $\gamma_1$ are achieved even in a system with a large $\Delta\epsilon$ and that the combination of the present invention is significantly advantageous.

Example 9

The following liquid crystal base composition A constituted by compounds represented by general formula (LC5-1), general formula (LC5-4), and general formula (LC5-7) was prepared.

TABLE 14

| | |
|---|---|
| 0d1-Cy-Cy-3 | 20.0% |
| 1d1-Cy-Cy-2 | 20.0% |
| 1d1-Cy-Cy-1d1 | 20.0% |
| 0d1-Cy-Cy-Ph-1 | 10.0% |
| 2-Cy-Cy-Ph-1 | 10.0% |
| 1-Ph-Ph1-Ph-3d0 | 10.0% |
| 2-Ph-Ph1-Ph-3d0 | 10.0% |

A liquid crystal composition prepared by using the liquid crystal base composition A and physical property values thereof are as follows.

TABLE 15

| | |
|---|---|
| Liquid crystal base composition A | 50.0% |
| 3-Ph-Ph3-O1-Ph3-F | 20.0% |
| 3-Ph-Ph-Ph3-CFFO-Ph3-F | 10.0% |
| 3-Cy-Ph-Ph3-OCFFF | 10.0% |
| 3-Ph-Ph1-Np3-F | 10.0% |
| Tni | 72.4 |
| T-n | −32 |
| Vth | 1.30 V |
| $\gamma_1$ | 86 mPa·s |
| $\epsilon\perp$ | 3.45 |
| $\Delta\epsilon$ | 10.15 |
| no | 1.500 |
| $\Delta n$ | 0.139 |
| $\eta 20$ | 18.6 mPa·s |

Comparative Example 5

A liquid crystal composition prepared by using the liquid crystal base composition A and physical property values thereof are as follows.

TABLE 16

| | |
|---|---|
| Liquid crystal base composition A | 50.0% |
| 3-Ph-Ph3-1O-Ph3-F | 20.0% |
| 3-Ph-Ph-Ph3-CFFO-Ph3-F | 10.0% |
| 3-Cy-Ph-Ph3-OCFFF | 10.0% |
| 3-Ph-Ph1-Np3-F | 10.0% |
| Tni | 63.8 |
| T-n | −28 |
| Vth | 1.29 V |
| $\gamma_1$ | 108 mPa·s |
| $\epsilon\perp$ | 3.52 |
| $\Delta\epsilon$ | 10.51 |
| no | 1.499 |
| $\Delta n$ | 0.137 |
| $\eta 20$ | 23.0 mPa·s |

This liquid crystal composition is a liquid crystal composition that does not contain a compound represented by general formula (LC0) of the present application. The results show that, in Example 9, the viscosity is significantly low, $\gamma_1$ is small, and the combination of the present invention is significantly advantageous.

Example 10

A liquid crystal composition prepared and the physical property values thereof are as follows.

TABLE 17

| | |
|---|---|
| Liquid crystal base composition A | 40.0% |
| 3-Cy-Ph3-O1-Ph3-F | 20.0% |
| 3-Cy-Cy-Ph3-O1-Ph3-OCFFF | 15.0% |
| 3-Cy-Ph-Ph3-OCFFF | 10.0% |

TABLE 17-continued

| | |
|---|---|
| 0d3-Ph-Ph-Ph3-F | 5.0% |
| 3-Cy-Cy-CFFO-Np3-F | 10.0% |
| Tni | 90.8° C. |
| T-n | −30 |
| Vth | 1.61 V |
| $\gamma_1$ | 82 mPa·s |
| $\epsilon\perp$ | 3.14 |
| $\Delta\epsilon$ | 7.19 |
| no | 1.490 |
| $\Delta n$ | 0.102 |
| $\eta 20$ | 16.2 mPa·s |

Example 11

A liquid crystal composition prepared and the physical property values thereof are as follows.

TABLE 18

| | |
|---|---|
| 0d3-Cy-Cy-3 | 10.0% |
| 1d1-Cy-Cy-1d1 | 10.0% |
| 3-Cy-Ph3-O1-Ph-OCFFF | 20.0% |
| 3-Ph-Ph3-O1-Ph-OCFFF | 20.0% |
| 3-Cy-Cy-Ph3-O1-Ph-OCFFF | 10.0% |
| 3-Cy-Ph-Ph3-O1-Ph-OCFFF | 10.0% |
| 3-Cy-Ph1-Ph3-O1-Ph-OCFFF | 10.0% |
| 3-Ph-Ph1-Ph3-O1-Ph-OCFFF | 10.0% |
| Tni | 82.8 |
| T-n | −30 |
| Vth | 1.51 V |
| $\gamma_1$ | 57 mPa·s |
| $\epsilon\perp$ | 3.12 |
| $\Delta\epsilon$ | 8.54 |
| no | 1.495 |
| $\Delta n$ | 0.120 |
| $\eta 20$ | 10.5 mPa·s |

Example 12

A liquid crystal composition prepared and the physical property values thereof are as follows.

TABLE 19

| | |
|---|---|
| 1d1-Cy-Cy-2 | 10.0% |
| 0d3-Cy-Cy-3 | 10.0% |
| 1d1-Cy-Cy-3 | 10.0% |
| 0d1-Cy-Cy-1d1 | 10.0% |
| 1d1-Cy-Cy-1d1 | 10.0% |
| 3-Cy-Ph3-O1-Ph-Ph3-F | 10.0% |
| 3-Cy-Ph3-O1-Ph3-Ph-OCFFF | 10.0% |
| 3-Ph3-O1-Cy-Ph3-Ph3-F | 10.0% |
| 3-Ph3-O1-Cy-Ph3-OCFFF | 10.0% |
| 3-Cy-Ph3-O1-Ph-OCFFF | 10.0% |
| Tni | 77.2 |
| T-n | −34 |
| Vth | 1.35 V |
| $\gamma_1$ | 60 mPa·s |
| $\epsilon\perp$ | 3.47 |
| $\Delta\epsilon$ | 9.56 |
| no | 1.479 |
| $\Delta n$ | 0.081 |
| $\eta 20$ | 11.1 mPa·s |

Example 13

A liquid crystal composition prepared and the physical property values thereof are as follows.

TABLE 20

| | |
|---|---|
| 1d1-Cy-Cy-2 | 12.0% |
| 1d1-Cy-Cy-1d1 | 12.0% |
| 1-Ph-Ph1-Ph-3d0 | 8.0% |
| 3-Cy-Cy-Ph3-O1-Ph-CFFF | 8.0% |
| 3-Ph3-O1-Cy-Ph3-Ph-OCFFF | 10.0% |
| 3-Ph-Ph3-O1-Ph-OCFFF | 10.0% |
| 3-Cy-Ph-Ph3-O1-Ph-OCFFF | 10.0% |
| 3-Cy-Ph1-Ph3-O1-Ph-OCFFF | 10.0% |
| 3-Ph-Ph1-Ph3-O1-Ph-OCFFF | 10.0% |
| 3-Ph-Ph3-CFFO-Ph3-F | 10.0% |
| Tni | 99.8 |
| T-n | −30 |
| Vth | 1.35 V |
| $\gamma_1$ | 88 mPa·s |
| $\epsilon\perp$ | 3.43 |
| $\Delta\epsilon$ | 9.53 |
| no | 1.504 |
| $\Delta$n | 0.151 |
| $\eta20$ | 18.7 mPa·s |

Example 14

A liquid crystal composition prepared and the physical property values thereof are as follows.

TABLE 21

| | |
|---|---|
| 1d3-Cy-Cy-2 | 5.0% |
| 0d3-Cy-Cy-3 | 5.0% |
| 0d1-Cy-Cy-1d1 | 5.0% |
| 3-Cy-Cy-Ph-1 | 5.0% |
| 1-Ph-Ph1-Ph-3d0 | 5.0% |
| 1-Ph-Ph1-Ph-3 | 5.0% |
| 3-Cy-Ph3-O1-Ph3-Ph-OCFFF | 10.0% |
| 3-Ph3-O1-Cy-Ph3-Ph-OCFFF | 10.0% |
| 3-Ph-Ph3-O1-Ph-OCFFF | 10.0% |
| 3-Ph-Ph1-Ph3-O1-Ph-OCFFF | 10.0% |
| 3-Cy-Ph-Ph3-OCFFF | 10.0% |
| 3-Ph-Ph1-Ph3-OCFFF | 10.0% |
| 3-Ph3-O1-Ph-Np3-F | 10.0% |
| Tni | 88.2 |
| T-n | −32 |
| Vth | 1.23 V |
| $\gamma_1$ | 97 mPa·s |
| $\epsilon\perp$ | 5.53 |
| $\Delta\epsilon$ | 12.22 |
| no | 1.506 |
| $\Delta$n | 0.152 |
| $\eta20$ | 21.2 mPa·s |

Example 15

A liquid crystal composition prepared and the physical property values thereof are as follows.

TABLE 22

| | |
|---|---|
| 1d1-Cy-Cy-2 | 10.0% |
| 0d3-Cy-Cy-3 | 10.0% |
| 1d1-Cy-Cy-3 | 10.0% |
| 1d1-Cy-Cy-1d1 | 10.0% |
| 3-Cy-Ph3-O1-Ph3-Ph-OCFFF | 10.0% |
| 3-Cy-Ph3-O1-Ph-OCFFF | 15.0% |
| 3-Ph-Ph3-O1-Ph-OCFFF | 15.0% |
| 3-Cy-Cy-Ph3-O1-Ph-OCFFF | 10.0% |
| 3-Cy-Ph-Ph3-O1-Ph-OCFFF | 10.0% |
| Tni | 76.7 |
| T-n | −35 |
| Vth | 1.88 V |
| $\gamma_1$ | 53 mPa·s |
| $\epsilon\perp$ | 2.82 |
| $\Delta\epsilon$ | 6.31 |
| no | 1.486 |

TABLE 22-continued

| | |
|---|---|
| $\Delta$n | 0.097 |
| $\eta20$ | 8.5 mPa·s |

Example 16

A liquid crystal composition prepared and the physical property values thereof are as follows.

TABLE 23

| | |
|---|---|
| 1d1-Cy-Cy-2 | 10.00% |
| 0d3-Cy-Cy-3 | 10.00% |
| 1d1-Cy-Cy-3 | 10.00% |
| 0d1-Cy-Cy-1d1 | 10.00% |
| 1d1-Cy-Cy-1d1 | 10.00% |
| 1-Ph-Ph1-Ph-3 | 5.00% |
| 3-Cy-Ph3-O1-Ph-Ph3-F | 10.00% |
| 3-Cy-Ph3-O1-Ph3-Ph-OCFFF | 10.00% |
| 3-Cy-Ph3-O1-Ph-OCFFF | 5.00% |
| 3-Cy-Cy-Ph3-O1-Ph-OCFFF | 10.00% |
| 3-Cy-Ph-Ph3-O1-Ph-OCFFF | 10.00% |
| Tni | 96.6 |
| T-n | −30 |
| Vth | 2.01 V |
| $\gamma_1$ | 58 mPa·s |
| $\epsilon\perp$ | 2.56 |
| $\Delta\epsilon$ | 5.24 |
| no | 1.475 |
| $\Delta$n | 0.094 |
| $\eta20$ | 10.8 mPa·s |

Example 17

A liquid crystal composition prepared and the physical property values thereof are as follows.

TABLE 24

| | |
|---|---|
| 0d1-Cy-Cy-3 | 10.00% |
| 1d1-Cy-Cy-2 | 10.00% |
| 0d1-Cy-Cy-1d1 | 10.00% |
| 1d1-Cy-Cy-1d1 | 10.00% |
| 3-Cy-Ph1-Ph3-O1-Ph3-F | 5.00% |
| 3-Ph-Ph1-Ph3-O1-Ph3-F | 5.00% |
| 3-Cy-Ph1-Ph3-O1-Ph3-OCFFF | 10.00% |
| 3-Ph3-O1-Cy-Ph3-F | 10.00% |
| 3-Cy-Ph1-Ph3-CFFO-Ph3-F | 10.00% |
| 3-Ph-Ph1-Ph3-CFFO-Ph3-F | 10.00% |
| 3-Ph3-O1-Ph-Np3-F | 10.00% |
| Tni | 74.6 |
| T-n | −32 |
| Vth | 1.10 V |
| $\gamma_1$ | 98 mPa·s |
| $\epsilon\perp$ | 6.56 |
| $\Delta\epsilon$ | 17.01 |
| no | 1.494 |
| $\Delta$n | 0.116 |
| $\eta20$ | 21.1 mPa·s |

Example 18

A liquid crystal composition prepared and the physical property values thereof are as follows.

TABLE 25

| | |
|---|---|
| 0d1-Cy-Cy-3 | 10.00% |
| 1d1-Cy-Cy-2 | 10.00% |
| 0d1-Cy-Cy-1d1 | 10.00% |
| 1d1-Cy-Cy-1d1 | 10.00% |

TABLE 25-continued

| | |
|---|---|
| 0d1-Cy-Cy-Ph-1 | 5.00% |
| 1-Ph-Ph1-Ph-3 | 5.00% |
| 3-Cy-Ph1-Ph3-O1-Ph3-F | 5.00% |
| 3-Ph-Ph1-Ph3-O1-Ph3-F | 5.00% |
| 3-Cy-Ph1-Ph3-O1-Ph3-OCFFF | 5.00% |
| 3-Cy-Ph3-O1-Ph3-Ph1-F | 5.00% |
| 3-Cy-Cy-CFFO-Ph3-F | 5.00% |
| 3-Ph-Ph3-CFFO-Ph3-F | 5.00% |
| 3-Ph-Ph1-Ph3-CFFO-Ph3-F | 5.00% |
| 3-Ph-Ph1-Ph3-OCFFF | 5.00% |
| 3-Ph3-O1-Ph-Np3-F | 10.00% |
| Tni | 72.2 |
| T-n | −34 |
| Vth | 1.26 V |
| $\gamma_1$ | 84 mPa·s |
| $\epsilon\perp$ | 4.34 |
| $\Delta\epsilon$ | 11.65 |
| no | 1.496 |
| $\Delta n$ | 0.116 |
| $\eta 20$ | 17.0 mPa·s |

In view of the above, it is apparent that the liquid crystal compositions of Examples 1 to 18 have a low viscosity and a small $\gamma_1$ and the that combination of the present invention is significantly advantageous.

Example 19

A first substrate on which a pair of transparent electrodes each having a comb-shape electrode structure were disposed and a second substrate on which no electrode structures were formed were used. A vertical alignment film was formed on each substrate and an IPS empty cell in which the gap distance between the first substrate and the second substrate was 4.0 μm was fabricated. A liquid crystal composition of Example 12 was poured into the empty cell to form a liquid crystal display device. Electro optic properties of the liquid crystal display device were measured. The applied voltage at which the transmittance changed by 10% was 1.45 V. The response speed under application of 5 V was 4.6 msec and the response speed was 11.9 sec when the voltage was turned off.

A polymerizable liquid crystal composition CLC-A was prepared by adding 1% of a polymerizable compound represented by formula (PC-1)-3-1 to 99% of the liquid crystal composition of Example 12 and homogeneously dissolving the polymerizable compound therein:
[Chem. 28]

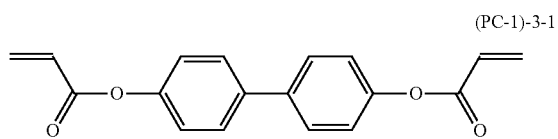

(PC-1)-3-1

The physical properties of CLC-A were not significantly different from the physical properties of the liquid crystal composition of Example 12.

The CLC-A was held in the IPS empty cell described above and the resulting liquid crystal cell was irradiated with ultraviolet light from a high-pressure mercury lamp through a filter that cut UV rays of 300 nm or lower while applying a 1.8 V square wave at a frequency of 1 kHz. The irradiation strength at the cell surface was adjusted to 20 mW/cm² and irradiation was continued for 600 seconds to obtain a vertical alignment liquid crystal display device in which the polymerizable compound in the polymerizable liquid crystal composition was polymerized. The electro optic properties of the display deice were measured and the applied voltage at which the transmittance changed by 10% was 1.58 v. The response speed under application of 5 v was 4.2 msec. The response speed was 4.7 msec when the voltage was turned off. This was significantly fast compared to the liquid crystal display device fabricated by using only the liquid crystal composition of Example 12.

Example 20

A liquid crystal composition prepared and the physical property values thereof are as follows.

TABLE 26

| | |
|---|---|
| 0d1-Cy-Cy-3 | 36.0% |
| 1d1-Cy-Cy-3 | 12.0% |
| 3-Ph-Ph3-O1-Ph3-F | 13.5% |
| 3-Cy-Cy-CFFO-Ph3-F | 13.0% |
| 0d3-Cy-Cy-Ph-1 | 7.5% |
| 3-Cy-Cy-Ph-Ph3-F | 1.0% |
| 3-Ph-Ph1-Ph3-CFFO-Ph3-F | 1.5% |
| 4-Ph-Ph1-Ph3-O1-Ph3-F | 8.5% |
| 5-Ph-Ph1-Ph3-CFFO-Ph3-F | 7.0% |
| Tni | 75.7° C. |
| T-n | −32 |
| Vth | 1.52 V |
| $\gamma_1$ | 59 mPa·s |
| $\epsilon\perp$ | 3.20 |
| $\Delta\epsilon$ | 8.13 |
| no | 1.492 |
| $\Delta n$ | 0.110 |
| $\eta 20$ | 11.0 mPa·s |

Comparative Example 6

A liquid crystal composition prepared and the physical property values thereof are as follows.

TABLE 27

| | |
|---|---|
| 0d1-Cy-Cy-3 | 36.0% |
| 1d1-Cy-Cy-3 | 12.0% |
| 3-Ph-Ph3-CFFO-Ph1-F | 13.5% |
| 3-Cy-Cy-CFFO-Ph1-F | 13.0% |
| 0d3-Cy-Cy-Ph-1 | 7.5% |
| 3-Cy-Cy-Ph-Ph3-F | 1.0% |
| 3-Ph-Ph1-Ph3-CFFO-Ph1-F | 1.5% |
| 4-Ph-Ph1-Ph3-CFFO-Ph1-F | 8.5% |
| 5-Ph-Ph1-Ph3-CFFO-Ph1-F | 7.0% |
| Tni | 75.4° C. |
| T-n | −28 |
| Vth | 1.51 V |
| $\gamma_1$ | 76 mPa·s |
| $\epsilon\perp$ | 3.21 |
| $\Delta\epsilon$ | 8.15 |
| no | 1.491 |
| $\Delta n$ | 0.118 |
| $\eta 20$ | 14.1 mPa·s |

This liquid crystal composition is a liquid crystal composition that does not contain compounds represented by general formula (LC0) of Example 20. The results show that in Example 20, the viscosity is significantly low, $\gamma_1$ is small, $T_{ni}$ is high, and the combination of the present invention is significantly advantageous.

Example 21

A liquid crystal composition prepared and the physical property values thereof are as follows.

TABLE 28

| | |
|---|---|
| 0d3-Cy-Cy-3 | 12.5% |
| 0d1-Cy-Cy-5 | 12.5% |
| 0d3-Cy-Cy-Ph-1 | 5.0% |
| 3-Ph-Ph3-O1-P h3-F | 25.0% |
| 3-Cy-Ph1-Ph3-CFFO-Ph3-F | 10.0% |
| 0d1-Cy-Cy-Ph1-F | 12.5% |
| 0d3-Cy-Cy-Ph1-F | 12.5% |
| 3-Cy-Cy-Ph3-O1-Ph-OCFFF | 10.0% |
| Tni | 65.6 |
| T-n | −32 |
| Vth | 1.30 V |
| $\gamma_1$ | 79 mPa·s |
| $\epsilon\perp$ | 4.73 |
| $\Delta\epsilon$ | 10.00 |
| no | 1.477 |
| $\Delta$n | 0.091 |
| $\eta$20 | 15.1 mPa·s |

Comparative Example 7

A liquid crystal composition prepared and the physical property values thereof are as follows.

TABLE 29

| | |
|---|---|
| 0d3-Cy-Cy-3 | 12.5% |
| 0d1-Cy-Cy-5 | 12.5% |
| 0d3-Cy-Cy-Ph-1 | 5.0% |
| 3-Ph-Ph3-1O-Ph3-F | 25.0% |
| 3-Cy-Ph1-Ph3-CFFO-Ph3-F | 10.0% |
| 0d1-Cy-Cy-Ph1-F | 12.5% |
| 0d3-Cy-Cy-Ph1-F | 12.5% |
| 3-Cy-Cy-Ph3-O1-Ph-OCFFF | 10.0% |
| Tni | 54.7 |
| T-n | −30 |
| Vth | 1.29 V |
| $\gamma_1$ | 90 mPa·s |
| $\epsilon\perp$ | 3.32 |
| $\Delta\epsilon$ | 10.51 |
| no | 1.476 |
| $\Delta$n | 0.089 |
| $\eta$20 | 19.7 mPa·s |

This liquid crystal composition is a liquid crystal composition that does not contain a compound represented by general formula (LC0) of this application. The results show that in Example 21, the viscosity is significantly low, $\gamma_1$ is small, and the combination of the present invention is significantly advantageous.

Comparative Example 8

A liquid crystal composition prepared and the physical property values thereof are as follows.

TABLE 30

| | |
|---|---|
| 0d3-Cy-Cy-3 | 12.5% |
| 0d1-Cy-Cy-5 | 12.5% |
| 0d3-Cy-Cy-Ph-1 | 5.0% |
| 3-Ph-Ph-O1-Ph3-F | 25.0% |
| 3-Cy-Ph1-Ph3-CFFO-Ph3-F | 10.0% |
| 0d1-Cy-Cy-Ph1-F | 12.5% |
| 0d3-Cy-Cy-Ph1-F | 12.5% |
| 3-Cy-Cy-Ph3-O1-Ph-OCFFF | 10.0% |
| Tni | 73.0 |
| T-n | −28 |
| Vth | 1.63 V |
| $\gamma_1$ | 84 mPa·S |
| $\epsilon\perp$ | 3.17 |
| $\Delta\epsilon$ | 6.94 |
| no | 1.488 |
| $\Delta$n | 0.102 |
| $\eta$20 | 17.6 mPa·s |

TABLE 30-continued

This liquid crystal composition is a liquid crystal composition that does not contain a compound represented by general formula (LC0) of this application. The results show that in Example 21, the driving voltage is low, the viscosity is low, $\gamma_1$ is small, and the combination of the present invention is significantly advantageous.

Example 22

A liquid crystal composition prepared and the physical property values thereof are as follows.

TABLE 31

| | |
|---|---|
| 0d3-Cy-Cy-3 | 18.0% |
| 0d1-Cy-Cy-5 | 18.0% |
| 0d3-Cy-Cy-Ph-1 | 5.0% |
| 3-Ph-Ph3-O1-Ph3-F | 14.0% |
| 3-Cy-Ph1-Ph3-CFFO-Ph3-F | 10.0% |
| 0d1-Cy-Cy-Ph1-F | 12.5% |
| 0d3-Cy-Cy-Ph1-F | 12.5% |
| 3-Cy-Cy-Ph3-O1-Ph-OCFFF | 10.0% |
| Tni | 73.7 |
| T-n | −33 |
| Vth | 1.56 V |
| $\gamma_1$ | 66 mPa·s |
| $\epsilon\perp$ | 3.29 |
| $\Delta\epsilon$ | 7.83 |
| no | 1.480 |
| $\Delta$n | 0.084 |
| $\eta$20 | 12.6 mPa·s |

Example 23

A liquid crystal composition prepared and the physical property values thereof are as follows.

TABLE 32

| | |
|---|---|
| 0d3-Cy-Cy-3 | 17.5% |
| 0d1-Cy-Cy-5 | 17.5% |
| 0d3-Cy-Cy-Ph-1 | 5.0% |
| 3-Ph-Ph3-O1-Ph-OCFFF | 10.0% |
| 3-Cy-Ph1-Ph3-CFFO-Ph3-F | 10.0% |
| 3-Ph-Ph1-Ph3-O1-Ph3-F | 15.0% |
| 3-Cy-Ph-Ph3-F | 15.0% |
| 3-Cy-Cy-Ph3-O1-Ph-OCFFF | 10.0% |
| Tni | 72.7 |
| T-n | −31 |
| Vth | 1.43 V |
| $\gamma_1$ | 73 mPa·s |
| $\epsilon\perp$ | 3.35 |
| $\Delta\epsilon$ | 9.41 |
| no | 1.489 |
| $\Delta$n | 0.102 |
| $\eta$20 | 13.4 mPa·s |

Example 24

A liquid crystal composition prepared and the physical property values thereof are as follows.

TABLE 33

| | |
|---|---|
| 0d3-Cy-Cy-3 | 20.0% |
| 0d1-Cy-Cy-5 | 20.0% |

TABLE 33-continued

| | |
|---|---|
| 3-Ph-Ph3-O1-Ph3-F | 10.0% |
| 3-Ph-Ph3-O1-Ph-OCFFF | 10.0% |
| 3-Cy-Ph1-Ph3-CFFO-Ph3-F | 10.0% |
| 3-Ph-Ph1-Ph3-O1-Ph3-F | 10.0% |
| 3-Cy-Cy-Ph3-O1-Ph-OCFFF | 20.0% |
| Tni | 71.6 |
| T-n | −34 |
| Vth | 1.40 V |
| $γ_1$ | 61 mPa·s |
| $ε⊥$ | 3.45 |
| $Δε$ | 9.83 |
| no | 1.486 |
| $Δn$ | 0.096 |
| $η20$ | 11.9 mPa·s |

Example 25

A liquid crystal composition prepared and the physical property values thereof are as follows.

TABLE 34

| | |
|---|---|
| 0d3-Cy-Cy-3 | 20.0% |
| 0d1-Cy-Cy-5 | 20.0% |
| 3-Ph-Ph3-O1-Ph3-F | 15.0% |
| 3-Cy-Ph1-Ph3-CFFO-Ph3-F | 10.0% |
| 3-Ph-Ph1-Ph3-O1-Ph3-F | 10.0% |
| 0d1-Cy-Cy-Ph1-F | 5.0% |
| 0d3-Cy-Cy-Ph1-F | 5.0% |
| 3-Cy-Cy-Ph3-O1-Ph-OCFFF | 15.0% |
| Tni | 72.1 |
| T-n | −30 |
| Vth | 1.41 V |
| $γ_1$ | 69 mPa·s |
| $ε⊥$ | 3.42 |
| $Δε$ | 9.81 |
| no | 1.484 |
| $Δn$ | 0.091 |
| $η20$ | 13.0 mPa·s |

Example 26

A liquid crystal composition prepared and the physical property values thereof are as follows.

TABLE 35

| | |
|---|---|
| 0d3-Cy-Cy-3 | 12.5% |
| 0d1-Cy-Cy-5 | 12.5% |
| 3-Ph-Ph3-O1-Ph3-F | 5.0% |
| 3-Ph-Ph3-O1-Ph3-OCFFF | 5.0% |
| 3-Ph-Ph1-Ph3-O1-Ph3-F | 15.0% |
| 3-Ph-Ph1-Ph3-O1-Ph-OCFF | 15.0% |
| 3-Cy-Ph-CFFO-Ph3-F | 5.0% |
| 3-Cy-Cy-CFFO-Ph3-F | 5.0% |
| 3-Cy-Ph-OCFF-Ph3-F | 10.0% |
| 3-Cy-Ph1-Ph3-O1-Ph-OCFFF | 5.0% |
| 3-Cy-Cy-Ph3-O1-Ph-OCFFF | 10.0% |
| Tni | 82.1 |
| T-n | −31 |
| Vth | 1.23 V |
| $γ_1$ | 81 mPa·s |
| $ε⊥$ | 3.46 |
| $Δε$ | 10.33 |
| no | 1.493 |
| $Δn$ | 0.113 |
| $η20$ | 15.6 mPa·s |

Example 27

A liquid crystal composition prepared and the physical property values thereof are as follows.

TABLE 36

| | |
|---|---|
| 0d3-Cy-Cy-3 | 10.0% |
| 0d1-Cy-Cy-5 | 10.0% |
| 3-Ph-Ph3-O1-Ph3-OCFFF | 10.0% |
| 3-Ph-Ph1-Ph3-O1-Ph3-F | 10.0% |
| 3-Ph-Ph1-Ph3-O1-Ph-OCFF | 10.0% |
| 3-Cy-Ph-CFFO-Ph3-F | 10.0% |
| 3-Cy-Cy-CFFO-Ph3-F | 10.0% |
| 3-Cy-Ph-OCFF-Ph3-F | 10.0% |
| 3-Cy-Ph1-Ph3-O1-Ph-OCFFF | 10.0% |
| 3-Cy-Cy-Ph3-O1-Ph-OCFFF | 10.0% |
| Tni | 82.0 |
| T-n | −34 |
| Vth | 1.25 V |
| $γ_1$ | 82 mPa·s |
| $ε⊥$ | 3.42 |
| $Δε$ | 10.06 |
| no | 1.490 |
| $Δn$ | 0.107 |
| $η20$ | 15.9 mPa·s |

Example 28

A liquid crystal composition prepared and the physical property values thereof are as follows.

TABLE 37

| | |
|---|---|
| 0d1-Cy-Cy-2 | 10.0% |
| 0d1-Cy-Cy-3 | 10.0% |
| 1d1-Cy-Cy-1d1 | 10.0% |
| 3-Cy-Cy-2 | 5.0% |
| 5-Ph-Ph-1 | 5.0% |
| 3-Ph-Ph3-O1-Ph3-F | 5.0% |
| 3-Ph-Ph1-Ph3-O1-Ph-OCFF | 10.0% |
| 3-Cy-Cy-CFFO-Ph3-F | 15.0% |
| 3-Cy-Ph-OCFF-Ph3-F | 10.0% |
| 3-Cy-Ph1-Ph3-O1-Ph-OCFFF | 10.0% |
| 3-Cy-Cy-Ph3-O1-Ph-OCFFF | 10.0% |
| Tni | 80.2 |
| T-n | −31 |
| Vth | 1.60 V |
| $γ_1$ | 60 mPa·s |
| $ε⊥$ | 3.12 |
| $Δε$ | 7.02 |
| no | 1.481 |
| $Δn$ | 0.084 |
| $η20$ | 11.8 mPa·s |

The results show that the liquid crystal compositions of Examples 3 to 9 have a low viscosity and a small $γ_1$, and that the combination of the present invention is significantly advantageous.

Example 29

A first substrate on which a pair of transparent electrodes each having a comb-shape electrode structure were disposed and a second substrate on which no electrode structures were formed were used. A vertical alignment film was formed on each substrate and an IPS empty cell in which the gap distance between the first substrate and the second substrate was 4.0 μm was fabricated. A liquid crystal composition of Example 22 was poured into the empty cell to form a liquid crystal display device. Electro optic properties of the liquid crystal display device were measured. The applied voltage at which the transmittance changed by 10% was 1.45 V. The response speed under application of 5 V was 4.7 msec and the response speed was 16.2 sec when the voltage was turned off.

A polymerizable liquid crystal composition CLC-B was prepared by adding 1% of a polymerizable compound represented by formula (PC-1)-3-1 to 99% of the liquid crystal composition of Example 22 and homogeneously dissolving the polymerizable compound therein:

[Chem. 29]

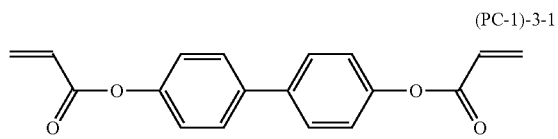

(PC-1)-3-1

The physical properties of CLC-B were not significantly different from the physical properties of the liquid crystal composition of Example 22.

The CLC-B was held in the IPS empty cell described above and the resulting liquid crystal cell was irradiated with ultraviolet light from a high-pressure mercury lamp through a filter that cut UV rays of 300 nm or lower while applying a 1.8 V square wave at a frequency of 1 kHz. The irradiation strength at the cell surface was adjusted to 20 mW/cm² and irradiation was continued for 600 seconds to obtain a vertical alignment liquid crystal display device in which the polymerizable compound in the polymerizable liquid crystal composition was polymerized. The electro optic properties of the display deice were measured and the applied voltage at which the transmittance changed by 10% was 1.71 v. The response speed under application of 5 v was 4.6 msec. The response speed was 4.2 msec when the voltage was turned off. This was significantly fast compared to the liquid crystal display device fabricated by using only the liquid crystal composition of Example 22.

Example 30

A liquid crystal composition prepared and the physical property values thereof are as follows.

TABLE 38

| | |
|---|---|
| 0d3-Cy-Cy-3 | 12.50% |
| 0d1-Cy-Cy-5 | 12.50% |
| 3-Cy-Ph3-O1-Ph3-F | 25.00% |
| 3-Cy-Cy-Ph3-Ph1-F | 10.00% |
| 0d1-Cy-Cy-Ph1-F | 12.50% |
| 0d3-Cy-Cy-Ph1-F | 12.50% |
| 3-Ph-Ph-Ph3-CFFO-Ph3-F | 10.00% |
| Tni | 73.3 |
| T-n | −32 |
| Vth | 1.47 V |
| γ₁ | 75 mPa·s |
| ε⊥ | 3.26 |
| Δε | 8.53 |
| no | 1.478 |
| Δn | 0.093 |
| η20 | 13.7 mPa·s |

Comparative Example 9

A liquid crystal composition prepared and the physical property values thereof are as follows.

TABLE 39

| | |
|---|---|
| 0d3-Cy-Cy-3 | 12.50% |
| 0d1-Cy-Cy-5 | 12.50% |
| 3-Cy-Ph-O1-Ph3-F | 25.00% |
| 3-Cy-Cy-Ph3-Ph1-F | 10.00% |
| 0d1-Cy-Cy-Ph1-F | 12.50% |

TABLE 39-continued

| | |
|---|---|
| 0d3-Cy-Cy-Ph1-F | 12.50% |
| 3-Ph-Ph-Ph3-CFFO-Ph3-F | 10.00% |
| Tni | 78.8 |
| T-n | −28 |
| Vth | 1.70 V |
| γ₁ | 88 mPa·s |
| ε⊥ | 3.05 |
| Δε | 6.65 |
| no | 1.478 |
| Δn | 0.095 |
| η20 | 17.2 mPa·s |

This liquid crystal composition is a liquid crystal composition that does not contain a compound represented by general formula (LC0) of the present application. The results show that in Example 30, the viscosity is significantly low, γ₁ is small, and the combination of the present invention is significantly advantageous.

Example 31

A liquid crystal composition prepared and the physical property values thereof are as follows.

TABLE 40

| | |
|---|---|
| 0d1-Cy-Cy-3 | 36.00% |
| 1d1-Cy-Cy-3 | 12.00% |
| 3-Cy-Ph3-O1-Ph3-F | 13.50% |
| 3-Cy-Cy-CFFO-Ph3-F | 13.00% |
| 0d3-Cy-Cy-Ph-1 | 7.50% |
| 3-Cy-Cy-Ph-Ph3-F | 1.00% |
| 3-Ph-Ph1-Ph3-CFFO-Ph3-F | 1.50% |
| 4-Ph-Ph1-Ph3-O1-Ph3-F | 8.50% |
| 5-Ph-Ph1-Ph3-CFFO-Ph3-F | 7.00% |
| Tni | 76.0°C. |
| T-n | −30 |
| Vth | 1.64 V |
| γ₁ | 57 mPa·s |
| ε⊥ | 3.23 |
| Δε | 7.16 |
| no | 1.489 |
| Δn | 0.099 |
| η20 | 10.4 mPa·s |

Example 32

A liquid crystal composition prepared and the physical property values thereof are as follows.

TABLE 41

| | |
|---|---|
| 0d3-Cy-Cy-3 | 20.00% |
| 0d1-Cy-Cy-5 | 20.00% |
| 3-Cy-Ph3-O1-Ph3-F | 10.00% |
| 3-Cy-Ph3-O1-Ph3-OCFFF | 10.00% |
| 3-Cy-Cy-Ph3-O1-Ph-CFFF | 15.00% |
| 3-Cy-Cy-Ph3-O1-Ph-OCFFF | 15.00% |
| 3-Cy-Ph1-Ph3-CFFO-Ph3-F | 10.00% |
| Tni | 76.2 |
| T-n | −32 |
| Vth | 1.49 V |
| γ₁ | 55 mPa·s |
| ε⊥ | 3.23 |
| Δε | 8.41 |
| no | 1.478 |
| Δn | 0.073 |
| η20 | 10.3 mPa·s |

Example 33

A liquid crystal composition prepared and the physical property values thereof are as follows.

TABLE 42

| | |
|---|---|
| 0d3-Cy-Cy-3 | 22.50% |
| 0d1-Cy-Cy-5 | 22.50% |
| 0d3-Cy-Cy-Ph-1 | 5.00% |
| 3-Cy-Ph-O1-Ph3-F | 15.00% |
| 3-Cy-Cy-Ph3-O1-Ph-OCFFF | 25.00% |
| 3-Cy-Cy-CFFO-Ph3-F | 15.00% |
| Tni | 76.8 |
| T-n | −30 |
| Vth | 1.63 V |
| $\gamma_1$ | 61 mPa·s |
| $\epsilon_\perp$ | 3.11 |
| $\Delta\epsilon$ | 7.25 |
| no | 1.478 |
| $\Delta n$ | 0.073 |
| $\eta 20$ | 11.9 mPa·s |

Example 34

A liquid crystal composition prepared and the physical property values thereof are as follows.

TABLE 43

| | |
|---|---|
| 0d3-Cy-Cy-3 | 12.50% |
| 0d1-Cy-Cy-5 | 12.50% |
| 0d3-Cy-Cy-Ph-1 | 10.00% |
| 3-Cy-Ph3-O1-Ph3-F | 10.00% |
| 3-Cy-Ph3-O1-Ph3-OCFFF | 10.00% |
| 3-Ph3-O1-Cy-Ph3-Ph3-F | 10.00% |
| 3-Cy-Cy-Ph3-O1-Ph-CFFF | 10.00% |
| 3-Cy-Cy-Ph3-O1-Ph-OCFFF | 10.00% |
| 3-Ph-Ph-Ph3-CFFO-Ph3-F | 5.00% |
| 3-Cy-Cy-CFFO-Ph3-F | 10.00% |
| Tni | 77.9 |
| T-n | −32 |
| Vth | 1.43 V |
| $\gamma_1$ | 73 mPa·s |
| $\epsilon_\perp$ | 4.68 |
| $\Delta\epsilon$ | 10.42 |
| no | 1.481 |
| $\Delta n$ | 0.082 |
| $\eta 20$ | 13.4 mPa·s |

Example 35

A liquid crystal composition prepared and the physical property values thereof are as follows.

TABLE 44

| | |
|---|---|
| 0d3-Cy-Cy-3 | 10.00% |
| 0d1-Cy-Cy-5 | 10.00% |
| 3-Cy-Ph3-O1-Ph3-F | 10.00% |
| 3-Cy-Ph3-O1-Ph3-OCFFF | 10.00% |
| 3-Ph3-O1-Cy-Ph3-Ph3-F | 10.00% |
| 3-Cy-Cy-Ph3-O1-Ph-CFFF | 10.00% |
| 3-Cy-Cy-Ph3-O1-Ph-OCFFF | 10.00% |
| 3-Cy-Ph1-Ph3-CFFO-Ph3-F | 10.00% |
| 3-Cy-Cy-CFFO-Ph3-F | 20.00% |
| Tni | 77.6 |
| T-n | −33 |
| Vth | 1.20 V |
| $\gamma_1$ | 83 mPa·s |
| $\epsilon_\perp$ | 4.8 |
| $\Delta\epsilon$ | 13.11 |
| no | 1.481 |
| $\Delta n$ | 0.08 |
| $\eta 120$ | 16.2 mPa·s |

Example 36

A liquid crystal composition prepared and the physical property values thereof are as follows.

TABLE 45

| | |
|---|---|
| 0d3-Cy-Cy-3 | 20.00% |
| 0d1-Cy-Cy-5 | 20.00% |
| 3-Cy-Ph3-O1-Ph3-OCFFF | 10.00% |
| 3-Cy-Ph3-O1-Ph-CFFF | 10.00% |
| 3-Cy-Cy-Ph3-O1-Ph-OCFFF | 10.00% |
| 3-Ph-Ph1-Ph3-CFFO-Ph3-F | 10.00% |
| 3-Ph-Ph-Ph3-CFFO-Ph3-F | 10.00% |
| 3-Cy-Ph1-Ph3-CFFO-Ph3-F | 10.00% |
| Tni | 83.5 |
| T-n | −30 |
| Vth | 1.23 V |
| $\gamma_1$ | 75 mPa·s |
| $\epsilon_\perp$ | 4.58 |
| $\Delta\epsilon$ | 12.32 |
| no | 1.489 |
| $\Delta n$ | 0.101 |
| $\eta 20$ | 13.5 mPa·s |

Example 37

A liquid crystal composition prepared and the physical property values thereof are as follows.

TABLE 46

| | |
|---|---|
| 0d3-Cy-Cy-3 | 10.00% |
| 0d1-Cy-Cy-5 | 10.00% |
| 0d3-Cy-Cy-Ph-1 | 10.00% |
| 3-Cy-Ph3-O1-Ph3-F | 10.00% |
| 3-Cy-Ph3-O1-Ph3-OCFFF | 10.00% |
| 3-Cy-Cy-Ph3-O1-Ph-CFFF | 15.00% |
| 3-Cy-Cy-Ph3-O1-Ph-OCFFF | 15.00% |
| 3-Cy-Cy-CFFO-Ph3-F | 20.00% |
| Tni | 88.8 |
| T-n | −31 |
| Vth | 1.60 V |
| $\gamma_1$ | 73 mPa·s |
| $\epsilon_\perp$ | 3.15 |
| $\Delta\epsilon$ | 7.54 |
| no | 1.478 |
| $\Delta n$ | 0.074 |
| $\eta 20$ | 13.2 mPa·s |

Example 38

A liquid crystal composition prepared and the physical property values thereof are as follows.

TABLE 47

| | |
|---|---|
| 0d1-Cy-Cy-2 | 10.00% |
| 0d1-Cy-Cy-3 | 10.00% |
| 1d1-Cy-Cy-1d1 | 5.00% |
| 3-Ph-Ph3-O1-Ph3-F | 5.00% |
| 3-Ph-Ph1-Ph3-O1-Ph3-OCFFF | 10.00% |
| 3-Ph-Ph3-CFFO-Ph3-F | 10.00% |
| 3-Cy-Ph1-Ph3-CFFO-Ph3-F | 10.00% |
| 3-Ph3-O1-Cy-Ph3-Ph3-F | 10.00% |
| 3-Cy-Cy-Ph3-O1-Ph-OCFFF | 10.00% |
| 3-Cy-Ph1-Ph3-O1-Ph-OCFFF | 10.00% |
| Tni | 74.4 |
| T-n | −33 |
| Vth | 1.18 V |
| $\gamma_1$ | 80 mPa·s |
| $\epsilon_\perp$ | 4.85 |
| $\Delta\epsilon$ | 13.74 |
| no | 1.49 |
| $\Delta n$ | 0.103 |
| $\eta 20$ | 15.7 mPa·s |

The results show that the liquid crystal compositions of Examples 31 to 38 have a low viscosity and a small $\gamma_1$ and that the combination of the present invention is significantly advantageous.

Example 39

A first substrate on which a pair of transparent electrodes each having a comb-shape electrode structure were disposed and a second substrate on which no electrode structures were formed were used. A vertical alignment film was formed on each substrate and an IPS empty cell in which the gap distance between the first substrate and the second substrate was 4.0 µm was fabricated. A liquid crystal composition of Example 32 was poured into the empty cell to form a liquid crystal display device. Electro optic properties of the liquid crystal display device were measured. The applied voltage at which the transmittance changed by 10% was 1.63 v. The response speed under application of 5 v was 4.4 msec and the response speed was 12.3 sec when the voltage was turned off.

A polymerizable liquid crystal composition CLC-C was prepared by adding 1% of a polymerizable compound represented by formula (PC-1)-3-1 to 99% of the liquid crystal composition of Example 32 and homogeneously dissolving the polymerizable compound therein:

[Chem. 30]

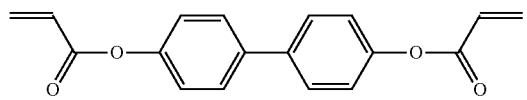

(PC-1)-3-1

The physical properties of CLC-C were not significantly different from the physical properties of the liquid crystal composition of Example 32.

The CLC-C was held in the IPS empty cell described above and the resulting liquid crystal cell was irradiated with ultraviolet light from a high-pressure mercury lamp through a filter that cut UV rays of 300 nm or lower while applying a 1.8 V square wave at a frequency of 1 kHz. The irradiation strength at the cell surface was adjusted to 20 mW/cm$^2$ and irradiation was continued for 600 seconds to obtain a vertical alignment liquid crystal display device in which the polymerizable compound in the polymerizable liquid crystal composition was polymerized. The electro optic properties of the display deice were measured and the applied voltage at which the transmittance changed by 10% was 1.86 v. The response speed under application of 5 v was 4.4 msec. The response speed was 4.3 msec when the voltage was turned off. This was significantly fast compared to the liquid crystal display device fabricated by using only the liquid crystal composition of Example 32.

Example 40 and Comparative Example 10

A liquid crystal composition containing a compound represented by general formula (LC0) and a liquid crystal composition not containing the compound were prepared. The physical property values of these compositions were as follows.

TABLE 48

| Compound | Example 40 | Comparative Example 10 |
|---|---|---|
| 1d1-Cy-Cy-2 | 15.0% | 15.0% |
| 0d3-Cy-Cy-3 | 15.0% | 15.0% |
| 0d1-Cy-Cy-Ph1-F | 25.0% | 25.0% |
| 0d3-Cy-Cy-Ph1-F | 25.0% | 25.0% |

TABLE 48-continued

| Compound | Example 40 | Comparative Example 10 |
|---|---|---|
| 3-Ph3-O1-Cy-Ph3-Ph1-F | 20.0% | |
| 3-Ph3-1O-Cy-Ph3-Ph1-F | | 20.0% |
| Tni | 94.2 | 86.6 |
| ε⊥ | 3.0 | 3.1 |
| Δε | 7.6 | 7.8 |
| no | 1.480 | 1.480 |
| Δn | 0.081 | 0.083 |
| η20 | 16.5 mPa·s | 20.2 mPa·s |

The liquid crystal composition of Example 1 contains a compound represented by general formula (LC0-98) of the present invention and the liquid crystal composition of Comparative Example 10 is a liquid crystal composition that does not contain a compound represented by general formula (LC0). Although the values of Δε and Δn are substantially the same, $T_{ni}$ is increased significantly, the upper limit temperature of the liquid crystal phase is significantly expanded, and the viscosity is decreased by about 20% in Example 1. This shows that the combination of the present invention is significantly advantageous.

Example 41

A liquid crystal composition prepared and the physical property values thereof are as follows.

TABLE 49

| | |
|---|---|
| 0d1-Cy-Cy-3 | 10.0% |
| 0d3-Cy-Cy-3 | 10.0% |
| 1d1-Cy-Cy-3 | 10.0% |
| 0d1-Cy-Cy-1d1 | 10.0% |
| 3-Ph3-O1-Cy-Ph3-Ph1-F (General formula LC0-9) | 5.0% |
| 3-Ph3-O1-Cy-Ph3-Ph3-F (General formula LC0-10) | 5.0% |
| 3-Ph3-O1-Cy-Ph3-Ph-OCFFF (General formula LC0-3) | 5.0% |
| 3-Cy-Ph-Ph3-F | 5.0% |
| 3-Cy-Cy-Ph3-OCFFF | 5.0% |
| 3-Cy-Ph-Ph3-OCFFF | 5.0% |
| 3-Ph-Ph1-Ph3-OCFFF | 5.0% |
| 0d3-Ph-Ph-Ph3-F | 5.0% |
| 3-Cy-Cy-CFFO-Ph3-F | 10.0% |
| 3-Ph-Ph1-Ph3-CFFO-Ph3-F | 10.0% |
| Tni | 75.2 |
| T-n | −35 |
| Vth | 1.22 V |
| γ1 | 87 mPa·s |
| ε⊥ | 5.3 |
| Δε | 12.2 |
| no | 1.490 |
| Δn | 0.101 |
| η20 | 18.8 mPa·s |

Example 42

A liquid crystal composition prepared and the physical property values thereof are as follows.

TABLE 50

| | |
|---|---|
| 0d1-Cy-Cy-3 | 10.0% |
| 1d1-Cy-Cy-2 | 10.0% |
| 0d3-Cy-Cy-3 | 10.0% |
| 0d1-Cy-Cy-1d1 | 10.0% |
| 5-Ph-Ph-1 | 5.0% |
| 0d1-Cy-Ph-O4 | 5.0% |
| 3-Cy-Cy-Ph-1 | 5.0% |
| 1-Ph-Ph1-Ph-3d0 | 5.0% |
| 2-Ph-Ph1-Ph-3d0 | 5.0% |
| 3-Ph3-O1-Cy-Ph3-Ph1-F (General formula LC0-9) | 5.0% |

TABLE 50-continued

| | |
|---|---|
| 3-Ph3-O1-Cy-Ph3-Ph3-F (General formula LC0-10) | 5.0% |
| 3-Ph3-O1-Cy-Ph3-Ph-OCFFF (General formula LC0-3) | 5.0% |
| 3-Cy-Cy-Ph3-OCFFF | 10.0% |
| 3-Ph-Ph1-Ph3-CFFO-Ph3-F | 10.0% |
| Tni | 74.5 |
| T-n | −36 |
| Vth | 1.35 V |
| $\gamma_1$ | 81 mPa·s |
| $\epsilon_\perp$ | 3.1 |
| $\Delta\epsilon$ | 8.6 |
| no | 1.493 |
| $\Delta n$ | 0.107 |
| $\eta 20$ | 15.0 mPa·s |

Example 43

A liquid crystal composition prepared and the physical property values thereof are as follows.

TABLE 51

| | |
|---|---|
| 1d1-Cy-Cy-2 | 10.0% |
| 0d3-Cy-Cy-3 | 10.0% |
| 1d1-Cy-Cy-3 | 10.0% |
| 0d1-Cy-Cy-1d1 | 10.0% |
| 3-Cy-Cy-2 | 5.0% |
| 0d1-Cy-Cy-Ph-1 | 5.0% |
| 1-Ph-Ph1-Ph-3d0 | 5.0% |
| 2-Ph-Ph1-Ph-3d0 | 5.0% |
| 3-Cy-Ph-Ph3-F | 5.0% |
| 3-Cy-Cy-Ph3-OCFFF | 5.0% |
| 3-Ph3-O1-Cy-Ph3-Ph3-F (General formula LC0-10) | 5.0% |
| 3-Ph-Ph3-O1-Ph3-F | 5.0% |
| 3-Cy-Ph1-Ph3-O1-Ph-OCFFF | 5.0% |
| 3-Cy-Ph3-O1-Ph3-Ph-OCFFF | 5.0% |
| 3-Cy-Cy-CFFO-Ph3-F | 5.0% |
| 3-Cy-Ph1-Ph3-CFFO-Ph3-F | 5.0% |
| Tni | 78.6 |
| T-n | −33 |
| Vth | 1.58 V |
| $\gamma_1$ | 77 mPa·s |
| $\epsilon_\perp$ | 3.1 |
| $\Delta\epsilon$ | 7.5 |
| no | 1.478 |
| $\Delta n$ | 0.098 |
| $\eta 20$ | 13.6 mPa·s |

Example 44

A liquid crystal composition prepared and the physical property values thereof are as follows.

TABLE 52

| | |
|---|---|
| 0d3-Cy-Cy-3 | 10.0% |
| 1d1-Cy-Cy-3 | 10.0% |
| 0d1-Cy-Cy-1d1 | 10.0% |
| 3-Cy-Cy-2 | 5.0% |
| 1-Ph-Ph1-Ph-3d0 | 5.0% |
| 3-Cy-Ph-Ph3-F | 5.0% |
| 3-Cy-Cy-Ph3-OCFFF | 5.0% |
| 3-Ph3-O1-Cy-Ph3-Ph3-F (General formula LC0-10) | 5.0% |
| 3-Ph3-O1-Cy-Ph3-Ph-OCFFF (General formula LC0-3) | 5.0% |
| 3-Cy-Ph3-O1-Ph3-F | 5.0% |
| 3-Cy-Ph3-O1-Ph-OCFFF | 5.0% |
| 3-Ph-Ph3-O1-Ph-OCFFF | 5.0% |
| 3-Cy-Ph1-Ph3-O1-Ph-F | 5.0% |
| 3-Cy-Ph1-Ph3-O1-Ph-OCFFF | 5.0% |
| 3-Ph-Ph1-Ph3-O1-Ph-OCFFF | 5.0% |
| 3-Cy-Cy-CFFO-Ph3-F | 5.0% |
| 3-Cy-Ph1-Ph3-CFFO-Ph3-F | 5.0% |
| Tni | 74.9 |
| T-n | −35 |
| Vth | 1.31 V |
| $\gamma_1$ | 79 mPa·s |
| $\epsilon_\perp$ | 3.4 |
| $\Delta\epsilon$ | 10.1 |
| no | 1.484 |
| $\Delta n$ | 0.101 |
| $\eta 20$ | 15.2 mPa·s |

Example 45

A liquid crystal composition prepared and the physical property values thereof are as follows.

TABLE 53

| | |
|---|---|
| 1d1-Cy-Cy-2 | 10.0% |
| 0d3-Cy-Cy-3 | 10.0% |
| 1d1-Cy-Cy-3 | 10.0% |
| 3-Cy-Cy-2 | 5.0% |
| 0d1-Cy-Cy-Ph-1 | 5.0% |
| 2-Ph-Ph1-Ph-3d0 | 5.0% |
| 3-Cy-Ph-Ph3-F | 5.0% |
| 3-Cy-Cy-Ph3-OCFFF | 5.0% |
| 3-Ph3-O1-Cy-Ph3-Ph3-F (General formula LC0-10) | 5.0% |
| 3-Ph3-O1-Cy-Ph3-Ph-OCFFF (General formula LC0-3) | 5.0% |
| 3-Ph-Ph3-O1-Ph-F | 5.0% |
| 3-Cy-Ph1-Ph3-O1-Ph-F | 5.0% |
| 3-Cy-Ph1-Ph3-O1-Ph-OCFFF | 5.0% |
| 3-Ph-Ph1-Ph3-O1-Ph-OCFFF | 5.0% |
| 3-Cy-Ph3-O1-Ph3-Ph-OCFFF | 5.0% |
| 3-Cy-Cy-CFFO-Ph3-F | 5.0% |
| 3-Cy-Ph1-Ph3-CFFO-Ph3-F | 5.0% |
| Tni | 83.3 |
| T-n | −34 |
| Vth | 1.31 V |
| $\gamma_1$ | 83 mPa·s |
| $\epsilon_\perp$ | 3.4 |
| $\Delta\epsilon$ | 10.2 |
| no | 1.486 |
| $\Delta n$ | 0.101 |
| $\eta 20$ | 16.6 mPa·s |

Example 46

A liquid crystal composition prepared and the physical property values thereof are as follows.

TABLE 54

| | |
|---|---|
| 1d1-Cy-Cy-2 | 10.0% |
| 0d3-Cy-Cy-3 | 10.0% |
| 1d1-Cy-Cy-3 | 10.0% |
| 3-Cy-Cy-2 | 5.0% |
| 0d1-Cy-Cy-Ph-1 | 10.0% |
| 2-Ph-Ph1-Ph-3d0 | 5.0% |
| 3-Cy-Ph-Ph3-F | 5.0% |
| 3-Cy-Cy-Ph3-OCFFF | 5.0% |
| 3-Ph3-O1-Cy-Ph3-Ph-OCFFF (General formula LC0-3) | 5.0% |
| 3-Cy-Ph3-O1-Ph3-F | 5.0% |
| 3-Cy-Ph3-O1-Ph-OCFFF | 5.0% |
| 3-Ph-Ph3-O1-Ph-OCFFF | 5.0% |
| 3-Ph-Ph1-Ph3-O1-Ph-OCFFF | 5.0% |
| 3-Cy-Ph3-O1-Ph3-Ph-OCFFF | 5.0% |
| 3-Cy-Cy-CFFO-Ph3-F | 5.0% |
| 3-Cy-Ph1-Ph3-CFFO-Ph3-F | 5.0% |
| Tni | 77.9 |
| T-n | −36 |
| Vth | 1.58 V |
| $\gamma_1$ | 75 mPa·s |
| $\epsilon_\perp$ | 3.0 |
| $\Delta\epsilon$ | 7.5 |
| no | 1.482 |

TABLE 54-continued

| | |
|---|---|
| $\Delta n$ | 0.099 |
| $\eta 20$ | 12.8 mPa·s |

Example 47

A liquid crystal composition prepared and the physical property values thereof are as follows.

TABLE 55

| | |
|---|---|
| 0d3-Cy-Cy-3 | 10.0% |
| 1d1-Cy-Cy-3 | 10.0% |
| 0d1-Cy-Cy-1d1 | 10.0% |
| 2-Ph-Ph1-Ph-3d0 | 5.0% |
| 3-Ph3-O1-Cy-ph3-ph3-F (General formula LC0-10) | 5.0% |
| 3-Ph3-O1-Cy-Ph3-Ph-OCFFF (General formula LC0-3) | 5.0% |
| 3-Cy-Ph3-O1-Ph3-F | 5.0% |
| 3-Cy-Ph3-O1-Ph-OCFFF | 10.0% |
| 3-Ph-Ph3-O1-Ph-OCFFF | 10.0% |
| 3-Cy-Ph1-Ph3-O1-Ph-OCFFF | 10.0% |
| 3-Ph-Ph1-Ph3-O1-Ph-OCFFF | 10.0% |
| 3-Cy-Ph3-O1-Ph3-Ph-OCFFF | 10.0% |
| Tni | 76.6 |
| T-n | −35 |
| Vth | 1.34 V |
| $\gamma_1$ | 72 mPa·s |
| $\epsilon\perp$ | 3.3 |
| $\Delta\epsilon$ | 9.8 |
| no | 1.487 |
| $\Delta n$ | 0.111 |
| $\eta 20$ | 12.1 mPa·s |

These results show that the liquid crystal compositions of Examples 2 to 8 have a low viscosity and a small $\gamma_1$, and that the combination of the present invention is significantly advantageous.

Example 48

A first substrate on which a pair of transparent electrodes each having a comb-shape electrode structure were disposed and a second substrate on which no electrode structures were formed were used. A vertical alignment film was formed on each substrate and an IPS empty cell in which the gap distance between the first substrate and the second substrate was 4.0 μm was fabricated. A liquid crystal composition of Example 44 was poured into the empty cell to form a liquid crystal display device. Electro optic properties of the liquid crystal display device were measured. The applied voltage at which the transmittance changed by 10% was 1.33 V. The response speed under application of 5 V was 4.4 msec and the response speed was 11.9 sec when the voltage was turned off.

A polymerizable liquid crystal composition CLC-D was prepared by adding 1% of a polymerizable compound represented by formula (PC-1)-3-1 to 99% of the liquid crystal composition of Example 45 and homogeneously dissolving the polymerizable compound therein:

[Chem. 31]

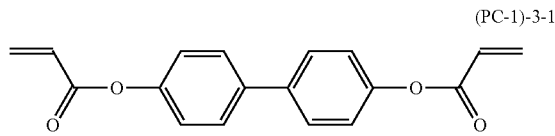 [SMILES: C=CC(=O)Oc1ccc(-c2ccc(OC(=O)C=C)cc2)cc1]

(PC-1)-3-1

The physical properties of CLC-D were not significantly different from the physical properties of the liquid crystal composition of Example 44.

The CLC-D was held in the IPS empty cell described above and the resulting liquid crystal cell was irradiated with ultraviolet light from a high-pressure mercury lamp through a filter that cut UV rays of 300 nm or lower while applying a 1.8 V square wave at a frequency of 1 kHz. The irradiation strength at the cell surface was adjusted to 20 mW/cm² and irradiation was continued for 600 seconds to obtain a vertical alignment liquid crystal display device in which the polymerizable compound in the polymerizable liquid crystal composition was polymerized. The electro optic properties of the display deice were measured and the applied voltage at which the transmittance changed by 10% was 1.36 v. The response speed under application of 5 v was 4.5 msec. The response speed was 4.6 msec when the voltage was turned off. This was significantly fast compared to the liquid crystal display device fabricated by using only the liquid crystal composition of Example 44.

Example 49

A liquid crystal composition prepared and the physical property values thereof are as follows.

TABLE 56

| | |
|---|---|
| 1d1-Cy-Cy-3 | 15.0% |
| od1-Cy-Cy-1d1 | 15.0 |
| 3-Cy-Cy-Ph-1 | 8.0 |
| 1-Ph-Ph1-Ph-3d0 | 7.0 |
| 3-Cy-Cy-Ph3-OCFFF | 10.0 |
| 3-Cy-Ph-Ph3-OCFFF | 5.0 |
| 3-Cy-Ph1-Ph3-CFFO-Ph3-F | 10.0 |
| 1d1-Cy-Ph3-O1-Ph3-F | 10.0 |
| 1d1-Cy-Ph3-O1-Ph-OCFFF | 20.0 |
| Tni | 72.4 |
| T-n | −36.0 |
| Vth | 1.64 |
| $\gamma 1$ | 52.0 |
| $\epsilon\perp$ | 3.80 |
| $\Delta\epsilon$ | 7.88 |
| no | 1.488 |
| $\Delta n$ | 0.100 |
| $\eta 20$ | 11.1 |

Comparative Example 91

A liquid crystal composition prepared and the physical property values thereof are as follows.

TABLE 57

| | |
|---|---|
| 1d1-Cy-Cy-3 | 15.0% |
| od1-Cy-Cy-1d1 | 15.0 |
| 3-Cy-Cy-Ph-1 | 8.0 |
| 1-Ph-Ph1-Ph-3d0 | 7.0 |
| 3-Cy-Cy-Ph3-OCFFF | 10.0 |
| 3-Cy-Ph-Ph3-OCFFF | 5.0 |
| 3-Cy-Ph1-Ph3-CFFO-Ph3-F | 10.0 |
| 1d1-Cy-Ph3-O1-Ph3-F | 10.0 |
| 1d1-Cy-Ph3-1O-Ph-OCFFF | 20.0 |
| Tni | 64.4 |
| T-n | −32.0 |
| Vth | 1.66 |
| $\gamma 1$ | 97.0 |
| $\epsilon\perp$ | 3.63 |
| $\Delta\epsilon$ | 7.57 |
| no | 1.488 |
| $\Delta n$ | 0.100 |
| $\eta 20$ | 21.0 |

This liquid crystal composition is a liquid crystal composition that does not contain a compound represented by general formula (LC0) having the —PH$_3$—OCH$_2$— substructure according to the present application. The results show that in Example 1, the viscosity is significantly low and $\gamma_1$ is small despite a large dielectric anisotropy ($\Delta\epsilon$) and a high nematic phase-isotropic liquid phase transition temperature ($T_{ni}$), and that the combination of the present invention is significantly advantageous.

Example 50

A liquid crystal composition prepared and the physical property values thereof are as follows.

TABLE 58

| | |
|---|---|
| 0d1-Cy-Cy-3 | 5.0% |
| 1d1-Cy-Cy-2 | 10.0 |
| 1d1-Cy-Cy-3 | 10.0 |
| 3-Cy-Cy-2 | 5.0 |
| 3-Cy-Cy-Ph3-OCFFF | 5.0 |
| 3-Cy-Ph-Ph3-OCFFF | 5.0 |
| 3-Cy-Cy-CFFO-Ph3-F | 5.0 |
| 3-Cy-Ph1-Ph3-CFFO-Ph3-F | 5.0 |
| 1d1-Cy-Ph3-O1-Ph3-F | 5.0 |
| 1d1-Cy-Ph3-O1-Ph-OCFFF | 5.0 |
| 0d1-Cy-Ph3-O1-Ph3-F | 5.0 |
| 0d1-Cy-Ph3-O1-Ph-OCFFF | 5.0 |
| 1d1-Cy-Cy-Ph3-O1-Ph3-F | 5.0 |
| 0d1-Cy-Ph1-Ph3-O1-Ph3-F | 5.0 |
| 0d1-Cy-Ph1-Ph3-O1-Ph-OCFFF | 5.0 |
| 0d1-Cy-Ph1-Ph3-O1-Ph3-OCFFF | 5.0 |
| 3-Cy-Ph3-O1-Ph-OCFFF | 5.0 |
| 3-Cy-Cy-Ph3-O1Ph3-F | 5.0 |
| Tni | 71.0 |
| T-n | −38.0 |
| Vth | 1.42 |
| γ1 | 67.0 |
| ε⊥ | 4.08 |
| Δε | 9.82 |
| no | 1.486 |
| Δn | 0.089 |
| η20 | 12.1 |

Example 51

A liquid crystal composition prepared and the physical property values thereof are as follows.

TABLE 59

| | |
|---|---|
| 0d1-Cy-Cy-3 | 15.0% |
| 1d1-Cy-Cy-2 | 15.0 |
| 1d1-Cy-Cy-3 | 10.0 |
| od1-Cy-Cy-1d1 | 12.0 |
| 3-Cy-Cy-2 | 3.0 |
| 1d1-Cy-Ph3-O1-Ph-OCFFF | 5.0 |
| 1d1-Cy-Cy-Ph3-O1-Ph3-F | 8.0 |
| 0d1-Cy-Ph1-Ph3-O1-Ph-OCFFF | 8.0 |
| 0d1-Cy-Ph1-Ph3-O1-Ph3-OCFFF | 7.0 |
| 3-Cy-Ph3-O1-Ph-OCFFF | 10.0 |
| 3-Cy-Cy-Ph3-O1Ph3-F | 7.0 |
| Tni | 73.4 |
| T-n | −32.0 |
| Vth | 1.89 |
| γ1 | 43.0 |
| ε⊥ | 3.41 |
| Δε | 5.74 |
| no | 1.484 |
| Δn | 0.075 |
| η20 | 8.5 |

Example 52

A liquid crystal composition prepared and the physical property values thereof are as follows.

TABLE 60

| | |
|---|---|
| 0d1-Cy-Cy-3 | 15.0% |
| 1d1-Cy-Cy-2 | 15.0 |
| 1d1-Cy-Cy-3 | 10.0 |
| od1-Cy-Cy-1d1 | 10.0 |
| 3-Cy-Cy-2 | 5.0 |
| 3-Cy-Cy-Ph-1 | 5.0 |
| 1d1-Cy-Ph3-O1-Ph3-F | 5.0 |
| 1d1-Cy-Cy-Ph3-O1-Ph3-F | 10.0 |
| 0d1-Cy-Ph1-Ph3-O1-Ph-OCFFF | 10.0 |
| 3-Cy-Ph3-O1-Ph-OCFFF | 5.0 |
| 3-Cy-Cy-Ph3-O1Ph3-F | 10.0 |
| Tni | 80.8 |
| T-n | −31.0 |
| Vth | 2.02 |
| γ1 | 53.0 |
| ε⊥ | 3.34 |
| Δε | 5.06 |
| no | 1.482 |
| Δn | 0.069 |
| η20 | 9.5 |

Example 53

A liquid crystal composition prepared and the physical property values thereof are as follows.

TABLE 61

| | |
|---|---|
| 0d1-Cy-Cy-3 | 10.0% |
| 1d1-Cy-Cy-2 | 15.0 |
| 0d3-Cy-Cy-3 | 10.0 |
| 2-Ph-Ph1-Ph-3d0 | 5.0 |
| 3-Ph-Ph1-Ph3-OCFFF | 5.0 |
| 3-Ph-Ph1-Ph3-CFFO-Ph3-F | 5.0 |
| 3-Ph-Ph3-O1-Ph-OCFFF | 10.0 |
| 3-Cy-Ph-Ph3-O1-Ph-OCFFF | 10.0 |
| 0d3-Ph-Ph3-O1-Ph-OCFFF | 10.0 |
| 0d1-Cy-Ph1-Ph3-O1-Ph3-F | 10.0 |
| 0d3-Ph-Ph1-Ph3-O1-Ph3-F | 10.0 |
| Tni | 72.7 |
| T-n | −33.0 |
| Vth | 1.42 |
| γ1 | 68.0 |
| ε⊥ | 3.52 |
| Δε | 10.02 |
| no | 1.496 |
| Δn | 0.128 |
| η20 | 12.9 |

Example 54

A liquid crystal composition prepared and the physical property values thereof are as follows.

TABLE 62

| | |
|---|---|
| 1d1-Cy-Cy-2 | 15.0% |
| 0d3-Cy-Cy-3 | 10.0 |
| 3-Cy-Ph-O2 | 5.0 |
| 5-Ph-Ph-1 | 5.0 |
| 2-Ph-Ph1-Ph-3d0 | 5.0 |
| 3-Ph-Ph1-Ph3-OCFFF | 5.0 |
| 3-Ph-Ph1-Ph3-CFFO-Ph3-F | 10.0 |
| 3-Ph-Ph3-O1-Ph-OCFFF | 5.0 |
| 3-Cy-Ph-Ph3-O1-Ph-OCFFF | 10.0 |
| 0d3-Ph-Ph3-O1-Ph-OCFFF | 10.0 |
| 0d1-Cy-Ph1-Ph3-O1-Ph3-F | 10.0 |

TABLE 62-continued

| | |
|---|---|
| 0d3-Ph-Ph1-Ph3-O1-Ph3-F | 10.0 |
| Tni | 72.9 |
| T-n | −33.0 |
| Vth | 1.38 |
| γ1 | 75.0 |
| ε⊥ | 3.64 |
| Δε | 11.15 |
| no | 1.498 |
| Δn | 0.139 |
| η20 | 14.6 |

Example 55

A liquid crystal composition prepared and the physical property values thereof are as follows.

TABLE 63

| | |
|---|---|
| 0d1-Cy-Cy-3 | 10.0% |
| 1d1-Cy-Cy-2 | 10.0 |
| 0d3-Cy-Cy-3 | 15.0 |
| 3-Ph-Ph1-Ph3-OCFFF | 5.0 |
| 3-Ph-Ph1-Ph3-CFFO-Ph3-F | 10.0 |
| 3-Ph-Ph3-O1-Ph3-F | 5.0 |
| 3-Cy-Ph-Ph3-O1-Ph-OCFFF | 15.0 |
| 3-Cy-Ph3-O1-Ph3-Ph1-F | 5.0 |
| 3-Ph3-O1-Cy-Ph3-Ph1-F | 5.0 |
| 1d1-Cy-Ph3-O1-Ph3-F | 5.0 |
| 1d1-Cy-Ph3-O1-Ph3-OCFFF | 5.0 |
| 0d1-Cy-Ph1-Ph3-O1-Ph3-F | 5.0 |
| 0d3-Ph-Ph1-Ph3-O1-Ph 3-F | 5.0 |
| Tni | 72.4 |
| T-n | −36.0 |
| Vth | 1.23 |
| γ1 | 79.0 |
| ε⊥ | 4.29 |
| Δε | 12.98 |
| no | 1.490 |
| Δn | 0.110 |
| η20 | 16.7 |

Example 56

A liquid crystal composition prepared and the physical property values thereof are as follows.

TABLE 64

| | |
|---|---|
| 0d1-Cy-Cy-3 | 10.0% |
| 1d1-Cy-Cy-2 | 10.0 |
| 0d3-Cy-Cy-3 | 15.0 |
| 3-Cy-Cy-2 | 3.0 |
| 3-Cy-Cy-O1 | 2.0 |
| 0d1-Cy-Cy-Ph-1 | 8.0 |
| 2-Cy-Cy-Ph-1 | 7.0 |
| 3-Cy-Ph-Ph3-F | 5.0 |
| 3-Ph-Ph1-Ph3-CFFO-Ph3-F | 5.0 |
| 3-Ph-Ph3-O1-Ph3-F | 5.0 |
| 3-Ph-Ph3-O1-Ph-OCFFF | 3.0 |
| 3-Cy-Ph-Ph3-O1-Ph-OCFFF | 15.0 |
| 0d1-Cy-Ph3-O1-Ph3-F | 2.0 |
| 1d1-Cy-Ph3-O1-Ph3-F | 5.0 |
| 0d3-Ph-Ph3-O1-Ph-OCFFF | 5.0 |
| Tni | 70.8 |
| T-n | −38.0 |
| Vth | 1.77 |
| γ1 | 57.0 |
| ε⊥ | 3.50 |
| Δε | 6.87 |
| no | 1.488 |
| Δn | 0.094 |
| η20 | 11.4 |

Example 57

A liquid crystal composition prepared and the physical property values thereof are as follows.

TABLE 65

| | |
|---|---|
| 0d1-Cy-Cy-3 | 10.0% |
| 1d1-Cy-Cy-2 | 10.0 |
| 0d3-Cy-Cy-3 | 10.0 |
| 3-Cy-Cy-2 | 3.0 |
| 3-Cy-Cy-O1 | 2.0 |
| 3-Cy-Ph-O1 | 2.0 |
| 3-Cy-Ph-O2 | 3.0 |
| 5-Ph-Ph-1 | 2.0 |
| 0d3-Ph-Ph-3d0 | 3.0 |
| 0d1-Cy-Cy-Ph-1 | 5.0 |
| 2-Cy-Cy-Ph-1 | 5.0 |
| 2-Ph-Ph1-Ph-3d0 | 5.0 |
| 3-Cy-Ph-Ph3-F | 2.0 |
| 3-Ph-Ph1-Ph3-OCFFF | 3.0 |
| 3-Ph-Ph1-Ph3-CFFO-Ph3-F | 5.0 |
| 3-Ph-Ph3-O1-Ph-OCFFF | 5.0 |
| 3-Cy-Ph-Ph3-O1-Ph-OCFFF | 5.0 |
| 3-Ph3-O1-Cy-Ph3-Ph1-F | 5.0 |
| 0d1-Cy-Ph1-Ph3-O1-Ph3-F | 7.0 |
| 0d3-Ph-Ph1-Ph3-O1-Ph3-F | 8.0 |
| Tni | 74.5 |
| T-n | −39.0 |
| Vth | 1.61 |
| γ1 | 73.0 |
| ε⊥ | 3.50 |
| Δε | 8.00 |
| no | 1.490 |
| Δn | 0.115 |
| η20 | 13.6 |

Example 58

A liquid crystal composition prepared and the physical property values thereof are as follows.

TABLE 66

| | |
|---|---|
| 0d1-Cy-Cy-3 | 10.0% |
| 1d1-Cy-Cy-2 | 15.0 |
| 0d3-Cy-Cy-3 | 10.0 |
| 3-Cy-Ph-O2 | 2.0 |
| 5-Ph-Ph-1 | 2.0 |
| 2-Cy-Cy-Ph-1 | 7.0 |
| 2-Ph-Ph1-Ph-3d0 | 7.0 |
| 3-Cy-Ph-Ph3-F | 2.0 |
| 3-Ph-Ph1-Ph3-OCFFF | 3.0 |
| 3-Ph-Ph1-Ph3-CFFO-Ph3-F | 5.0 |
| 3-Ph-Ph3-O1-Ph3-F | 2.0 |
| 3-Ph-Ph3-O1-Ph-OCFFF | 2.0 |
| 3-Cy-Ph-Ph3-O1-Ph-OCFFF | 5.0 |
| 3-Cy-Ph3-O1-Ph3-Ph1-F | 5.0 |
| 3-Ph3-O1-Cy-Ph3-Ph1-F | 5.0 |
| 0d1-Cy-Ph3-O1-Ph3-F | 2.0 |
| 1d1-Cy-Ph3-O1-Ph3-F | 2.0 |
| 1d1-Cy-Ph3-O1-Ph3-OCFFF | 2.0 |
| 0d3-Ph-Ph3-O1-Ph-OCFFF | 2.0 |
| 0d1-Cy-Ph1-Ph3-O1-Ph3-F | 5.0 |
| 0d3-Ph-Ph1-Ph3-O1-Ph3-F | 5.0 |
| Tni | 71.1 |
| T-n | −38.0 |
| Vth | 1.53 |
| γ1 | 75.0 |
| ε⊥ | 3.71 |
| Δε | 9.29 |
| no | 1.491 |
| Δn | 0.112 |
| η20 | 14.0 |

Example 59

A first substrate on which a pair of transparent electrodes each having a comb-shape electrode structure were disposed and a second substrate on which no electrode structures were formed were used. A vertical alignment film was formed on each substrate and an IPS empty cell in which the gap distance between the first substrate and the second substrate was 4.0 μm was fabricated. A liquid crystal composition of Example 49 was poured into the empty cell to form a liquid crystal display device.

A polymerizable liquid crystal composition CLC-E was prepared by adding 1% of a polymerizable compound represented by formula (PC-1)-3-1 to 99% of the liquid crystal composition of Example 49 and homogeneously dissolving the polymerizable compound therein:

[Chem. 32]

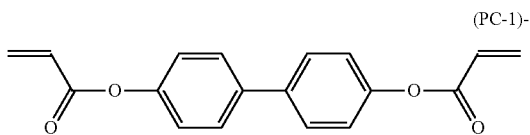

(PC-1)-3-1

The physical properties of CLC-E were not significantly different from the physical properties of the liquid crystal composition of Example 49.

The CLC-E was held in the IPS empty cell described above and the resulting liquid crystal cell was irradiated with ultraviolet light from a high-pressure mercury lamp through a filter that cut UV rays of 300 nm or lower while applying a 1.8 V square wave at a frequency of 1 kHz. The irradiation strength at the cell surface was adjusted to 20 mW/cm² and irradiation was continued for 600 seconds to obtain a vertical alignment liquid crystal display device in which the polymerizable compound in the polymerizable liquid crystal composition was polymerized. The response speed of this display device was significantly faster than the liquid crystal display device in which only the liquid crystal composition of Example 49 was used.

Example 60

A liquid crystal composition prepared and the physical property values thereof are as follows.

TABLE 67

| | |
|---|---|
| 1d1-Cy-Cy-3 | 15.0% |
| od1-Cy-Cy-1d1 | 15.0 |
| 2-Cy-Cy-Ph-1 | 5.0 |
| 3-Cy-Cy-Ph-1 | 7.0 |
| 1-Ph-Ph1-Ph-3d0 | 8.0 |
| 3-Cy-Cy-Ph3-OCFFF | 10.0 |
| 3-Cy-Cy-CFFO-Ph3-F | 5.0 |
| 3-Cy-Ph1-Ph3-CFFO-Ph3-F | 10.0 |
| 3-Pr-Ph3-O1-Ph-OCFFF | 15.0 |
| 3-Pr-Ph3-O1-Ph3-F | 10.0 |
| Tni | 72.2 |
| T-n | −33.0 |
| Vth | 1.42 |
| γ1 | 67.0 |
| ε⊥ | 3.57 |
| Δε | 8.37 |
| no | 1.486 |
| Δn | 0.094 |
| η20 | 13.1 |

Comparative Example 42

A liquid crystal composition prepared and the physical property values thereof are as follows.

TABLE 68

| | |
|---|---|
| 1d1-Cy-Cy-3 | 15.0% |
| od1-Cy-Cy-1d1 | 15.0 |
| 2-Cy-Cy-Ph-1 | 5.0 |
| 3-Cy-Cy-Ph-1 | 7.0 |
| 1-Ph-Ph1-Ph-3d0 | 8.0 |
| 3-Cy-Cy-Ph3-OCFFF | 10.0 |
| 3-Cy-Cy-CFFO-Ph3-F | 5.0 |
| 3-Cy-Ph1-Ph3-CFFO-Ph3-F | 10.0 |
| 3-Pr-Ph3-1O-Ph-OCFFF | 15.0 |
| 3-Pr-Ph-O1-Ph3-F | 10.0 |
| Tni | 67.0 |
| T-n | −33.0 |
| Vth | 1.50 |
| γ1 | 94.0 |
| ε⊥ | 3.55 |
| Δε | 7.87 |
| no | 1.485 |
| Δn | 0.093 |
| η20 | 20.5 |

This liquid crystal composition is a liquid crystal composition that does not contain a compound represented by general formula (LC0) having the —PH$_3$—OCH$_2$— substructure according to the present application. The results show that, in Example 1, the viscosity is significantly low and γ$_1$ is small despite a large dielectric anisotropy and a high nematic phase-isotropic liquid phase transition temperature (T$_{ni}$), and that the combination of the present invention is significantly advantageous.

Example 61

A liquid crystal composition prepared and the physical property values thereof are as follows.

TABLE 69

| | |
|---|---|
| 1d1-Cy-Cy-3 | 10.0% |
| od1-Cy-Cy-1d1 | 10.0 |
| 3-Cy-Cy-2 | 5.0 |
| 3-Pr-Ph3-O1-Ph-OCFFF | 5.0 |
| 3-Pr-Ph3-O1-Ph3-F | 5.0 |
| 3-Pr-Ph1-Ph3-O1-Ph3-F | 10.0 |
| 3-Pr-Cy-Ph3-O1-Ph-OCFFF | 5.0 |
| 3-Cy-Pr-Ph3-O1-Ph3-F | 5.0 |
| 3-Cy-Cy-Ph3-O1-Ph3-F | 5.0 |
| 3-Cy-Ph-Ph3-O1-Ph3-F | 5.0 |
| 3-Ph-Ph1-Ph3-O1-Ph3-F | 10.0 |
| 3-Ph-Ph1-Np3-F | 5.0 |
| Tni | 79.2 |
| T-n | −36.0 |
| Vth | 1.38 |
| γ1 | 76.0 |
| ε⊥ | 3.86 |
| Δε | 9.87 |
| no | 1.485 |
| Δn | 0.090 |
| η20 | 14.1 |

Example 62

A liquid crystal composition prepared and the physical property values thereof are as follows.

TABLE 70

| | |
|---|---|
| 0d1-Cy-Cy-3 | 10.0% |
| 1d1-Cy-Cy-2 | 10.0 |
| 1d1-Cy-Cy-3 | 15.0 |
| 2-Cy-Cy-Ph-1 | 2.0 |
| 3-Cy-Cy-Ph-1 | 3.0 |
| 3-Pr-Cy-Ph3-O1-Ph-OCFFF | 5.0 |
| 3-Cy-Pr-Ph3-O1-Ph3-F | 5.0 |
| 3-Cy-Ph3-O1-Ph-OCFFF | 10.0 |
| 3-Ph-Ph3-O1-Ph-OCFFF | 10.0 |
| 3-Cy-Cy-Ph3-O1-Ph3-F | 10.0 |
| 3-Cy-Ph-Ph3-O1-Ph3-F | 10.0 |
| 3-Ph-Ph1-Ph3-O1-Ph3-F | 10.0 |
| Tni | 84.6 |
| T-n | −31.0 |
| Vth | 1.43 |
| γ1 | 72.0 |
| ε⊥ | 3.71 |
| Δε | 8.41 |
| no | 1.488 |
| Δn | 0.095 |
| η20 | 12.8 |

Example 63

A liquid crystal composition prepared and the physical property values thereof are as follows.

TABLE 71

| | |
|---|---|
| 1d1-Cy-Cy-2 | 10.0% |
| 1d1-Cy-Cy-3 | 15.0 |
| od1-Cy-Cy-1d1 | 15.0 |
| 3-Cy-Cy-2 | 2.0 |
| 2-Cy-Cy-Ph-1 | 3.0 |
| 3-Cy-Cy-Ph-1 | 5.0 |
| 1-Ph-Ph1-Ph-3d0 | 5.0 |
| 3-Cy-Ph-Ph3-OCFFF | 5.0 |
| 3-Pr-Ph3-O1-Ph-OCFFF | 5.0 |
| 3-Pr-Ph1-Ph3-O1-Ph3-F | 10.0 |
| 3-Cy-Ph3-O1-Ph-OCFFF | 10.0 |
| 3-Ph-Ph3-O1-Ph-OCFFF | 5.0 |
| 3-Cy-Cy-Ph3-O1-Ph3-F | 10.0 |
| Tni | 76.0 |
| T-n | −39.0 |
| Vth | 1.69 |
| γ1 | 60.0 |
| ε⊥ | 3.39 |
| Δε | 6.40 |
| no | 1.486 |
| Δn | 0.090 |
| η20 | 10.7 |

Example 64

A liquid crystal composition prepared and the physical property values thereof are as follows.

TABLE 72

| Compound | Ex. 5 |
|---|---|
| 0d1-Cy-Cy-3 | 10.0% |
| 1d1-Cy-Cy-2 | 15.0 |
| 1d1-Cy-Cy-3 | 15.0 |
| od1-Cy-Cy-1d1 | 5.0 |
| 3-Cy-Cy-Ph3-OCFFF | 5.0 |
| 3-Cy-Ph-Ph3-OCFFF | 5.0 |
| 3-Cy-Cy-CFFO-Ph3-F | 5.0 |
| 3-Cy-Ph1-Ph3-CFFO-Ph3-F | 5.0 |
| 3-Pr-Ph1-Ph3-O1-Ph3-F | 5.0 |
| 3-Pr-Cy-Ph3-O1-Ph-OCFFF | 5.0 |
| 3-Cy-Pr-Ph3-O1-Ph3-F | 5.0 |
| 3-Cy-Ph3-O1-Ph-OCFFF | 5.0 |
| 3-Ph-Ph3-O1-Ph-OCFFF | 5.0 |
| 3-Cy-Cy-Ph3-O1-Ph3-F | 5.0 |
| 3-Cy-Ph-Ph3-O1-Ph3-F | 5.0 |
| Tni | 78.9 |
| T-n | −36.0 |
| Vth | 1.44 |
| γ1 | 74.0 |
| ε⊥ | 3.56 |
| Δε | 8.22 |
| no | 1.484 |
| Δn | 0.081 |
| η20 | 13.1 |

Example 65

A liquid crystal composition prepared and the physical property values thereof are as follows.

TABLE 73

| | |
|---|---|
| 0d1-Cy-Cy-3 | 10.0% |
| 1d1-Cy-Cy-2 | 10.0 |
| 1d1-Cy-Cy-3 | 10.0 |
| od1-Cy-Cy-1d1 | 10.0 |
| 3-Cy-Cy-Ph-1 | 7.0 |
| 1-Ph-Ph1-Ph-3d0 | 8.0 |
| 3-Pr-Ph1-Ph3-O1-Ph3-F | 10.0 |
| 3-Pr-Cy-Ph3-O1-Ph-OCFFF | 10.0 |
| 3-Ph-Ph3-O1-Ph-OCFFF | 10.0 |
| 3-Cy-Ph-Ph3-O1-Ph3-F | 5.0 |
| 3-Ph-Ph1-Ph3-O1-Ph3-F | 10.0 |
| Tni | 91.8 |
| T-n | −36.0 |
| Vth | 1.53 |
| γ1 | 79.0 |
| ε⊥ | 3.54 |
| Δε | 7.52 |
| no | 1.490 |
| Δn | 0.110 |
| η20 | 14.3 |

Example 66

A first substrate on which a pair of transparent electrodes each having a comb-shape electrode structure were disposed and a second substrate on which no electrode structures were formed were used. A vertical alignment film was formed on each substrate and an IPS empty cell in which the gap distance between the first substrate and the second substrate was 4.0 μm was fabricated. A liquid crystal composition of Example 60 was poured into the empty cell to form a liquid crystal display device.

A polymerizable liquid crystal composition CLC-F was prepared by adding 1% of a polymerizable compound represented by formula (PC-1)-3-1 to 99% of the liquid crystal composition of Example 60 and homogeneously dissolving the polymerizable compound therein:

[Chem. 33]

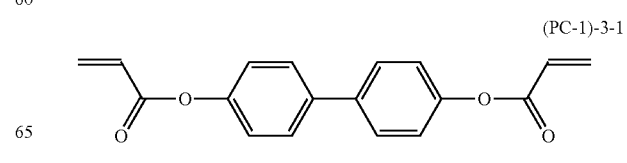

(PC-1)-3-1

The physical properties of CLC-F were not significantly different from the physical properties of the liquid crystal composition of Example 60. The CLC-F was held in the IPS empty cell described above and the resulting liquid crystal cell was irradiated with ultraviolet light from a high-pressure mercury lamp through a filter that cut UV rays of 300 nm or lower while applying a 1.8 V square wave at a frequency of 1 kHz. The irradiation strength at the cell surface was adjusted to 20 mW/cm² and irradiation was continued for 600 seconds to obtain a vertical alignment liquid crystal display device in which the polymerizable compound in the polymerizable liquid crystal composition was polymerized. The response speed of this display device was significantly faster than the liquid crystal display device in which only the liquid crystal composition of Example 60 was used.

The invention claimed is:

1. A liquid composition having positive dielectric anisotropy, wherein the liquid crystal composition is characterized by comprising one or more compounds selected from compounds represented by general formula (LC0) and further comprises one or more compounds selected from a group of compounds represented by general formula (LC1) to general formula (LC5):

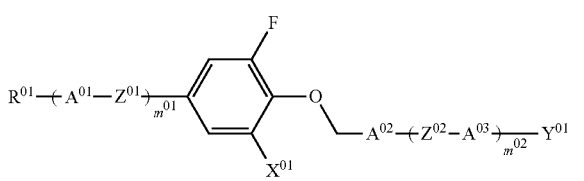
(LC0)

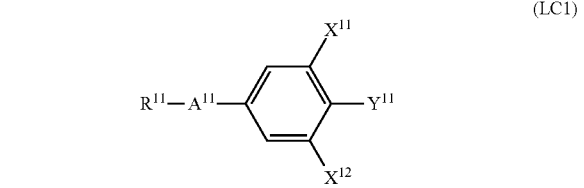
(LC1)

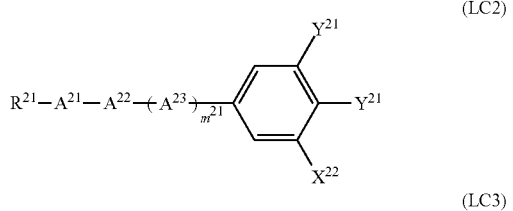
(LC2)

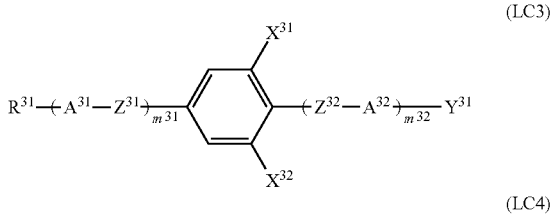
(LC3)

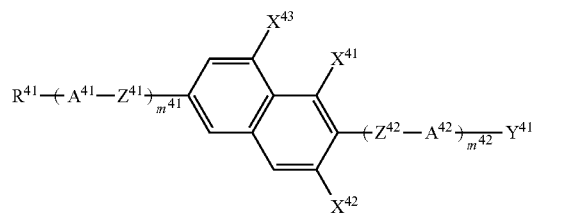
(LC4)

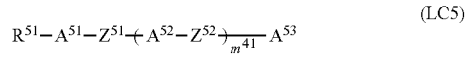
(LC5)

(In the formulae, $R^{01}$ to $R^{41}$ each independently represent an alkyl group having 1 to 15 carbon atoms, one or more —CH$_2$— in the alkyl group may be substituted with —O—, —CH=CH—, —CF$_2$O—, or —OCF$_2$— so that oxygen atoms are not directly adjacent to each other, and one or more hydrogen atoms in the alkyl group may be substituted with a halogen; $R^{51}$ and $R^{52}$ each independently represent an alkyl group having 1 to 15 carbon atoms where one or more —CH$_2$— in the alkyl group may be substituted with —O—, —CH=CH—, —OCO—, —COO—, or —C≡C— so that oxygen atoms are not directly adjacent to each other, or $R^{51}$ and $R^{52}$ may each be —OCF$_3$ or —CF$_3$ if $A^{51}$ or $A^{53}$ described below represents a cyclohexane ring; $A^{01}$ to $A^{42}$ each independently represent any one of the structures below:

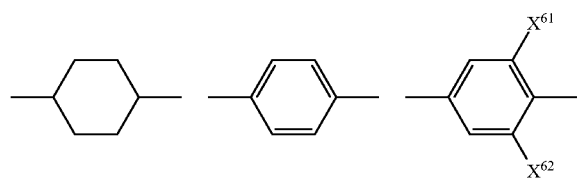

(One or more —CH$_2$— in the cyclohexane ring in the structure may be substituted with —O— so that oxygen atoms are not directly adjacent to each other and $X^{61}$ and $X^{62}$ each independently represent —H or —F); $A^{51}$ to $A^{53}$ each independently represent any one of the structures below:

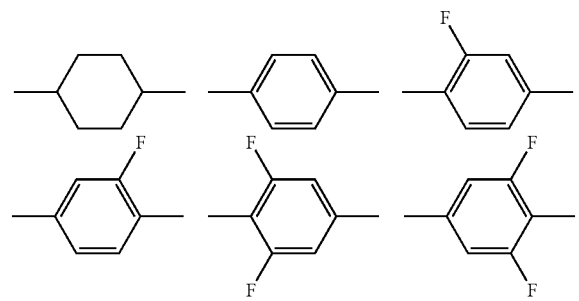

(In the formulae, one or more —CH$_2$CH$_2$— in the cyclohexane ring may be substituted with —CH=CH—, —CF$_2$O—, or —OCF$_2$—); $X^{01}$ represents a fluorine atom; $X^{11}$ to $X^{43}$ each independently represent —H or —F; $Y^{01}$ to $Y^{41}$ each represent —F, —OCHF$_2$, —CF$_3$, or —OCF$_3$; $Z^{01}$ and $Z^{02}$ each independently represent a single bond, —CH=CH—, —C≡C—, —CH$_2$CH$_2$—, or —OCF$_2$—; $Z^{31}$ to $Z^{42}$ each independently represent a single bond, —CH=CH—, —C≡C—, —CH$_2$CH$_2$—, —(CH$_2$)$_4$—, —OCF$_2$—, or —CF$_2$O— and at least one selected from $Z^{31}$ and $Z^{32}$ that are present is not a single bond; $Z^{51}$ and $Z^{52}$ each independently represent a single bond, —CH=CH—, —C≡C—, —CH$_2$CH$_2$—, —OCH$_2$—, —CH$_2$O—, —OCF$_2$—, or —CF$_2$O—; $m^{01}$ to $m^{51}$ each independently represent an integer in the range of 0 to 3; $m^{01}+m^{02}$ represents 1, 2, or 3; $m^{31}+m^{32}$ and $m^{41}+m^{42}$ each independently represent 1, 2, 3, or 4; and when two or more $A^{01}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$, and/or $Z^{52}$ are present, they may be the same or different from each other).

2. The liquid crystal composition according to claim 1, wherein the liquid crystal composition comprises one or more compounds selected from compounds represented by general formula (LC0), one or more compounds selected from a group of compounds represented by general formula (LC1) to general formula (LC4), and one or more compounds selected from a group of compounds represented by general formula (LC5).

3. The liquid crystal composition according to claim 1, wherein one or more compounds selected from a group consisting of compounds represented by general formula (LC2-1) to general formula (LC2-14) are contained as the compound represented by general formula (LC2):

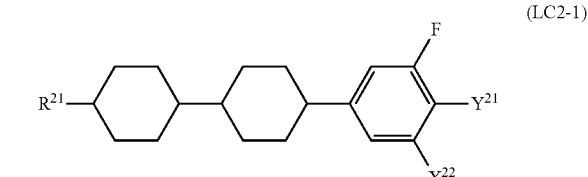
(LC2-1)

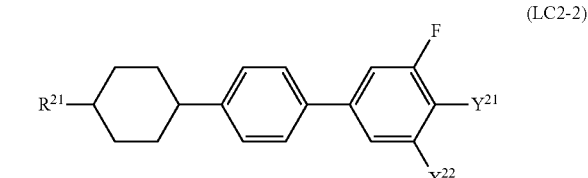
(LC2-2)

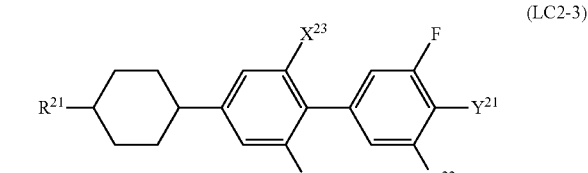
(LC2-3)

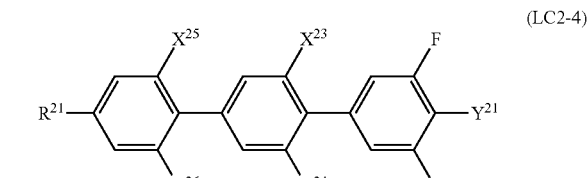
(LC2-4)

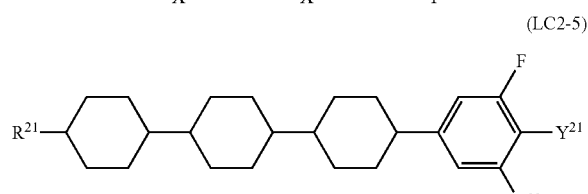
(LC2-5)

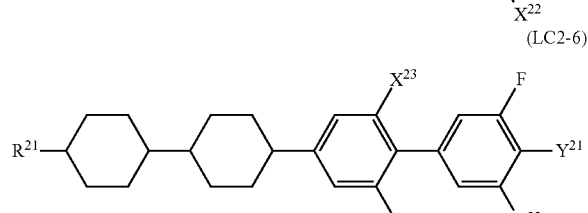
(LC2-6)

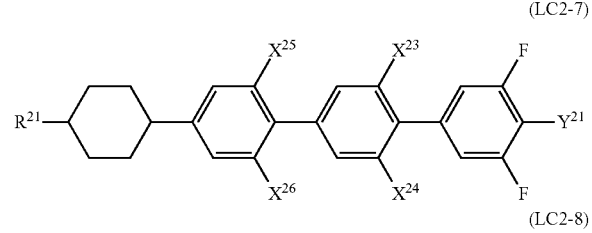
(LC2-7)

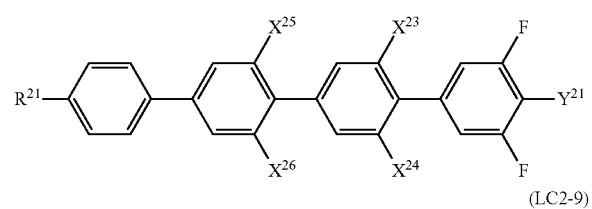
(LC2-8)

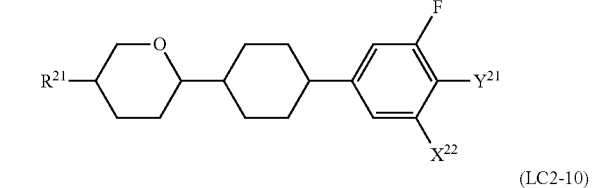
(LC2-9)

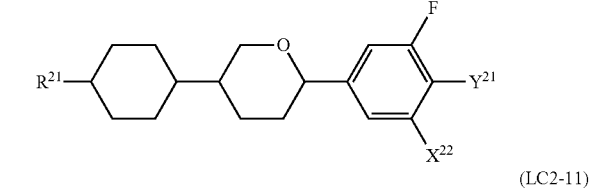
(LC2-10)

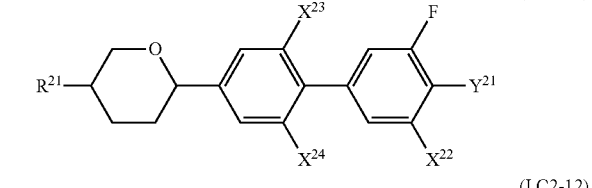
(LC2-11)

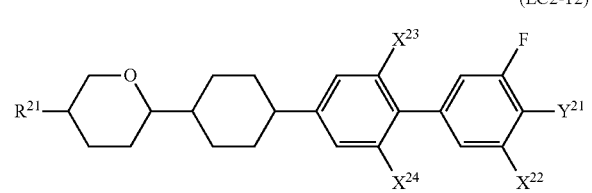
(LC2-12)

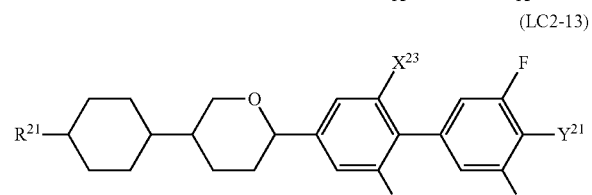
(LC2-13)

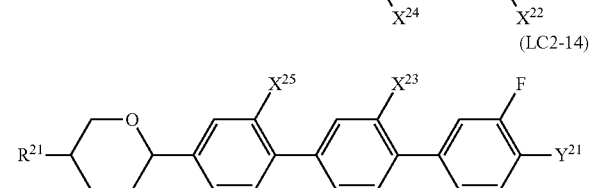
(LC2-14)

(In the formulae, $X^{23}$, $X^{24}$, $X^{25}$, and $X^{26}$ each independently represent a hydrogen atom, Cl, F, $CF_3$, or $OCF_3$, and $X^{22}$, $R^{21}$, and $Y^{21}$ are the same as those in claim 1).

4. The liquid crystal composition according to claim 1, wherein one or more compounds selected from a group consisting of compounds represented by general formula (LC3-1) to general formula (LC3-32) are contained as the compound represented by general formula (LC3):
(LC3-1)
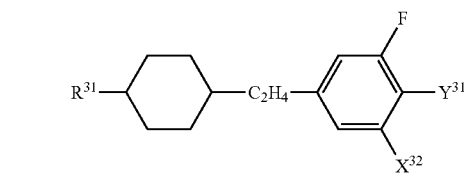
(LC3-2)
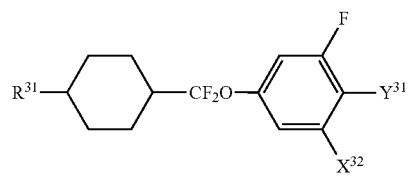
(LC3-3)
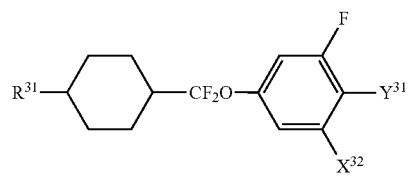
(LC3-4)
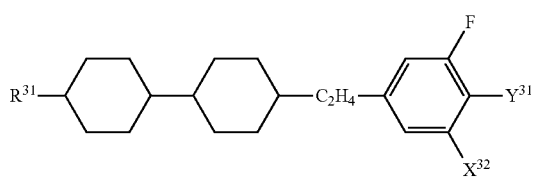
(LC3-5)
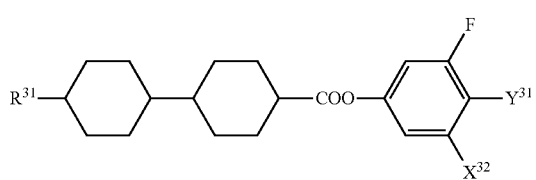
(LC3-6)
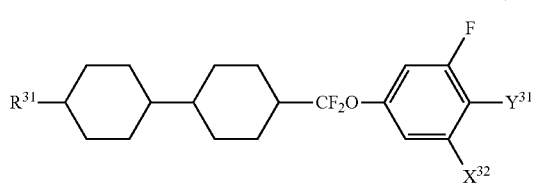
(LC3-7)
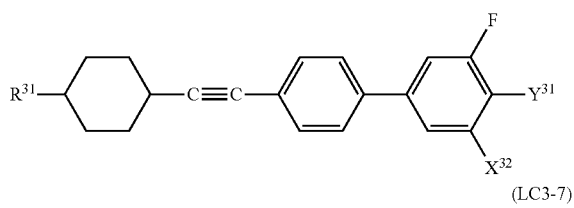
-continued
(LC3-8)
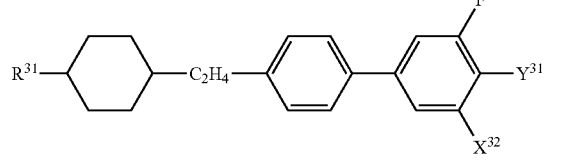
(LC3-9)
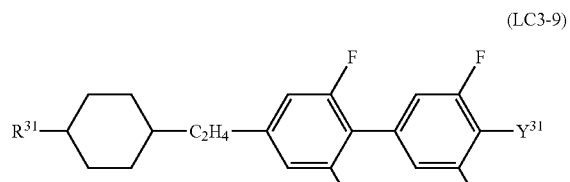
(LC3-10)
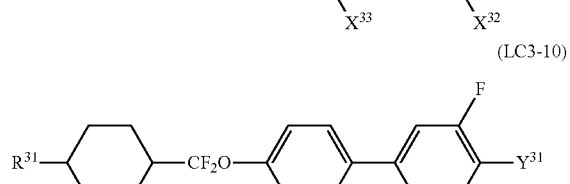
(LC3-11)
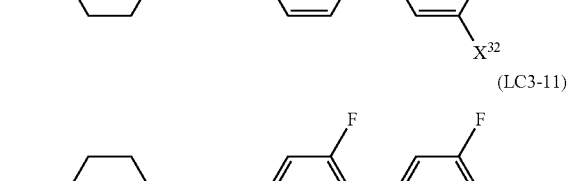
(LC3-12)
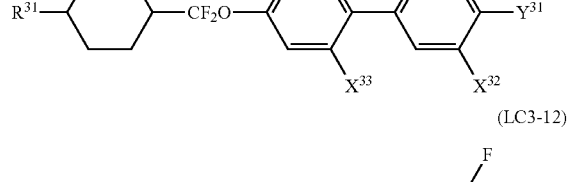
(LC3-13)
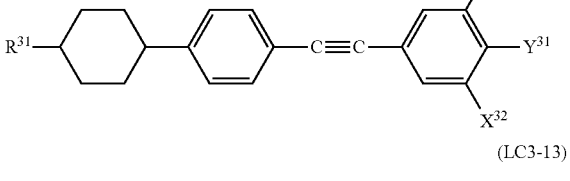
(LC3-14)
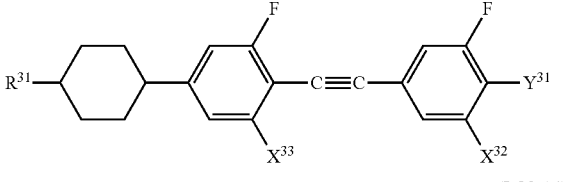
(LC3-15)
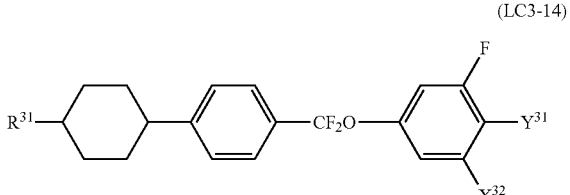
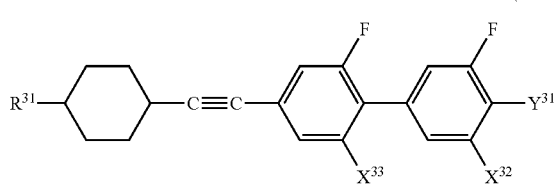

(LC3-16) 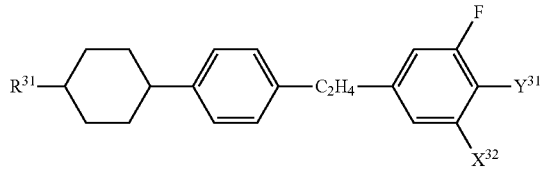
(LC3-17) 
(LC3-18) 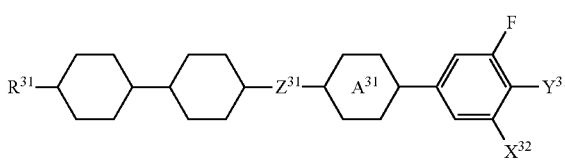
(LC3-19) 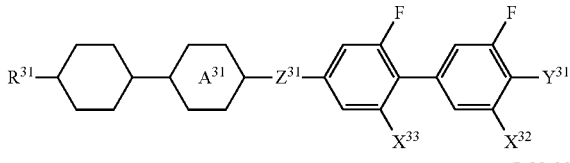
(LC3-20) 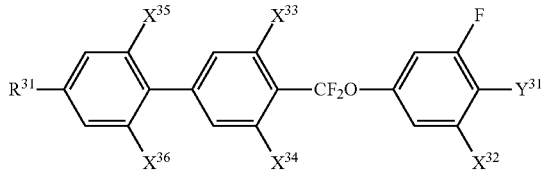
(LC3-21) 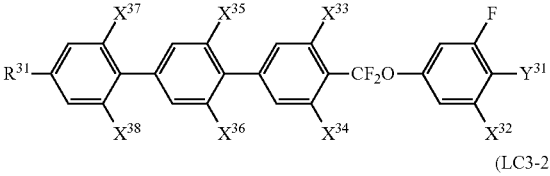
(LC3-22) 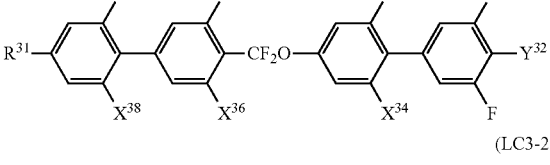
(LC3-23) 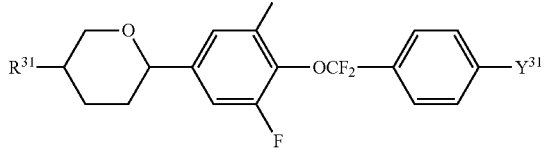
(LC3-24) 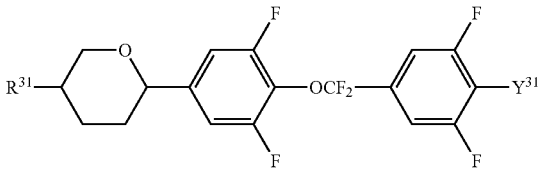
(LC3-25) 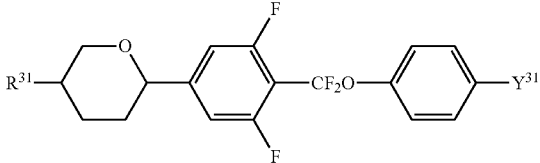
(LC3-26) 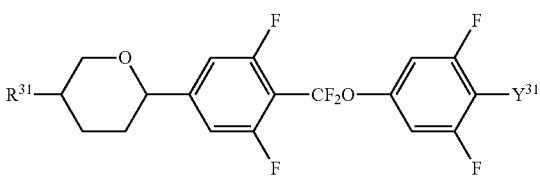
(LC3-27) 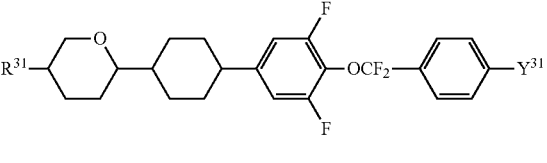
(LC3-28) 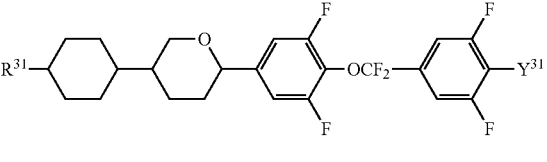
(LC3-29) 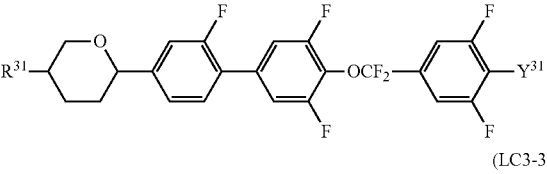
(LC3-30) 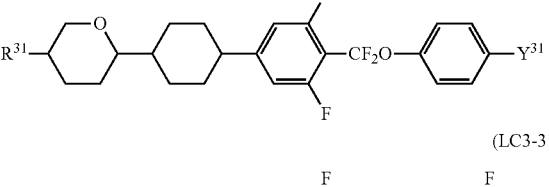
(LC3-31) 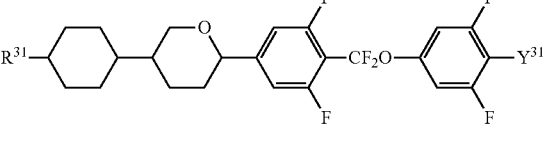

(LC3-32)

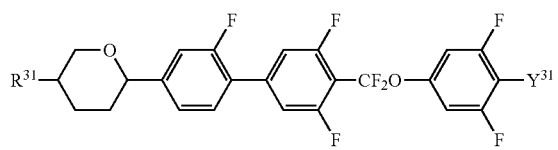

(In the formulae, $X^{33}$, $X^{34}$, $X^{35}$, $X^{36}$, $X^{37}$, and $X^{38}$ each independently represent H, Cl, F, $CF_3$, or $OCF_3$ and $X^{32}$, $R^{31}$, $A^{31}$, $Y^{31}$, and $Z^{31}$ are the same as those in claim 1).

5. The liquid crystal composition according to claim 1, wherein one or more compounds selected from a group consisting of compounds represented by general formula (LC4-1) to general formula (LC4-23) are contained as the compound represented by general formula (LC4):

(LC4-1)

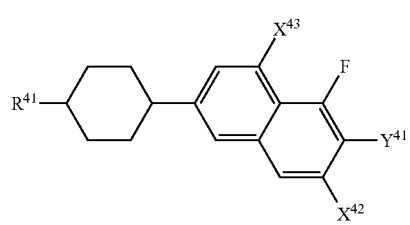

(LC4-2)

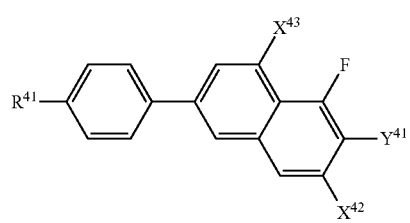

(LC4-3)

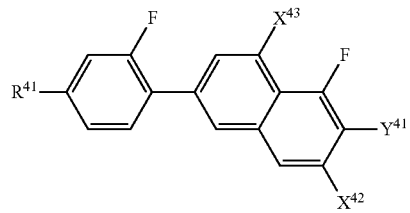

(LC4-4)

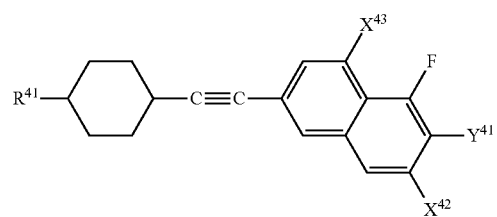

(LC4-5)

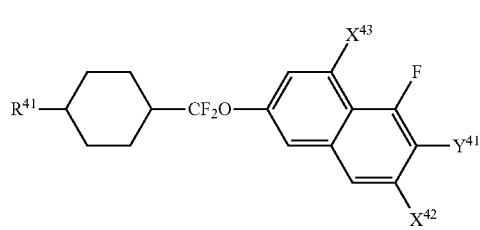

(LC4-6)

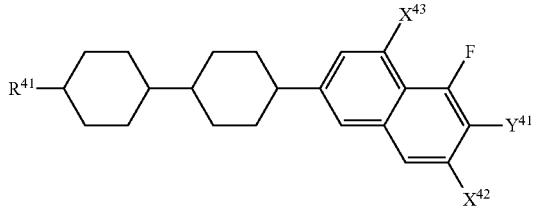

(LC4-7)

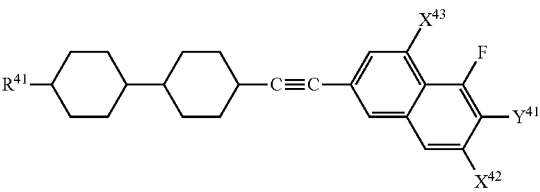

(LC4-8)

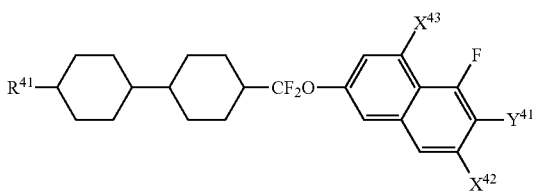

(LC4-9)

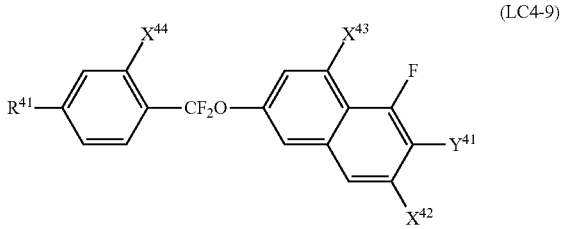

(LC4-10)

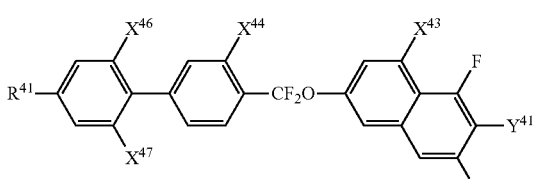

(LC4-11)

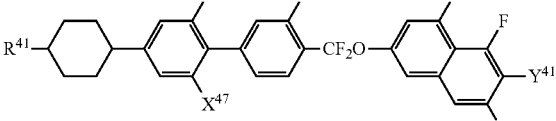

(LC4-12)

(LC4-13)
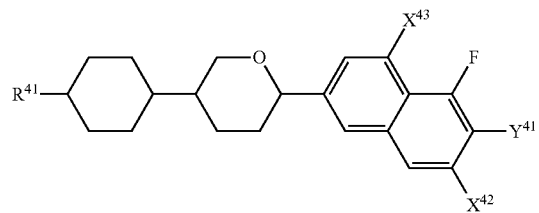

(LC4-14)
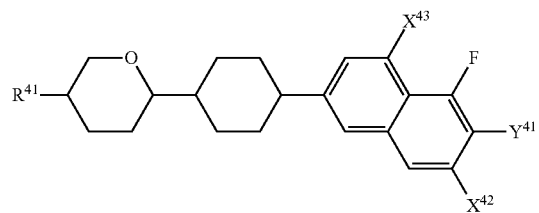

(LC4-15)
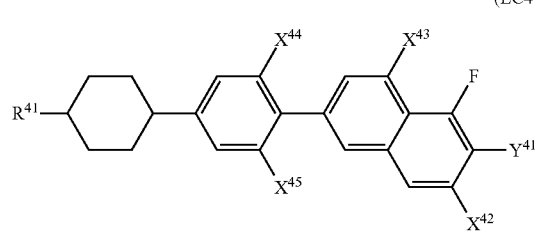

(LC4-16)
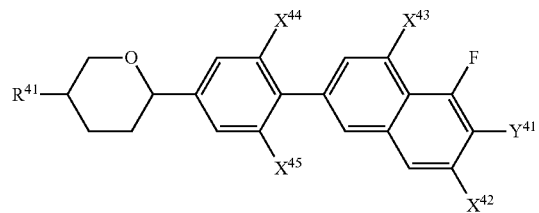

(LC4-17)
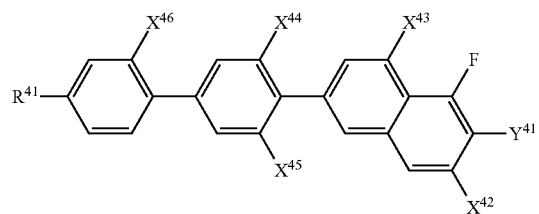

(LC4-18)
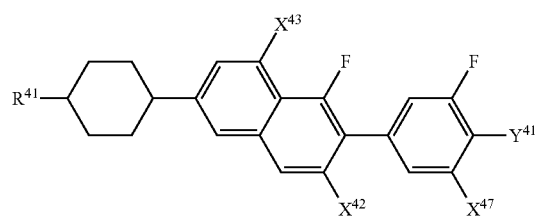

(LC4-19)
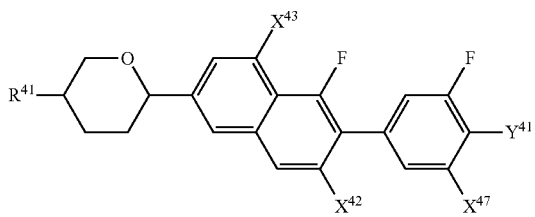

(LC4-20)
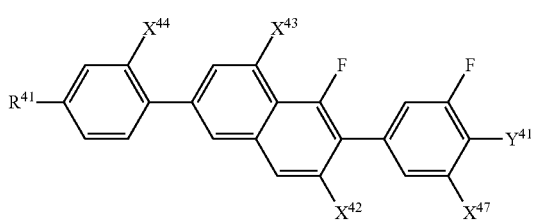

(LC4-21)
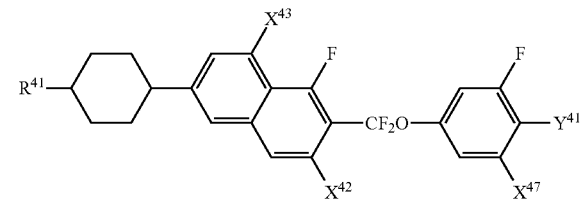

(LC4-22)
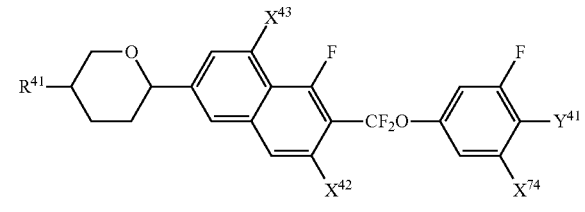

(LC4-23)
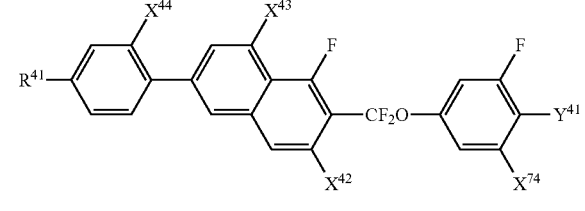

(In the formulae, $X^{44}$, $X^{45}$, $X^{46}$, and $X^{47}$ each independently represent H, Cl, F, $CF_3$, or $OCF_3$, and $X^{42}$, $X^{43}$, $R^{41}$, and $Y^{41}$ are the same as those in claim 1).

6. The liquid crystal composition according to claim 1, wherein one or more compounds selected from a group consisting of compounds represented by general formula (LC5-1) to general formula (LC5-26) are contained as the compound represented by general formula (LC5):

(LC5-1)
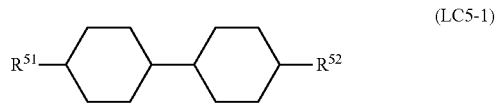

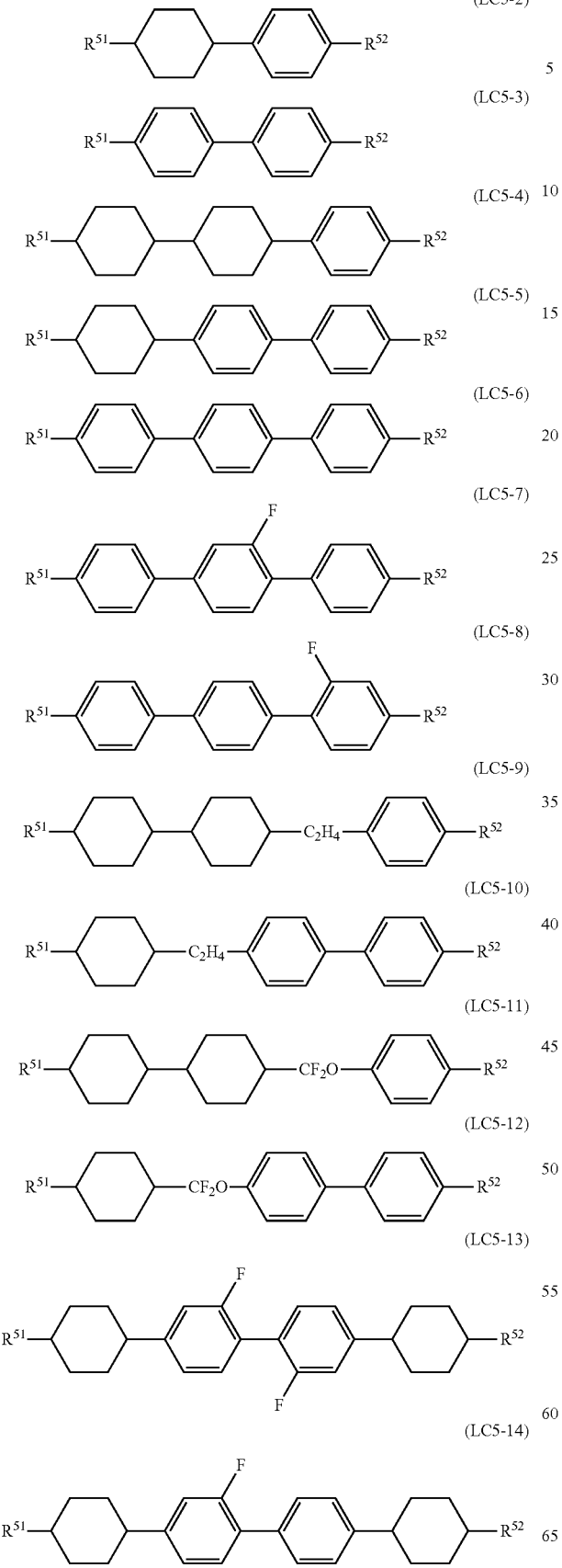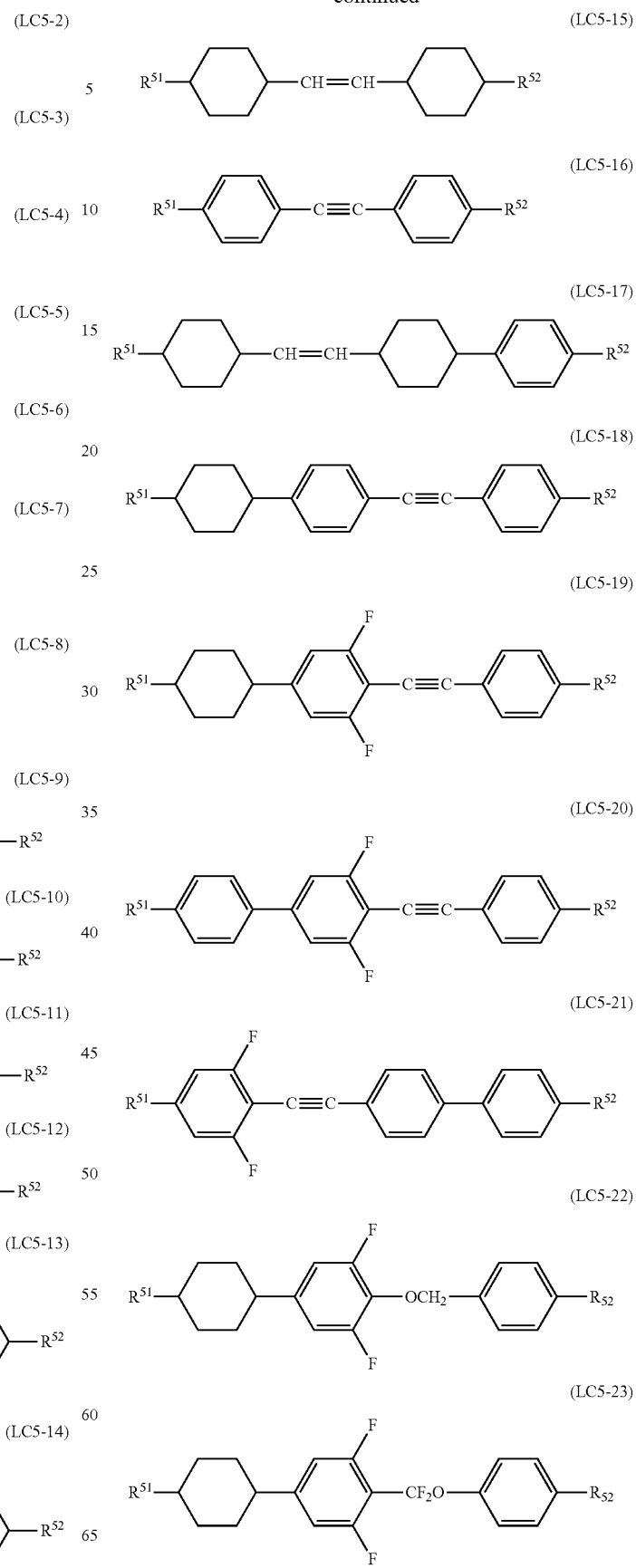

-continued

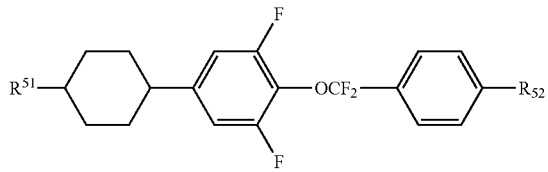
(LC5-24)

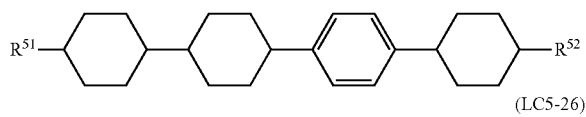
(LC5-25)

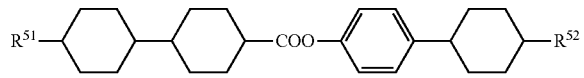
(LC5-26)

(In formulae, $R^{51}$ and $R^{52}$ are the same as those in claim 1).

7. The liquid crystal composition according to claim 1, further comprising one or more optically active compounds.

8. The liquid crystal composition according to claim 1, wherein the liquid crystal composition comprises one or more compounds selected from a group of compounds represented by general formula (LC0) to general formula (LC5) with $R^{01}$ to $R^{52}$ each representing an alkenyl group having 2 to 5 carbon atoms.

9. The liquid crystal composition according to claim 1, further comprising one or more compounds selected from a group consisting of compounds represented by general formula (LC0) in which at least one of $A^{01}$ to $A^{03}$ that are present represents a tetrahydropyran-2,5-diyl group, compounds represented by general formula (LC1) in which $A^{11}$ represents a tetrahydropyran-2,5-diyl group, compounds represented by general formula (LC2) in which at least one of $A^{21}$ to $A^{23}$ that are present represents a tetrahydropyran-2,5-diyl group, compounds represented by general formula (LC3) in which at least one of $A^{31}$ and $A^{32}$ that are present represents a tetrahydropyran-2,5-diyl group, compounds represented by general formula (LC4) in which at least one of $A^{41}$ and $A^{42}$ that are present represents a tetrahydropyran-2,5-diyl group, and compounds represented by general formula (LC5) in which at least one of $A^{51}$ to $A^{53}$ that are present represents a tetrahydropyran-2,5-diyl group.

10. The liquid crystal composition according to claim 1, further comprising one or more compounds selected from a group consisting of compounds represented by general formula (LC0) in which at least one of $Z^{01}$ and $Z^{02}$ that are present represents $OCF_2$—, compounds represented by general formula (LC3) in which at least one of $Z^{31}$ and $Z^{32}$ that are present represents —$CF_2O$— or —$OCF_2$—, compounds represented by general formula (LC4) in which at least one of $Z^{41}$ and $Z^{42}$ that are present represents —$CF_2O$— or —$OCF_2$—, and compounds represented by general formula (LC5) in which at least one of $Z^{51}$ and $Z^{52}$ that are present represents —$CF_2O$— or —$OCF_2$—.

11. The liquid crystal composition according to claim 1, wherein the liquid crystal composition contains 30 to 70% by mass of the compound represented by general formula (LC5) and has a viscosity η of 20 mPa·s or less at 20° C.

12. The liquid crystal composition according to claim 1, further comprising one or more polymerizable compounds.

13. The liquid crystal composition according to claim 1, further comprising one or more antioxidants.

14. The liquid crystal composition according to claim 1, further comprising one or more UV absorbers.

15. A liquid crystal display device comprising the liquid crystal composition according to claim 1.

16. A liquid crystal display device for active matrix driving, comprising the liquid crystal composition according to claim 1.

17. A liquid crystal display device of a TN mode, OCB mode, ECB mode, IPS mode, or VA-IPS mode, comprising the liquid crystal composition according to claim 1.

18. A polymer stabilized liquid crystal display device of a TN mode, OCB mode, ECB mode, IPS mode, or VA-IPS mode, prepared by using the liquid crystal composition according to claim 12 and polymerizing the polymerizable compounds contained in the liquid crystal composition in the presence or absence of applied voltage.

19. The liquid crystal display device according to claim 15, wherein an alignment layer disposed at a surface in contact with liquid crystal molecules and configured to align the liquid crystal molecules in a horizontal, tilted, or vertical direction is an alignment film that contains at least one compound selected from polyimide (PI), polyamide, chalcone, cinnamate, and cinnamoyl.

20. A liquid crystal display device, wherein the alignment layer according to claim 19 further contains a polymerizable liquid crystal compound and/or a polymerizable non-liquid crystal compound.

21. The liquid crystal display device according to claim 19, wherein an alignment film prepared by using an optical alignment technique is provided as the alignment layer disposed at a surface in contact with the liquid crystal composition.

22. A liquid composition having positive dielectric anisotropy, wherein the liquid crystal composition is characterized by comprising one or more compounds selected from compounds represented by general formula (LC0) and further comprises one or more compounds selected from a group of compounds represented by general formula (LC1) to general formula (LC5):

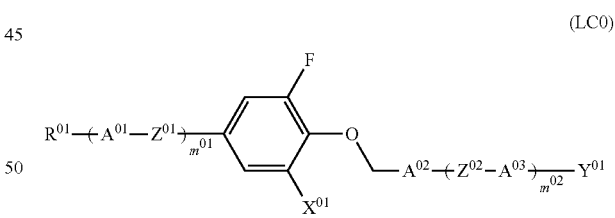
(LC0)

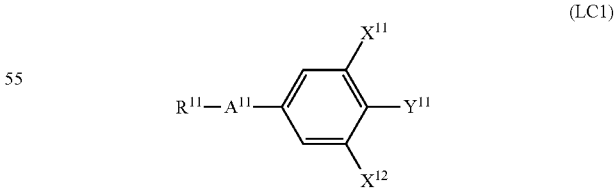
(LC1)

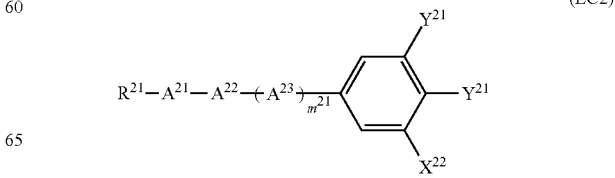
(LC2)

-continued

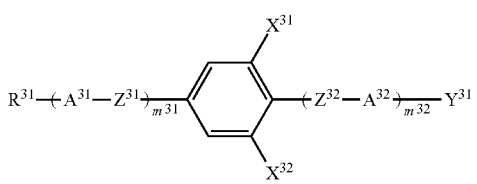 (LC3)

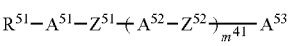 (LC4)

$R^{51}-A^{51}-Z^{51}+A^{52}-Z^{52}\underset{m41}{)}A^{53}$ (LC5)

(In the formulae, $R^{01}$ to $R^{41}$ each independently represent an alkyl group having 1 to 15 carbon atoms, one or more —$CH_2$— in the alkyl group may be substituted with —O—, —CH=CH—, —$CF_2O$—, or —$OCF_2$— so that oxygen atoms are not directly adjacent to each other, and one or more hydrogen atoms in the alkyl group may be substituted with a halogen; $R^{51}$ and $R^{52}$ each independently represent an alkyl group having 1 to 15 carbon atoms where one or more —$CH_2$— in the alkyl group may be substituted with —O—, —CH=CH—, —OCO—, —COO—, or —C≡C— so that oxygen atoms are not directly adjacent to each other, or $R^{51}$ and $R^{52}$ may each be —$OCF_3$ or —$CF_3$ if $A^{51}$ or $A^{53}$ described below represents a cyclohexane ring; $A^{01}$ to $A^{42}$ each independently represent any one of the structures below:

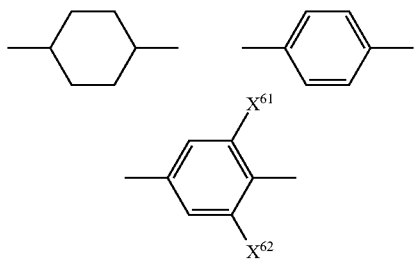

(One or more —$CH_2$— in the cyclohexane ring in the structure may be substituted with —O— so that oxygen atoms are not directly adjacent to each other and $X^{61}$ and $X^{62}$ each independently represent —H or —F); $A^{51}$ to $A^{53}$ each independently represent any one of the structures below:

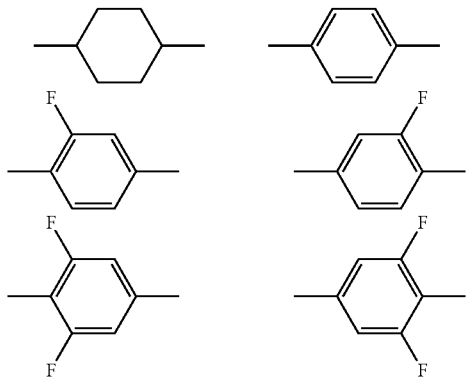

(In the formulae, one or more —$CH_2CH_2$— in the cyclohexane ring may be substituted with —CH=CH—, —$CF_2O$—, or —$OCF_2$—); $X^{01}$ represents a fluorine atom; $X^{11}$ to $X^{43}$ each independently represent —H or —F; $Y^{01}$ to $Y^{41}$, each represent —F, —$OCHF_2$, —$CF_3$, or —$OCF_3$; $Z^{01}$ and $Z^{02}$ each independently represent a single bond, —CH=CH—, —C≡C—, —$CH_2CH_2$—, —$OCF_2$—, or —$CF_2O$—; $Z^{31}$ to $Z^{42}$ each independently represent a single bond, —CH=CH—, —C≡C—, —$CH_2CH_2$—, —$(CH_2)_4$—, —$OCF_2$—, or —$CF_2O$— and at least one selected from $Z^{31}$ and $Z^{32}$ that are present is not a single bond; $Z^{51}$ and $Z^{52}$ each independently represent a single bond, —CH=CH—, —C≡C—, —$CH_2CH_2$—, —$OCH_2$—, —$CH_2O$—, —$OCF_2$—, or —$CF_2O$—; $m^{01}$ to $m^{51}$ each independently represent an integer in the range of 0 to 3; $m^{01}$+$m^{02}$ represents 1 or 2, $m^{31}$+$m^{32}$ and $m^{41}$+$m^{42}$ each independently represent 1, 2, 3, or 4; and when two or more $A^{01}, A^{03}, A^{23}, A^{31}, A^{32}, A^{41}, A^{42}, A^{52}, Z^{01}, Z^{02}, Z^{31}, Z^{32}, Z^{41}, Z^{42}$, and/or $Z^{52}$ are present, they may be the same or different from each other).

* * * * *